US012689735B2

(12) United States Patent
    Rosewarne

(10) Patent No.: US 12,689,735 B2
(45) Date of Patent: Jul. 21, 2026

(54) METHOD, APPARATUS AND SYSTEM FOR ENCODING AND DECODING A CODING TREE UNIT

(71) Applicant: CANON KABUSHIKI KAISHA, Tokyo (JP)

(72) Inventor: Christopher James Rosewarne, Concord (AU)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 18/773,961

(22) Filed: Jul. 16, 2024

(65) Prior Publication Data

US 2024/0373028 A1    Nov. 7, 2024

Related U.S. Application Data

(63) Continuation of application No. 17/772,483, filed as application No. PCT/AU2020/051201 on Nov. 4, 2020, now Pat. No. 12,075,058.

(30) Foreign Application Priority Data

Dec. 3, 2019    (AU) ................................. 2019275553

(51) Int. Cl.
    *H04N 19/136*        (2014.01)
    *H04N 19/169*        (2014.01)
    (Continued)

(52) U.S. Cl.
    CPC ......... *H04N 19/136* (2014.11); *H04N 19/186* (2014.11); *H04N 19/1883* (2014.11); *H04N 19/46* (2014.11); *H04N 19/96* (2014.11)

(58) Field of Classification Search
    CPC .... H04N 19/119; H04N 19/12; H04N 19/129; H04N 19/136; H04N 19/18;
    (Continued)

(56) References Cited

U.S. PATENT DOCUMENTS

2022/0394257 A1* 12/2022 Koo ...................... H04N 19/12

FOREIGN PATENT DOCUMENTS

KR      20190067732 A      6/2019
WO       2019112394 A1      6/2019
WO       2019216710 A1     11/2019

OTHER PUBLICATIONS

Mohammed Golam Sarwer, et al., AHG18: Residual coding method for lossless mode, Joint Video Experts Team (JVET) of ITU-T SG 16 WP and ISO/IEC JTC 1/SC 29WG 11, 16th meeting, Oct. 2019, Geneva, CH, Doc. No. JVET-P0463-v3.

(Continued)

*Primary Examiner* — Kathleen M Walsh
(74) *Attorney, Agent, or Firm* — Canon U.S.A., Inc. IP Division

(57)    ABSTRACT

A method of decoding a coding unit from a coding tree unit of an image frame from a video bitstream. The method comprises determining a scan pattern for a transform block, the scan pattern progressing from a current collection to a next collection of the plurality of collections after completing scanning of the current collection; decoding residual coefficients from the video bitstream according to the scan pattern; determining a multiple transform selection index for the coding unit, decoding the multiple transform selection index from the video bitstream if a last significant coefficient encountered along the scan pattern is at or within a threshold cartesian location of the transform block, and determining the multiple transform selection index to indicate that multiple transform selection is not used if the last significant residual coefficient position of the transform block along the scan pattern outside the threshold location; and transforming the decoded residual coefficients.

23 Claims, 22 Drawing Sheets

(51) Int. Cl.
 *H04N 19/186*     (2014.01)
 *H04N 19/46*      (2014.01)
 *H04N 19/96*      (2014.01)
(58) Field of Classification Search
 CPC .. H04N 19/186; H04N 19/1883; H04N 19/46;
  H04N 19/60; H04N 19/70; H04N 19/96
 USPC ................................................... 375/240.02
 See application file for complete search history.

(56)             References Cited

OTHER PUBLICATIONS

Jianle Chen, et al., Algorithm description for Versatile Video Coding
and Test Model 7 (VTM 7), Joint Video Experts Team (JVET) of
ITU-T SG 16 WP and ISO/IEC JTC 1/SC 29WG 11, 16th meeting,
Oct. 2019, Geneva, CH, Doc. No. JVET-P2002-v1.

* cited by examiner

800

810

806

802

804

8 sec
coeffs

4x4
primary
coefficients

0

812

818

822

830

824

820

4x4
primary
coefficients zero-out

4x4
secondary
coefficients

0

826

832

830

820

4x4
primary
coefficients zero-out

4x4
secondary
coefficients

0

824

832

METHOD, APPARATUS AND SYSTEM FOR ENCODING AND DECODING A CODING TREE UNIT

REFERENCE TO RELATED APPLICATION(S)

This application is a continuation of U.S. patent application Ser. No. 17/772,483, filed on Apr. 27, 2022, which is the National Phase application of PCT Application No. PCT/AU2020/051201 filed on Nov. 4, 2020 and titled "METHOD APPARATUS AND SYSTEM FOR ENCODING AND DECODING A CODING TREE UNIT". This application claims the benefit under 35 U.S.C. § 119 of the filing date of Australian Patent Application No. 2019275553, filed Dec. 3, 2019. Each of the above-cited patent applications is hereby incorporated by reference in its entirety as if fully set forth herein.

TECHNICAL FIELD

The present invention relates generally to digital video signal processing and, in particular, to a method, apparatus and system for encoding and decoding a block of video samples. The present invention also relates to a computer program product including a computer readable medium having recorded thereon a computer program for encoding and decoding a block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of Study Group 16, Question 6 (SG16/Q6) of the Telecommunication Standardisation Sector (ITU-T) of the International Telecommunication Union (ITU), also known as the "Video Coding Experts Group" (VCEG), and members of the International Organisations for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) issued a Call for Proposals (CfP), with responses analysed at its $10^{th}$ meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. Use cases such as immersive video necessitate real-time encoding and decoding of such higher formats, for example cube-map projection (CMP) may use an 8K format even though a final rendered 'viewport' utilises a lower resolution. VVC must be implementable in contemporary silicon processes and offer an acceptable trade-off between the achieved performance versus the implementation cost. The implementation cost can be considered for example, in terms of one or more of silicon area, CPU processor load, memory utilisation and bandwidth. Higher video formats may be processed by dividing the frame area into sections and processing each section in parallel. A bitstream constructed from multiple sections of the compressed frame that is still suitable for decoding by a "single-core" decoder, i.e., frame-level constraints, including bit-rate, are apportioned to each section according to application needs.

Video data includes a sequence of frames of image data, each frame including one or more colour channels. Generally, one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Due to the use of a decorrelated YCbCr signal, the statistics of the luma channel differ markedly from those of the chroma channels. A primary difference is that after quantisation, the chroma channels contain relatively few significant coefficients for a given block compared to the coefficients for a corresponding luma channel block. Moreover, the Cb and Cr channels may be sampled spatially at a lower rate (subsampled) compared to the luma channel, for example half horizontally and half vertically—known as a '4:2:0 chroma format'. The 4:2:0 chroma format is commonly used in 'consumer' applications, such as internet video streaming, broadcast television, and storage on Blu-Ray™ disks. Subsampling the Cb and Cr channels at half-rate horizontally and not subsampling vertically is known as a '4:2:2 chroma format'. The 4:2:2 chroma format is typically used in professional applications, including capture of footage for cinematic production and the like. The higher sampling rate of the 4:2:2 chroma format makes the resulting video more resilient to editing operations such as colour grading. Prior to distribution to consumers, 4:2:2 chroma format material is often converted to the 4:2:0 chroma format and then encoded for distribution to consumers. In addition to chroma format, video is also characterised by resolution and frame rate. Example resolutions are ultra-high definition (UHD) with a resolution of 3840×2160 or '8K' with a resolution of 7680×4320 and example frame rates are 60 or 120 Hz. Luma sample rates may range from approximately 500 mega samples per second to several giga samples per second. For the 4:2:0 chroma format, the sample rate of each chroma channel is one quarter the luma sample rate and for the 4:2:2 chroma format, the sample rate of each chroma channel is one half the luma sample rate.

The VVC standard is a 'block based' codec, in which frames are firstly divided into a square array of regions known as 'coding tree units' (CTUs). Where a frame is not integer divisible into CTUs the CTUs along the left and bottom edge may be truncated in size to match the frame size. CTUs generally occupy a relatively large area, such as 128×128 luma samples. However, CTUs at the right and bottom edge of each frame may be smaller in area. Associated with each CTU is a 'coding tree' which may be a single tree for both the luma channel and the chroma channels (a 'shared tree') and may include 'forks' into separate trees (or 'dual trees') each for the luma channel and the chroma channels. A coding tree defines a decomposition of the area of the CTU into a set of blocks, also referred to as 'coding units' (CUs). The CBs are processed for encoding or decoding in a particular order. Separate coding trees for luma and chroma generally commence at the 64×64 luma sample granularity, above this a shared tree exists. As a consequence of the use of the 4:2:0 chroma format, a separate coding tree structure commencing at 64×64 luma sample granularity includes a collocated chroma coding tree with 32×32 chroma sample area. The designation 'unit' indicates applicability across all colour channels of the coding tree from which the block is derived. A single coding tree results in coding units having a luma coding block and two chroma coding blocks. The luma branch of a separate coding tree results in a coding units, each having a luma coding block, and the chroma branch of a separate coding tree results in a coding units, each having a pair of chroma blocks. The above-mentioned CUs are also associated with 'prediction units' (PUs), and 'transform units' (TUs), each of which apply to all colour channels of the coding tree from which the CU is derived. Similarly, coding blocks are associated with prediction blocks (PBs) and transform blocks (TBs), each of which apply to a single colour channel. A single tree with CUs spanning the colour channels of 4:2:0 chroma format video data result in chroma coding blocks having half the width and height of the corresponding luma coding blocks.

Notwithstanding the above distinction between 'units' and 'blocks', the term 'block' may be used as a general term for areas or regions of a frame for which operations are applied to all colour channels.

For each CU a 'prediction unit' (or 'PU') of the contents (sample values) of the corresponding area of frame data is generated. Further, a representation of the difference (or 'spatial domain' residual) between the prediction and the contents of the area as seen at input to the encoder is formed. The difference in each colour channel may be transformed and coded as a sequence of residual coefficients, forming one or more TUs for a given CU. The applied transform may be a Discrete Cosine Transform (DCT) or other transform, applied to each block of residual values. This transform is applied separably, that is the two-dimensional transform is performed in two passes. The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream. An additional non-separable transform stage may also be applied. Finally, transform application may be bypassed.

VVC features an intra-frame prediction and inter-frame prediction. Intra-frame prediction involves the use of previously processed samples in a frame being used to generate a prediction of a current block of samples in the frame. Inter-frame prediction involves generating a prediction of a current block of samples in a frame using a block of samples obtained from a previously decoded frame. The block of samples obtained from a previously decoded frame is offset from the spatial location of the current block according to a motion vector, which often has filtering being applied. Intra-frame prediction blocks can be (i) a uniform sample value ("DC intra prediction"), (ii) a plane having an offset and horizontal and vertical gradient ("planar intra prediction"), (iii) a population of the block with neighbouring samples applied in a particular direction ("angular intra prediction") or (iv) the result of a matrix multiplication using neighbouring samples and selected matrix coefficients. Further discrepancy between a predicted block and the corresponding input samples may be corrected to an extent by encoding a 'residual' into the bitstream. The residual is generally transformed from the spatial domain to the frequency domain to form residual coefficients (in a 'primary transform' domain), which may be further transformed by application of a 'secondary transform' (to produce residual coefficients in a 'secondary transform domain'). Residual coefficients are quantised according to a quantisation parameter, resulting in a loss of accuracy of the reconstruction of the samples produced at the decoder but with a reduction in bitrate in the bitstream.

The quantisation parameter may vary from frame to frame and within each frame. Varying the quantisation parameter within a frame is typical for 'rate controlled' encoders. Rate controlled encoders attempt to produce a bitstream with a substantially constant bitrate regardless of the statistics of the received input samples, such as noise properties, degree of motion. Since bitstreams are typically conveyed over networks with limited bandwidth, rate control is a widespread technique to ensure reliable performance over a network regardless of variation of the original frames input to an encoder. Where frames are encoded in parallel sections, flexibility in usage of rate control is desirable, as different sections may have different requirements in terms of desired fidelity.

Implementation costs, for example any of memory usage, level of accuracy, and efficiency of communication and the like are also important.

SUMMARY

It is an object of the present invention to substantially overcome, or at least ameliorate, one or more disadvantages of existing arrangements.

One aspect of the present disclosure provides a method of decoding a coding unit of a coding tree from a coding tree unit of an image frame from a video bitstream, the coding unit having a luma colour channel and at least one chroma colour channel, the method comprising: decoding a luma transform skip flag from the video bitstream for a luma transform block of the coding unit; decoding at least one chroma transform skip flag from the video bitstream, each decoded chroma transform skip flag corresponding to one of at least one chroma transform block of the coding unit; determining a secondary transform index, the determining comprising: determining the secondary transform index to indicate that a secondary transform is not to be applied if all of the luma transform skip flag and chroma transform skip flags indicate transforms of the respective transform blocks are to be skipped, and decoding the secondary transform index from the video bitstream if all of the luma transform skip flag and the chroma transform skip flags indicate that transforms of the respective transform blocks are not to be skipped; transforming the luma transform block and the at least one chroma transform blocks according to the decoded luma transform skip flag, the at least one chroma transform skip flags, and the determined secondary transform index to produce residual samples for each transform block of the coding unit; and decoding the coding unit by combining the residual samples for each transform block of the coding unit and a prediction block for each block of the coding unit, each prediction block being generated according to a prediction mode of the coding unit.

Another aspect of the present disclosure provides a non-transitory computer readable medium having a computer program stored thereon to implement a method of decoding a coding unit from a coding tree unit of an image frame from a video bitstream, the coding unit having a luma colour channel and at least one chroma colour channel, the method comprising: decoding a luma transform skip flag from the video bitstream for a luma transform block of the coding unit; decoding at least one chroma transform skip flag from the video bitstream, each decoded chroma transform skip flag corresponding to one of at least one chroma transform block of the coding unit; determining a secondary transform index, the determining comprising: determining the second-ary transform index to indicate that a secondary transform is not to be applied if all of the luma transform skip flag and chroma transform skip flags indicate transforms of the respective transform blocks are to be skipped, and decoding the secondary transform index from the video bitstream if all of the luma transform skip flag and the chroma transform skip flags indicate that transforms of the respective trans-form blocks are not to be skipped; transforming the luma transform block and the at least one chroma transform blocks according to the decoded luma transform skip flag, the at least one chroma transform skip flags, and the deter-mined secondary transform index to produce residual samples for each transform block of the coding unit; and decoding the coding unit by combining the residual samples for each transform block of the coding unit and a prediction block for each block of the coding unit, each prediction block being generated according to a prediction mode of the coding unit.

Another aspect of the present disclosure provides a sys-tem, comprising: a memory; and a processor, wherein the processor is configured to execute code stored on the memory for implementing a method of decoding a coding unit from a coding tree unit of an image frame from a video bitstream, the coding unit having a luma colour channel and at least one chroma colour channel, the method comprising: decoding a luma transform skip flag from the video bitstream for a luma transform block of the coding unit; decoding at least one chroma transform skip flag from the video bitstream, each decoded chroma transform skip flag corresponding to one of at least one chroma transform block of the coding unit; determining a secondary transform index, the determining compris-ing: determining the secondary transform index to indicate that a secondary transform is not to be applied if all of the luma transform skip flag and chroma transform skip flags indicate transforms of the respec-tive transform blocks are to be skipped, and decoding the secondary transform index from the video bitstream if all of the luma transform skip flag and the chroma transform skip flags indicate that transforms of the respective transform blocks are not to be skipped; transforming the luma transform block and the at least one chroma transform blocks according to the decoded luma transform skip flag, the at least one chroma transform skip flags, and the determined secondary transform index to produce residual samples for each transform block of the coding unit; and decoding the coding unit by combining the residual samples for each transform block of the coding unit and a prediction block for each block of the coding unit, each prediction block being generated according to a prediction mode of the coding unit.

Another aspect of the present disclosure provides a video decoder, configured to: receive an image frame from a video bitstream; determine a coding unit of a coding tree from a coding tree unit of the image frame, the coding unit having a luma colour channel and at least one chroma colour channel; decoding a luma transform skip flag from the video bitstream for a luma transform block of the coding unit; decoding at least one chroma transform skip flag from the video bitstream, each decoded chroma transform skip flag corresponding to one of at least one chroma transform block of the coding unit; determining a secondary transform index, the determining comprising: determining the secondary transform index to indicate that a secondary transform is not to be applied if all of the luma transform skip flag and chroma transform skip flags indicate transforms of the respective transform blocks are to be skipped, and decoding the secondary transform index from the video bitstream if all of the luma transform skip flag and the chroma transform skip flags indicate that transforms of the respective trans-form blocks are not to be skipped; transforming the luma transform block and the at least one chroma transform blocks according to the decoded luma transform skip flag, the at least one chroma transform skip flags, and the deter-mined secondary transform index to produce residual samples for each transform block of the coding unit; and decoding the coding unit by combining the residual samples for each transform block of the coding unit and a prediction block for each block of the coding unit, each prediction block being generated according to a prediction mode of the coding unit.

One aspect of the present invention provides a method a of decoding coding unit from a coding tree unit of an image frame from a video bitstream, the method comprising: determining a scan pattern for a transform block of the coding unit, wherein the scan pattern traverses the transform block by progressing through a plurality of non-overlapping collections of sub-blocks of residual coefficients, the scan pattern progressing from a current collection to a next collection of the plurality of collections after completing scanning of the current collection; decoding residual coef-ficients from the video bitstream according to the deter-mined scan pattern; determining a multiple transform selec-tion index for the coding unit, the determining comprising: decoding the multiple transform selection index from the video bitstream if a last significant coefficient encountered along the scan pattern is at or within a threshold cartesian location of the transform block, and determining the mul-tiple transform selection index to indicate that multiple transform selection is not used if the last significant residual coefficient position of the transform block along the scan pattern outside the threshold cartesian location; and trans-forming the decoded residual coefficients by applying a transform according to the multiple transform selection index to decode the coding unit.

According to another aspect, the selected scan pattern scans residual coefficients in each sub-block in a backward diagonal manner.

According to another aspect, the selected scan pattern scans sub-blocks in each collection in a backward diagonal manner.

According to another aspect, the selected scan pattern scans the collections in a backward diagonal manner.

According to another aspect, the selected scan pattern scans the collections in a backward raster manner.

According to another aspect, the multiple transform selection index being zero indicates application of a DCT-2 inverse transform horizontally and vertically.

According to another aspect, the multiple transform selection index being greater than zero indicates one of DST-7 or DCT-8 inverse transforms to be applied horizontally and one of DST-7 or DCT-8 inverse transforms to be applied vertically.

According to another aspect, each collection is a two-dimensional array of sub-blocks having a width and height of at most four sub-blocks.

Another aspect of the present invention provides a non-transitory computer readable medium having a computer program stored thereon to implement a method of decoding a coding unit from a coding tree unit of an image frame from a video bitstream, the method comprising: determining a scan pattern for a transform block of the coding unit, wherein the scan pattern traverses the transform block by progressing through a plurality of non-overlapping collections of sub-blocks of residual coefficients, the scan pattern progressing from a current collection to a next collection of the plurality of collections after completing scanning of the current collection; decoding residual coefficients from the video bitstream according to the determined scan pattern; determining a multiple transform selection index for the coding unit, the determining comprising: decoding the multiple transform selection index from the video bitstream if a last significant coefficient encountered along the scan pattern is at or within a threshold cartesian location of the transform block, and determining the multiple transform selection index to indicate that multiple transform selection is not used if the last significant residual coefficient position of the transform block along the scan pattern outside the threshold cartesian location; and transforming the decoded residual coefficients by applying a transform according to the multiple transform selection index to decode the coding unit.

Another aspect of the present invention provides a system, comprising: a memory; and a processor, wherein the processor is configured to execute code stored on the memory for implementing a method of decoding a coding unit from a coding tree unit of an image frame from a video bitstream, the method comprising: determining a scan pattern for a transform block of the coding unit, wherein the scan pattern traverses the transform block by progressing through a plurality of non-overlapping collections of sub-blocks of residual coefficients, the scan pattern progressing from a current collection to a next collection of the plurality of collections after completing scanning of the current collection; decoding residual coefficients from the video bitstream according to the determined scan pattern; determining a multiple transform selection index for the coding unit, the determining comprising: decoding the multiple transform selection index from the video bitstream if a last significant coefficient encountered along the scan pattern is at or within a threshold cartesian location of the transform block, and determining the multiple transform selection index to indicate that multiple transform selection is not used if the last significant residual coefficient position of the transform block along the scan pattern outside the threshold cartesian location; and transforming the decoded residual coefficients by applying a transform according to the multiple transform selection index to decode the coding unit.

Another aspect of the present invention provides a video decoder, configured to: receive an image frame from a bitstream; determine a coding unit of a coding tree from a coding tree unit of the image frame; determine a scan pattern for a transform block of the coding unit, wherein the scan pattern traverses the transform block by progressing through a plurality of non-overlapping collections of sub-blocks of residual coefficients, the scan pattern progressing from a current collection to a next collection of the plurality of collections after completing scanning of the current collection; decode residual coefficients from the video bitstream according to the determined scan pattern; determine a multiple transform selection index for the coding unit, the determining comprising: decoding the multiple transform selection index from the video bitstream if a last significant coefficient encountered along the scan pattern is at or within a threshold cartesian location of the transform block, and determining the multiple transform selection index to indicate that multiple transform selection is not used if the last significant residual coefficient position of the transform block along the scan pattern outside the threshold cartesian location; and transform the decoded residual coefficients by applying a transform according to the multiple transform selection index to decode the coding unit.

Another aspect of the present invention provides a method of decoding a coding unit of a coding tree from a coding tree unit of an image frame from a video bitstream, the coding unit having a luma colour channel and at least one chroma colour channel, the method comprising: decoding a luma transform skip flag from the video bitstream for a luma transform block of the coding unit; decoding at least one chroma transform skip flag from the video bitstream, each decoded chroma transform skip flag corresponding to one of at least one chroma transform block of the coding unit; determining a secondary transform index, the determining comprising: decoding a secondary transform index from the video bitstream if at least one of the luma transform skip flag and the at least one chroma transform skip flags indicates that a transform of the respective transform block is not to be skipped, and determining the secondary transform index to indicate that a secondary transform is not to be applied if all of the luma transform skip flag and the at least one chroma transform skip flags indicate transforms of the respective transform blocks are to be skipped; and transforming the luma transform block and the at least one chroma transform blocks according to the decoded luma transform skip flag, the at least one chroma transform skip flags, and the determined secondary transform index to decode the coding unit.

Another aspect of the present invention provides a method of decoding a coding unit of a coding tree from a coding tree unit of an image frame from a video bitstream, the coding unit having at least one chroma colour channel, the method comprising: decoding at least one chroma transform skip flag from the video bitstream, each chroma transform skip flag corresponding to one of at least one chroma transform block of the coding unit; determining a secondary transform index for the at least one chroma transform block of the coding unit, the determining comprising: decoding the secondary transform index from the video bitstream if any of the at least one chroma transform skip flags indicates a transform is to be applied to the respective chroma transform block, and determining the secondary transform index to indicate that a secondary transform is not to be applied if all of the chroma transform skip flags indicate transforms of the respective transform blocks are to be skipped; and transforming each of the at least one chroma transform blocks according to the respective chroma transform skip flag, and the determined secondary transform index to decode the coding unit.

Another aspect of the present invention provides a non-transitory computer readable medium having a computer program stored thereon to implement a method of decoding a coding unit of a coding tree from a coding tree unit of an image frame from a video bitstream, the coding unit having a luma colour channel and at least one chroma colour channel, the method comprising: decoding a luma transform skip flag from the video bitstream for a luma transform block of the coding unit; decoding at least one chroma transform skip flag from the video bitstream, each decoded chroma transform skip flag corresponding to one of at least one chroma transform block of the coding unit; determining a secondary transform index, the determining comprising: decoding a secondary transform index from the video bitstream if at least one of the luma transform skip flag and the at least one chroma transform skip flags indicates that a transform of the respective transform block is not to be skipped, and determining the secondary transform index to indicate that a secondary transform is not to be applied if all of the luma transform skip flag and the at least one chroma transform skip flags indicate transforms of the respective transform blocks are to be skipped; and transforming the luma transform block and the at least one chroma transform blocks according to the decoded luma transform skip flag, the at least one chroma transform skip flags, and the determined secondary transform index to decode the coding unit.

Another aspect of the present invention provides a system, comprising: a memory; and a processor, wherein the processor is configured to execute code stored on the memory for implementing a method of decoding a coding unit of a coding tree from a coding tree unit of an image frame from a video bitstream, the coding unit having at least one chroma colour channel, the method comprising: decoding at least one chroma transform skip flag from the video bitstream, each chroma transform skip flag corresponding to one of at least one chroma transform block of the coding unit; determining a secondary transform index for the at least one chroma transform block of the coding unit, the determining comprising: decoding the secondary transform index from the video bitstream if any of the at least one chroma transform skip flags indicates a transform is to be applied to the respective chroma transform block, and determining the secondary transform index to indicate that a secondary transform is not to be applied if all of the one or more chroma transform skip flags indicate transforms of the respective transform blocks are to be skipped; and transforming each of the at least one chroma transform blocks according to the respective chroma transform skip flag, and the determined secondary transform index to decode the coding unit.

Another aspect of the present invention provides a video decoder, configured to: receive an image frame from a bitstream; determine a coding unit of a coding tree from a coding tree unit of the image frame, the coding unit having a luma colour channel and at least one chroma colour channel; decode a luma transform skip flag from the video bitstream for a luma transform block of the coding unit; decode at least one chroma transform skip flag from the video bitstream, each decoded chroma transform skip flag corresponding to one of at least one chroma transform block of the coding unit; determine a secondary transform index, the determining comprising: decoding a secondary transform index from the video bitstream if at least one of the luma transform skip flag and the at least one chroma transform skip flags indicates that a transform of the respective transform block is not to be skipped, and determining the secondary transform index to indicate that a secondary transform is not to be applied if all of the luma transform skip flag and the at least one chroma transform skip flags indicate transforms of the respective transform blocks are to be skipped; and transform the luma transform block and the at least one chroma transform blocks according to the decoded luma transform skip flag, the at least one chroma transform skip flags, and the determined secondary transform index to decode the coding unit.

Other aspects are also disclosed.

BRIEF DESCRIPTION OF THE DRAWINGS

At least one embodiment of the present invention will now be described with reference to the following drawings and appendices, in which.

DETAILED DESCRIPTION INCLUDING BEST MODE

Figure 1:
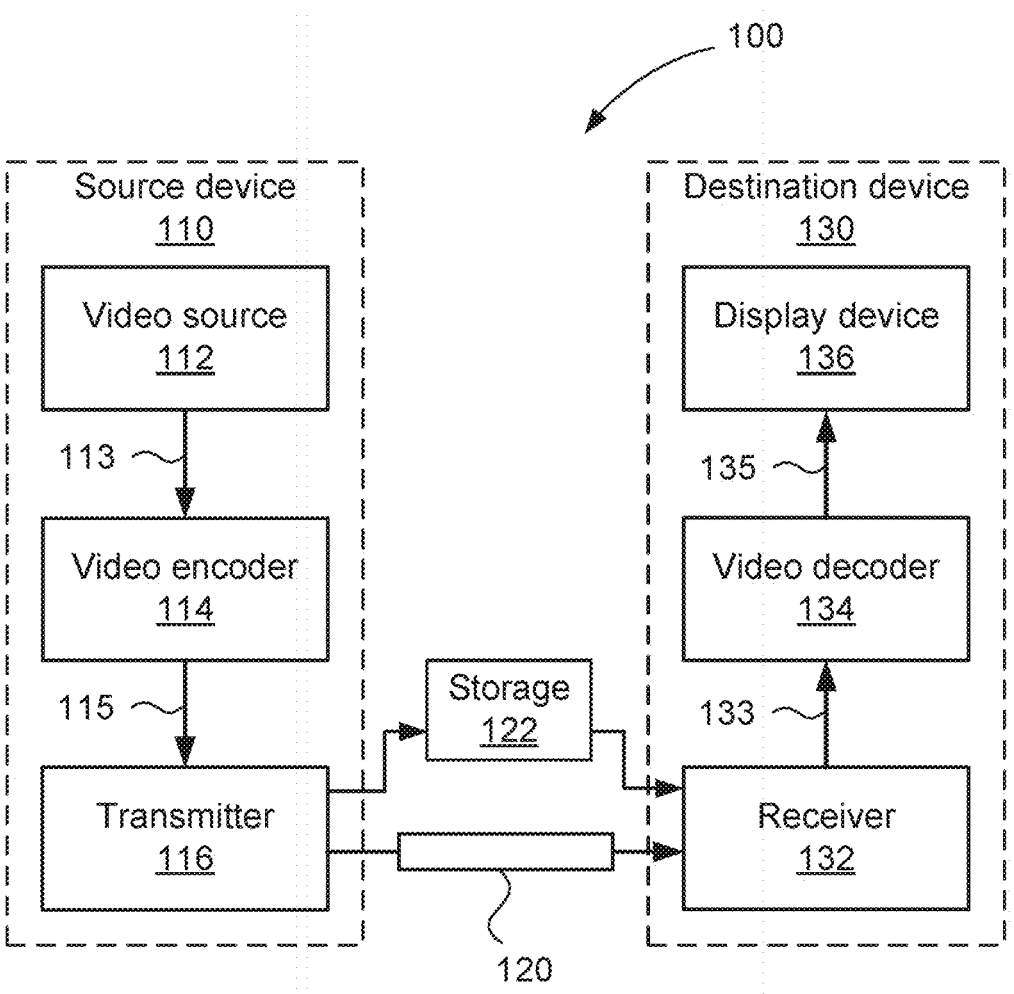
FIG. 1 is a schematic block diagram showing a video encoding and decoding system.

Where reference is made in any one or more of the accompanying drawings to steps and/or features, which have the same reference numerals, those steps and/or features have for the purposes of this description the same function (s) or operation(s), unless the contrary intention appears.

The syntax of the bitstream format of a video compression standard is defined as a hierarchy of 'syntax structures'. Each syntax structure defines a set of syntax elements, some of which may be conditional on others. Compression efficiency is improved when the syntax only allows combinations of syntax elements that correspond to useful combinations of tools. Additionally, complexity is also reduced by prohibiting combinations of syntax elements that, although possible for implementation, are deemed to offer insufficient compression advantage for the resulting implementation cost.

FIG. 1 is a schematic block diagram showing functional modules of a video encoding and decoding system 100. The system 100 signals primary and secondary transform parameters such that compression efficiency gain is achieved.

The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or "smartphones", in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example displaying the video output of an operating system and various applications executing upon a computing device, for example a tablet computer. Examples of source devices 110 that may include an image capture sensor as the video source 112 include smart-phones, video camcorders, professional video cameras, and network video cameras.

Figure 3:
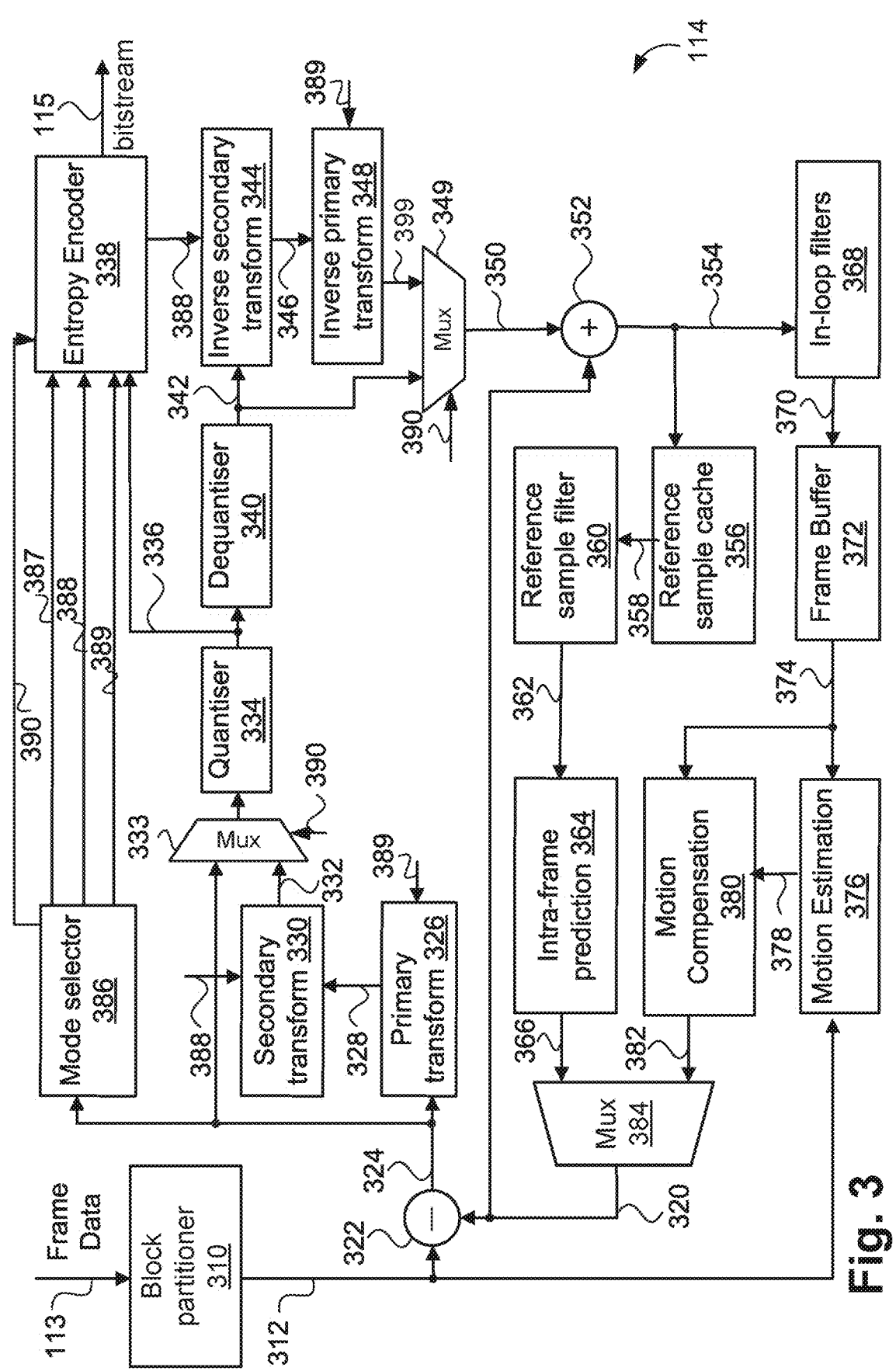
FIG. 3 is a schematic block diagram showing functional modules of a video encoder.

The video encoder 114 converts (or 'encodes') the captured frame data (indicated by an arrow 113) from the video source 112 into a bitstream (indicated by an arrow 115) as described further with reference to FIG. 3. The bitstream 115 is transmitted by the transmitter 116 over the communication channel 120 as encoded video data (or "encoded video information"). It is also possible for the bitstream 115 to be stored in a non-transitory storage device 122, such as a "Flash" memory or a hard disk drive, until later being transmitted over the communication channel 120, or in-lieu of transmission over the communication channel 120. For example, encoded video data may be served upon demand to customers over a wide area network (WAN) for a video streaming application.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data (indicated by an arrow 135) to the display device 136. The decoded frame data 135 has the same chroma format as the frame data 113. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers. Decoded frame data may be further transformed before presentation to a user. For example, a 'viewport' having a particular latitude and longitude may be rendered from decoded frame data using a projection format to represent a 360° view of a scene.

Figure 2A:
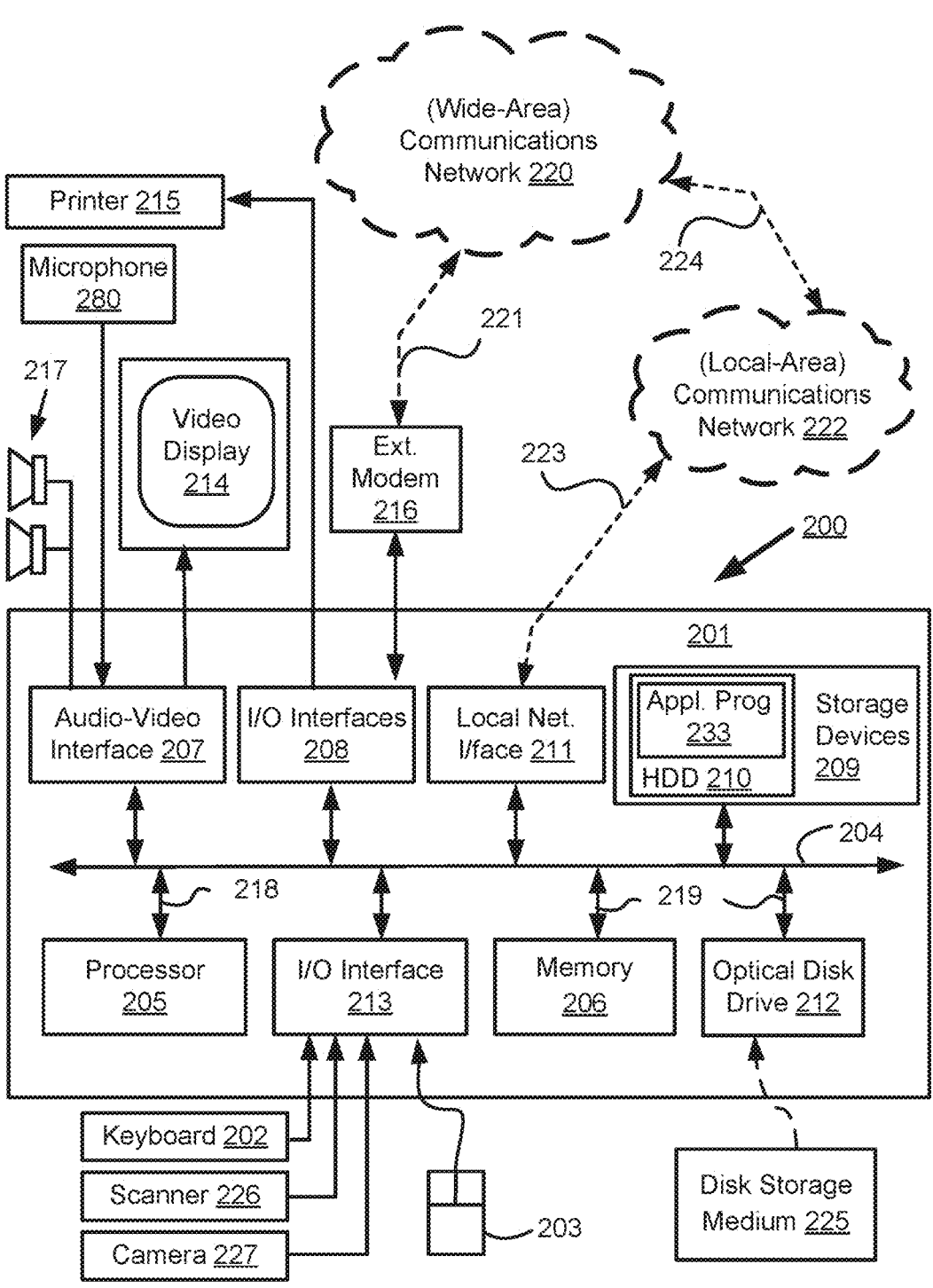
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used.

An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200. In particular, the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
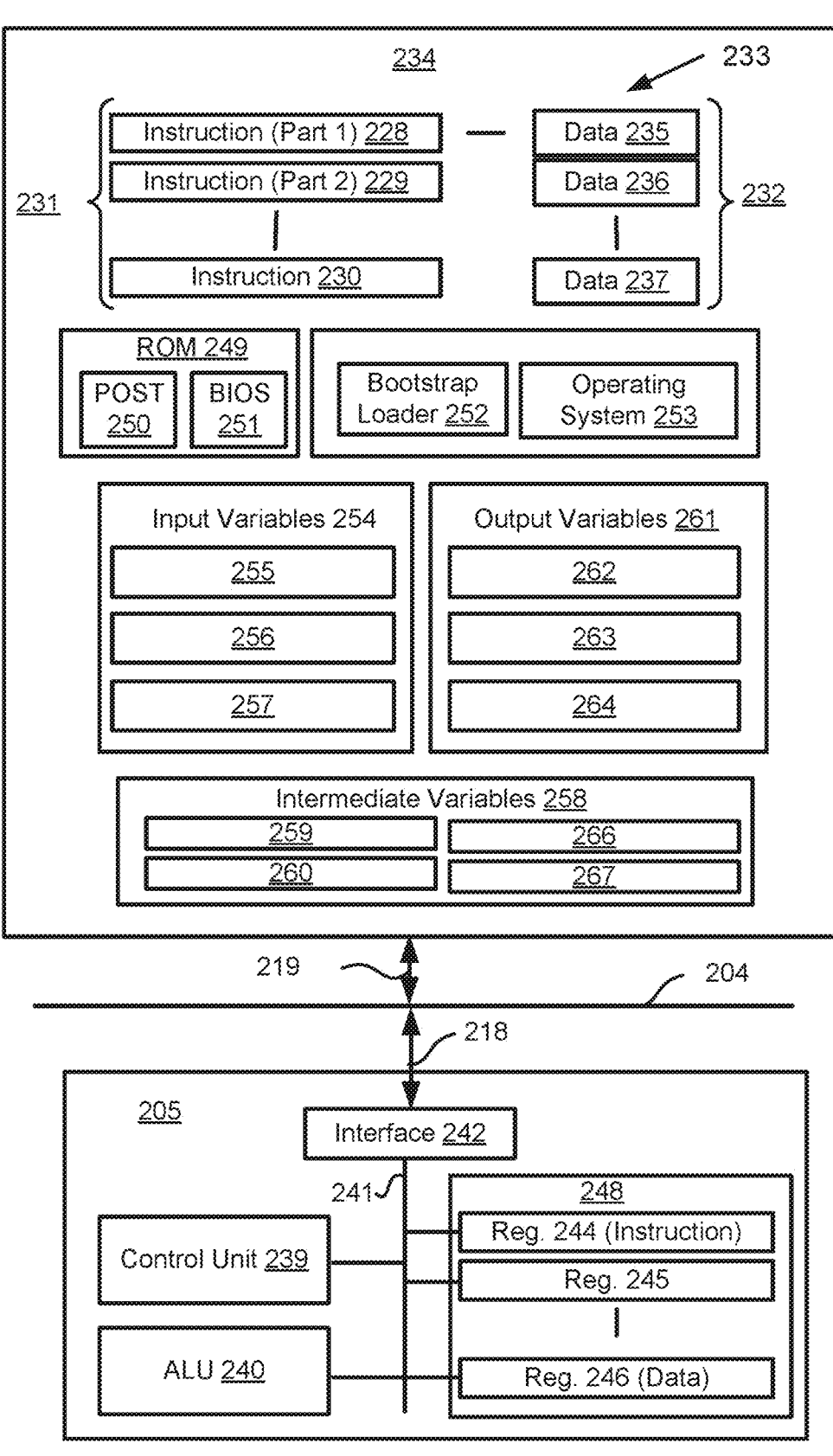

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the method of FIGS. 13 to 16, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 4:
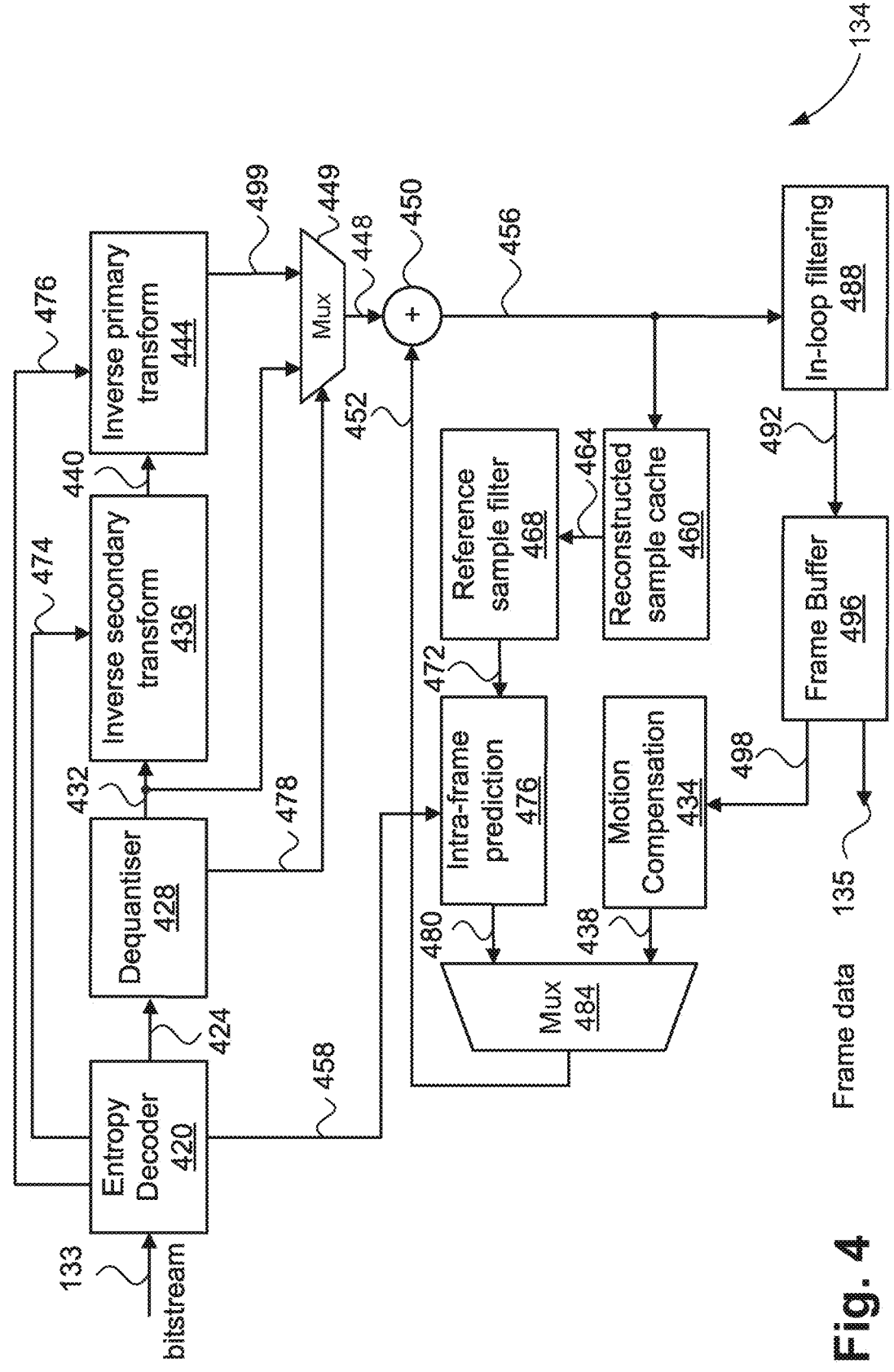
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively, the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 310-386 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. The frame data 113 includes two-dimensional arrays of luma ('luma channel') and chroma ('chroma channel') samples arranged in a 'chroma format', for example 4:0:0, 4:2:0, 4:2:2, or 4:4:4 chroma format. A block partitioner 310 firstly divides the frame data 113 into CTUs, generally square in shape and configured such that a particular size for the CTUs is used. The size of the CTUs may be 64×64, 128×128, or 256×256 luma samples for example.

The block partitioner 310 further divides each CTU into one or more CUs according to either a shared coding tree or to a luma coding tree and a chroma coding tree at a point where a shared coding tree splits into luma and chroma branches. The luma channel may also be referred to as a primary colour channel. Each chroma channel may also be referred to as a secondary colour channel. The CUs have a variety of sizes, and may include both square and non-square aspect ratios. Operation of the block partitioner 310 is further described with reference to FIGS. 13 and 14. However, in the VVC standard, CUs/CBs, PUs/PBs, and TUs/TBs always have side lengths that are powers of two. Thus, a current CU, represented as 312, is output from the block partitioner 310, progressing in accordance with an iteration over the one or more blocks of the CTU, in accordance with the shared tree or the luma coding tree and the chroma coding tree of the CTU. Options for partitioning CTUs into CBs are further described below with reference to FIGS. 5 and 6.

The CTUs resulting from the first division of the frame data 113 may be scanned in raster scan order and may be grouped into one or more 'slices'. A slice may be an 'intra' (or 'I') slice. An intra slice (I slice) contains no inter-predicted CUs, e.g. intra prediction is used only. Alternatively, a slice may be uni- or bi-predicted ('P' or 'B' slice, respectively), indicating additional availability of one or two reference blocks for predicting a CU, known as 'uni-prediction' and 'bi-prediction', respectively.

In an I slice, the coding tree of each CTU may diverge below the 64×64 level into two separate coding trees, one for luma and another for chroma. Use of separate trees allows different block structure to exist between luma and chroma within a luma 64×64 area of a CTU. For example, a large chroma CB may be collocated with numerous smaller luma CBs and vice versa. In a P or B slice, a single coding tree of a CTU defines a block structure common to luma and chroma. The resulting blocks of the single tree may be intra predicted or inter predicted.

For each CTU, the video encoder 114 operates in two stages. In the first stage (referred to as a 'search' stage), the block partitioner 310 tests various potential configurations of a coding tree. Each potential configuration of a coding tree has associated 'candidate' CUs. The first stage involves testing various candidate CUs to select CUs providing relatively high compression efficiency with relatively low distortion. The testing generally involves a Lagrangian optimisation whereby a candidate CU is evaluated based on a weighted combination of the rate (coding cost) and the distortion (error with respect to the input frame data 113). The 'best' candidate CUs (the CUs with the lowest evaluated rate/distortion) are selected for subsequent encoding into the bitstream 115. Included in evaluation of candidate CUs is an option to use a CU for a given area or to further split the area according to various splitting options and code each of the smaller resulting areas with further CUs, or split the areas even further. As a consequence, both the coding tree and the CUs themselves are selected in the search stage.

The video encoder 114 produces a prediction block (PU), indicated by an arrow 320, for each CU, for example the CU 312. The PU 320 is a prediction of the contents of the associated CU 312. A subtracter module 322 produces a difference, indicated as 324 (or 'residual', referring to the difference being in the spatial domain), between the PU 320 and the CU 312. The difference 324 is a block-sized array of differences between corresponding samples in the PU 320 and the CU 312 and is produced for each colour channel of the CU 312. When primary and (optionally) secondary transforms are to be performed, the difference 324 is transformed in the modules 326 and 330 to be passed to a quantiser module 334 for quantisation via a multiplexer 333. When the transform is to be skipped, the difference 324 is passed directly to the quantiser module 334 for quantisation via the multiplexer 333. The selection between transform and transform skip is independently made for each TB associated with the CU 312. The resulting quantised residual coefficients are represented as a TB (for each colour channel of the CU 312), indicated by an arrow 336. The PU 320 and associated TB 336 are typically chosen from one of many possible candidate CUs, for example based on evaluated cost or distortion.

A candidate CU is a CU resulting from one of the prediction modes available to the video encoder 114 for the associated PB and the resulting residual. When combined with the predicted PB in the video decoder 134, addition of the TB 336 after conversion back to the spatial domain reduces the difference between a decoded CU and the original CU 312, at the expense of additional signalling in a bitstream.

Each candidate coding block (CU), that is prediction block (PU) in combination with one transform block (TB) per colour channel of the CU, thus has an associated coding cost (or 'rate') and an associated difference (or 'distortion'). The distortion of the CU is typically estimated as a difference in sample values, such as a sum of absolute differences (SAD) or a sum of squared differences (SSD). The estimate resulting from each candidate PU may be determined by a mode selector 386 using the difference 324 to determine a prediction mode 387. The prediction mode 387 indicates the decision to use a particular prediction mode for the current CU, for example intra-frame prediction or inter-frame prediction. For intra-predicted CUs belonging to a shared coding tree, independent intra prediction modes are specified for the luma PB vs the chroma PBs. For intra-predicted CUs belonging to luma or chroma branches of a dual coding tree, one intra prediction mode applies to the luma PB or the chroma PBs, respectively. Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense even in a real-time video encoder.

Lagrangian or similar optimisation processing can be employed to both select an optimal partitioning of a CTU into CBs (by the block partitioner 310) as well as the selection of a best prediction mode from a plurality of possible prediction modes. Through application of a Lagrangian optimisation process of the candidate modes in the mode selector module 386, the intra prediction mode 387, a secondary transform index 388, and a primary transform type 389, and transform skip flags 390 (one for each TB) with the lowest cost measurement is selected.

In the second stage of operation of the video encoder 114 (referred to as a 'coding' stage), an iteration over the determined coding tree(s) of each CTU is performed in the video encoder 114. For a CTU using separate trees, for each 64×64 luma region of the CTU, a luma coding tree is firstly encoded followed by a chroma coding tree. Within the luma coding tree only luma CBs are encoded and within the chroma coding tree only chroma CBs are encoded. For a CTU using a shared tree, a single tree describes the CUs, i.e., the luma CBs and the chroma CBs according to the common block structure of the shared tree.

The entropy encoder 338 supports both variable-length coding of syntax elements and arithmetic coding of syntax elements. Portions of the bitstream such as 'parameter sets', for example a sequence parameter set (SPS), a picture parameter set (PPS), and a picture header (PH) use a combination of fixed-length codewords and variable-length codewords. Slices (also referred to as contiguous portions) have a slice header that uses variable length coding followed by slice data, which uses arithmetic coding. The picture header defines parameters specific to the current slice, such as picture-level quantisation parameter offsets. The slice data includes the syntax elements of each CTU in the slice. Use of variable length coding and arithmetic coding requires sequential parsing within each portion of the bitstream. The portions may be delineated with a start code to form 'network abstraction layer units' or 'NAL units'. Arithmetic coding is supported using a context-adaptive binary arithmetic coding process. Arithmetically coded syntax elements consist of sequences of one or more 'bins'. Bins, like bits, have a value of '0' or '1'. However, bins are not encoded in the bitstream 115 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits in the bitstream 115, including costs that amount to less than one discrete bit. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (that is, a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context can be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the video encoder 114 are bins that lack a context ('bypass bins'). Bypass bins are coded assuming an equiprobable distribution between a '0' and a '1'. Thus, each bin has a coding cost of one bit in the bitstream 115. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 338 encodes the primary transform type 389, one transform skip flag (i.e., 390) for each TB of the current CU and, if applicable to the current CU, the secondary transform index 388, using a combination of context-coded and bypass-coded bins, and the intra prediction mode 387. The secondary transform index 388 is signalled when the residual associated with the transform block includes significant residual coefficients only in those coefficient positions subject to transforming into primary coefficients by application of a secondary transform.

A multiplexer module 384 outputs the PB 320 from an intra-frame prediction module 364 according to the determined best intra prediction mode, selected from the tested prediction mode of each candidate CB. The candidate prediction modes need not include every conceivable prediction mode supported by the video encoder 114. Intra prediction falls into three types. "DC intra prediction" involves populating a PB with a single value representing the average of nearby reconstructed samples. "Planar intra prediction" involves populating a PB with samples according to a plane, with a DC offset and a vertical and horizontal gradient being derived from the nearby reconstructed neighbouring samples. The nearby reconstructed samples typically include a row of reconstructed samples above the current PB, extending to the right of the PB to an extent and a column of reconstructed samples to the left of the current PB, extending downwards beyond the PB to an extent. "Angular intra prediction" involves populating a PB with reconstructed neighbouring samples filtered and propagated across the PB in a particular direction (or 'angle'). In VVC 65 angles are supported, with rectangular blocks able to utilise additional angles, not available to square blocks, to produce a total of 87 angles. A fourth type of intra prediction is available to chroma PBs, whereby the PB is generated from collocated luma reconstructed samples according to a 'cross-component linear model' (CCLM) mode. Three different CCLM modes are available, each mode using a different model derived from the neighbouring luma and chroma samples. The derived model is used to generate a block of samples for the chroma PB from the collocated luma samples.

Where previously reconstructed samples are unavailable, for example at the edge of the frame, a default half-tone value of one half the range of the samples is used. For example, for 10-bit video a value of 512 is used. As no previously samples are available for a CB located at the top-left position of a frame, angular and planar intra-prediction modes produce the same output as the DC prediction mode, i.e. a flat plane of samples having the half-tone value as magnitude.

For inter-frame prediction a prediction block 382 is produced using samples from one or two frames preceding the current frame in the coding order frames in the bitstream by a motion compensation module 380 and output as the PB 320 by the multiplexer module 384. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted. Frames are typically coded using a 'group of pictures' structure, enabling a temporal hierarchy of frames. Frames may be divided into multiple slices, each of which encodes a portion of the frame. A temporal hierarchy of frames allows a frame to reference a preceding and a subsequent picture in the order of displaying the frames. The images are coded in the order necessary to ensure the dependencies for decoding each frame are met.

The samples are selected according to a motion vector 378 and reference picture index. The motion vector 378 and reference picture index applies to all colour channels and thus inter prediction is described primarily in terms of operation upon PUs rather than PBs, i.e. the decomposition of each CTU into one or more inter-predicted blocks is described with a single coding tree. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a pre-determined motion refinement process may be applied to generate dense motion estimates based on referenced sample blocks.

Having determined and selected the PU 320, and subtracted the PU 320 from the original sample block at the subtractor 322, a residual with lowest coding cost, represented as 324, is obtained and subjected to lossy compression. The lossy compression process comprises the steps of transformation, quantisation and entropy coding. The forward primary transform module 326 applies a forward transform to the difference 324, converting the difference 324 from the spatial domain to the frequency domain, and producing primary transform coefficients represented by an arrow 328 according to the primary transform type 389. The largest primary transform size in one dimension is either a 32-point DCT-2 or a 64-point DCT-2 transform. If the CB being encoded is larger than the largest supported primary transform size expressed as a block size, i.e. 64×64 or 32×32, the primary transform 326 is applied in a tiled manner to transform all samples of the difference 324. Where each application of the transform operates on a TB of the difference 324 larger than 32×32, e.g. 64×64, all resulting primary transform coefficients 328 outside of the upper-left 32×32 area of the TB are set to zero, i.e. discarded. For TBs of sizes up to 32×32 the primary transform type 389 may indicate application of a combination of DST-7 and DCT-8 transforms horizontally and vertically. The remaining primary transform coefficients 328 are passed to a forward secondary transform module 330.

The secondary transform module 330 produces secondary transform coefficients 332 in accordance with the secondary transform index 388. The secondary transform coefficients 332 are quantised by the module 334 according to a quantisation parameter associated with the CB to produce residual coefficients 336. When the transform skip flag 390 indicates transform skip is enabled for a TB, the difference 324 is passed to the quantiser 334 via the multiplexer 333.

The forward primary transform of the module 326 is typically separable, transforming a set of rows and then a set of columns of each TB. The forward primary transform module 326 uses either a type-II discrete cosine transform (DCT-2) in the horizontal and vertical directions, or, for luma TBS, combinations of a type-VII discrete sine transform (DST-7) and a type-VIII discrete cosine transform (DCT-8) in either horizontal or vertical directions, according to the primary transform type 389. Use of combinations of a DST-7 and DCT-8 is referred to as 'multi transform selection set' (MTS) in the VVC standard. When DCT-2 is used the largest TB size is either 32×32 or 64×64, configurable in the video encoder 114 and signalled in the bitstream 115. Regardless of the configured maximum DCT-2 transform size, only coefficients in the upper-left 32×32 region of a TB are encoded into the bitstream 115. Any significant coefficients outside of the upper-left 32×32 region of the TB are discarded (or 'zeroed out') and are not encoded in the bitstream 115. MTS is only available for CUs of size up to 32×32 and only coefficients in the upper-left 16×16 region of the associated luma TB are coded. Individual TBs of the CU are either transformed or bypassed according to corresponding transform skip flags 390.

The forward secondary transform of the module 330 is generally a non-separable transform, which is only applied for the residual of intra-predicted CUs and may nonetheless also be bypassed. The forward secondary transform operates either on 16 samples (arranged as the upper-left 4×4 sub-block of the primary transform coefficients 328) or 48 samples (arranged as three 4×4 sub-blocks in the upper-left 8×8 coefficients of the primary transform coefficients 328) to produce a set of secondary transform coefficients. The set of secondary transform coefficients may be fewer in number than the set of primary transform coefficients from which they are derived. Due to application of the secondary transform to only a set of coefficients adjacent to each other and including the DC coefficient, the secondary transform is referred to as a 'low frequency non-separable secondary transform' (LFNST).

The residual coefficients 336 are supplied to the entropy encoder 338 for encoding in the bitstream 115. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. The scan within each sub-block and the progression from one sub-block to the next typically follow a backward diagonal scan pattern.

As described above, the video encoder 114 needs access to a frame representation corresponding to the decoded frame representation seen in the video decoder 134. Thus, the residual coefficients 336 are passed to a dequantiser 340 to produce dequantised residual coefficients 342. The dequantised residual coefficients 342 are passed through an inverse secondary transform module 344, operating in accordance with the secondary transform index 388 to produce intermediate inverse transform coefficients, represented by an arrow 346. The intermediate inverse transform coefficients 346 are passed to an inverse primary transform module 348 to produce residual samples, represented by an arrow 399, of the TU. The dequantised residual coefficients 342 are output by a multiplexer 349 as residual samples 350 if the transform skip 390 indicates the transform bypass is to be performed. Otherwise, the multiplexer 349 outputs the residual samples 399 as the residual samples 350.

The types of inverse transform performed by the inverse secondary transform module 344 correspond with the types of forward transform performed by the forward secondary transform module 330. The types of inverse transform performed by the inverse primary transform module 348 correspond with the types of primary transform performed by the primary transform module 326. A summation module 352 adds the residual samples 350 and the PU 320 to produce reconstructed samples (indicated by an arrow 354) of the CU.

The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by the intra-frame prediction module 364 to produce an intra-predicted block of samples, represented by an arrow 366. For each candidate intra prediction mode the intra-frame prediction module 364 produces a block of samples, that is 366. The block of samples 366 is generated by the module 364 using techniques such as DC, planar or angular intra prediction according to the intra prediction mode 387.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is an 'adaptive loop filter' (ALF), which applies a Wiener-based adaptive filter to further reduce distortion. A further available filtering stage in the in-loop filters module 368 is a 'sample adaptive offset' (SAO) filter. The SAO filter operates by firstly classifying reconstructed samples into one or multiple categories and, according to the allocated category, applying an offset at the sample level.

Filtered samples, represented by an arrow 370, are output from the in-loop filters module 368. The filtered samples 370 are stored in a frame buffer 372. The frame buffer 372 typically has the capacity to store several (for example up to 16) pictures and thus is stored in the memory 206. The frame buffer 372 is not typically stored using on-chip memory due to the large memory consumption required. As such, access to the frame buffer 372 is costly in terms of memory bandwidth. The frame buffer 372 provides reference frames (represented by an arrow 374) to a motion estimation module 376 and the motion compensation module 380.

The motion estimation module 376 estimates a number of 'motion vectors' (indicated as 378), each being a Cartesian spatial offset from the location of the present CB, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block ('uni-predicted') or may be formed using two reference blocks ('bi-predicted'). For the selected motion vector, the motion compensation module 380 produces the PB 320 in accordance with a filtering process supportive of sub-pixel accuracy in the motion vectors. As such, the motion estimation module 376 (which operates on many candidate motion vectors) may perform a simplified filtering process compared to that of the motion compensation module 380 (which operates on the selected candidate only) to achieve reduced computational complexity. When the video encoder 114 selects inter prediction for a CU the motion vector 378 is encoded into the bitstream 115.

Although the video encoder 114 of FIG. 3 is described with reference to versatile video coding (VVC), other video coding standards or implementations may also employ the processing stages of modules 310-386. The frame data 113 (and bitstream 115) may also be read from (or written to) memory 206, the hard disk drive 210, a CD-ROM, a Blu-ray Disk™ or other computer readable storage medium. Additionally, the frame data 113 (and bitstream 115) may be received from (or transmitted to) an external source, such as a server connected to the communications network 220 or a radio-frequency receiver.

The video decoder 134 is shown in FIG. 4. Although the video decoder 134 of FIG. 4 is an example of a versatile video coding (VVC) video decoding pipeline, other video codecs may also be used to perform the processing stages described herein. As shown in FIG. 4, the bitstream 133 is input to the video decoder 134. The bitstream 133 may be read from memory 206, the hard disk drive 210, a CD-ROM, a Blu-ray Disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 by decoding sequences of 'bins' and passes the values of the syntax elements to other modules in the video decoder 134. The entropy decoder module 420 uses variable-length and fixed length decoding to decode SPS, PPS or slice header an arithmetic decoding engine to decode syntax elements of the slice data as a sequence of one or more bins. Each bin may use one or more 'contexts', with a context describing probability levels to be used for coding a 'one' and a 'zero' value for the bin. Where multiple contexts are available for a given bin, a 'context modelling' or 'context selection' step is performed to choose one of the available contexts for decoding the bin.

The entropy decoder module 420 applies an arithmetic coding algorithm, for example 'context adaptive binary arithmetic coding' (CABAC), to decode syntax elements from the bitstream 133. The decoded syntax elements are used to reconstruct parameters within the video decoder 134. Parameters include residual coefficients (represented by an arrow 424), a quantisation parameter (not shown), a secondary transform index 474, and mode selection information such as an intra prediction mode (represented by an arrow 458). The mode selection information also includes information such as motion vectors, and the partitioning of each CTU into one or more CUs. Parameters are used to generate PBs, typically in combination with sample data from previously decoded CBs.

The residual coefficients 424 are passed to a dequantiser module 428. The dequantiser module 428 performs inverse quantisation (or 'scaling') on the residual coefficients 424, that is, in the primary transform coefficient domain, to create reconstructed transform coefficients, represented by an arrow 432. The reconstructed transform coefficients 432 are passed to an inverse secondary transform module 436. The inverse secondary transform module 436 performs either a secondary transform is applied or no operation is performed (bypass) according to a secondary transform type 474, decoded from the bitstream 113 by the entropy decoder 420 in accordance with methods described with reference to FIGS. 15 and 16. The inverse secondary transform module 436 produces reconstructed transform coefficients 440, that is primary transform domain coefficients.

The reconstructed transform coefficients 440 are passed to an inverse primary transform module 444. The module 444 transforms the coefficients 440 from the frequency domain back to the spatial domain according to a primary transform type 476 (or 'mts_idx'), decoded from the bitstream 133 by the entropy decoder 420. The result of operation of the module 444 is a block of residual samples, represented by an arrow 499. When a transform skip flag 478 for a given TB of the CU indicates bypassing of the transform, a multiplexer 449 outputs reconstructed transform coefficients 432 as residual samples 488 to the summation module 450. Otherwise, the multiplexer 449 outputs the residual samples 499 as the residual samples 488. The block of residual samples 448 is equal in size to the corresponding CB. The residual samples 448 are supplied to a summation module 450. At the summation module 450 the residual samples 448 are added to a decoded PB (represented as 452) to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496, from which the frame data 135 is later output.

The reconstructed sample cache 460 operates similarly to the reconstructed sample cache 356 of the video encoder 114. The reconstructed sample cache 460 provides storage for reconstructed samples needed to intra predict subsequent CBs without resorting to accessing the memory 206 (for example by using the data 232 instead, which is typically on-chip memory).

Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with the intra prediction mode parameter 458 signalled in the bitstream 133 and decoded by the entropy decoder 420. The block of samples 480 is generated using modes such as DC, planar or angular intra prediction, according to the intra prediction mode 458.

When the prediction mode of a CB is indicated to use intra prediction in the bitstream 133, the intra-predicted samples 480 form the decoded PB 452 via a multiplexor module 484. Intra prediction produces a prediction block (PB) of samples, that is, a block in one colour component, derived using 'neighbouring samples' in the same colour component. The neighbouring samples are samples adjacent to the current block and by virtue of being preceding in the block decoding order have already been reconstructed. Where luma and chroma blocks are collocated, the luma and chroma blocks may use different intra prediction modes. However, the two chroma CBs share the same intra prediction mode.

When the prediction mode of the CB is indicated to be inter prediction in the bitstream 133, a motion compensation module 434 produces a block of inter-predicted samples, represented as 438, using a motion vector (decoded from the bitstream 133 by the entropy decoder 420) and reference frame index to select and filter a block of samples 498 from a frame buffer 496. The block of samples 498 is obtained from a previously decoded frame stored in the frame buffer 496. For bi-prediction, two blocks of samples are produced and blended together to produce samples for the decoded PB 452. The frame buffer 496 is populated with filtered block data 492 from an in-loop filtering module 488. As with the in-loop filtering module 368 of the video encoder 114, the in-loop filtering module 488 applies any of the DBF, the ALF and SAO filtering operations. Generally, the motion vector is applied to both the luma and chroma channels, although the filtering processes for sub-sample interpolation in the luma and chroma channel are different.

Figure 5:
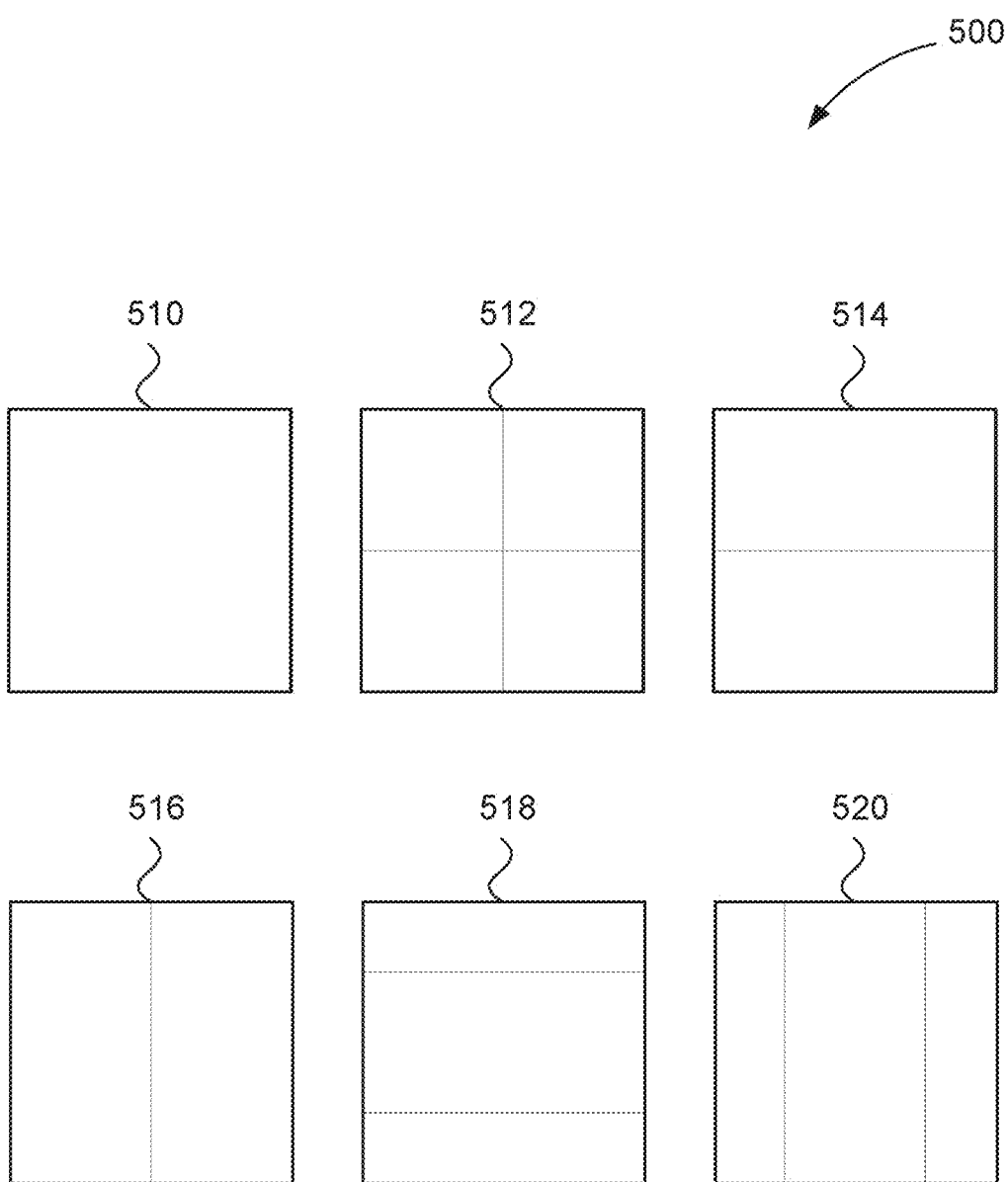
FIG. 5 is a schematic block diagram showing the available divisions of a block into one or more blocks in the tree structure of versatile video coding.

FIG. 5 is a schematic block diagram showing a collection 500 of available divisions or splits of a region into one or more sub-regions in each node of the coding tree structure of versatile video coding. The divisions shown in the collection 500 are available to the block partitioner 310 of the encoder 114 to divide each CTU into one or more CUs or CBs according to a coding tree, as determined by the Lagrangian optimisation, as described with reference to FIG. 3.

Although the collection 500 shows only square regions being divided into other, possibly non-square sub-regions, it should be understood that the collection 500 is showing the potential divisions of a parent node in a coding tree into child nodes in the coding tree and not requiring the parent node to correspond to a square region. If the containing region is non-square, the dimensions of the blocks resulting from the division are scaled according to the aspect ratio of the containing block. Once a region is not further split, that is, at a leaf node of the coding tree, a CU occupies that region.

The process of subdividing regions into sub-regions terminates when the resulting sub-regions reach a minimum CU size, generally 4×4 luma samples. In addition to constraining CUs to prohibit block areas smaller than a predetermined minimum size, for example 16 samples, CUs are constrained to have a minimum width or height of four. Other minimums, both in terms of width and height or in terms of width or height are also possible. The process of subdivision may also terminate prior to the deepest level of decomposition, resulting in a CUs larger than the minimum CU size. It is possible for no splitting to occur, resulting in a single CU occupying the entirety of the CTU. A single CU occupying the entirety of the CTU is the largest available coding unit size. Due to use of subsampled chroma formats, such as 4:2:0, arrangements of the video encoder 114 and the video decoder 134 may terminate splitting of regions in the chroma channels earlier than in the luma channels, including in the case of a shared coding tree defining the block structure of the luma and chroma channels. When separate coding trees are used for luma and chroma, constraints on available splitting operations ensure a minimum chroma CU area of 16 samples, even though such CUs are collocated with a larger luma area, e.g., 64 luma samples.

At the leaf nodes of the coding tree exist CUs. For example, a leaf node 510 contains one CU. At the non-leaf nodes of the coding tree exist a split into two or more further nodes, each of which could be a leaf node that forms one CU, or a non-leaf node containing further splits into smaller regions. At each leaf node of the coding tree, one CB exists for each colour channel of the coding tree. Splitting terminating at the same depth for both luma and chroma in a shared tree results in one CU having three collocated CBs.

A quad-tree split 512 divides the containing region into four equal-size regions as shown in FIG. 5. Compared to HEVC, versatile video coding (VVC) achieves additional flexibility with additional splits, including a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with addition of a ternary horizontal split 518 and a ternary vertical split 520. The ternary splits 518 and 520 divide the block into three regions, bounded either horizontally (518)

or vertically (520) along ¼ and¾ of the containing region width or height. The combination of the quad tree, binary tree, and ternary tree is referred to as 'QTBTTT'. The root of the tree includes zero or more quadtree splits (the 'QT' section of the tree). Once the QT section terminates, zero or more binary or ternary splits may occur (the 'multi-tree' or 'MT' section of the tree), finally ending in CBs or CUs at leaf nodes of the tree. Where the tree describes all colour channels, the tree leaf nodes are CUs. Where the tree describes the luma channel or the chroma channels, the tree leaf nodes are CBs.

Compared to HEVC, which supports only the quad tree and thus only supports square blocks, the QTBTTT results in many more possible CU sizes, particularly considering possible recursive application of binary tree and/or ternary tree splits. When only quad-tree splitting is available, each increase in coding tree depth corresponds to a reduction in CU size to one quarter the size of the parent area. In VVC, the availability of binary and ternary splits means that the coding tree depth no longer corresponds directly to CU area. The potential for unusual (non-square) block sizes can be reduced by constraining split options to eliminate splits that would result in a block width or height either being less than four samples or in not being a multiple of four samples.

Figure 6:
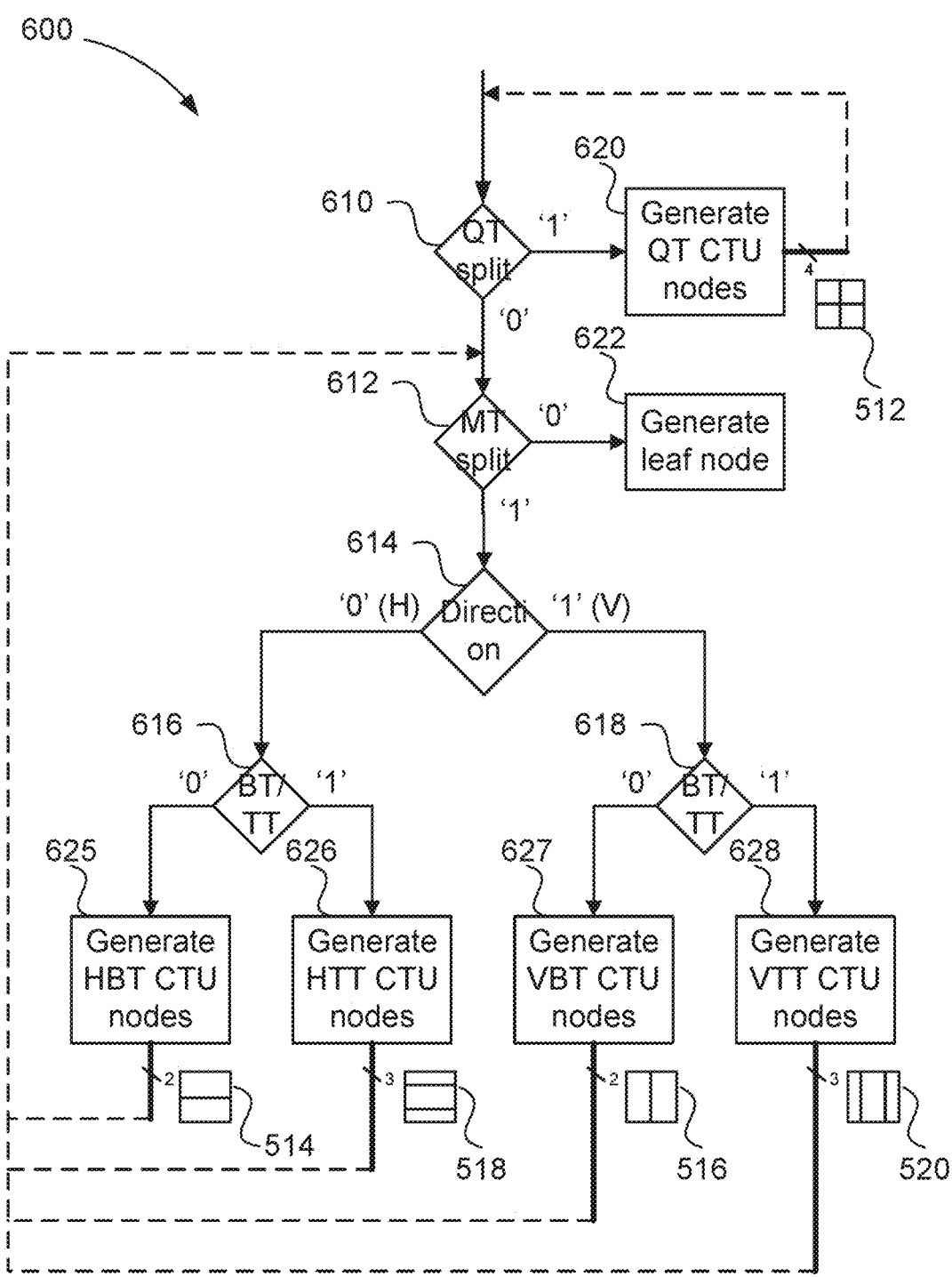
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bit-stream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be per-formed, then the node is a leaf node of the coding tree and corresponds to a CU. The leaf node is output at 622. Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direc-tion. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

Figure 7A:
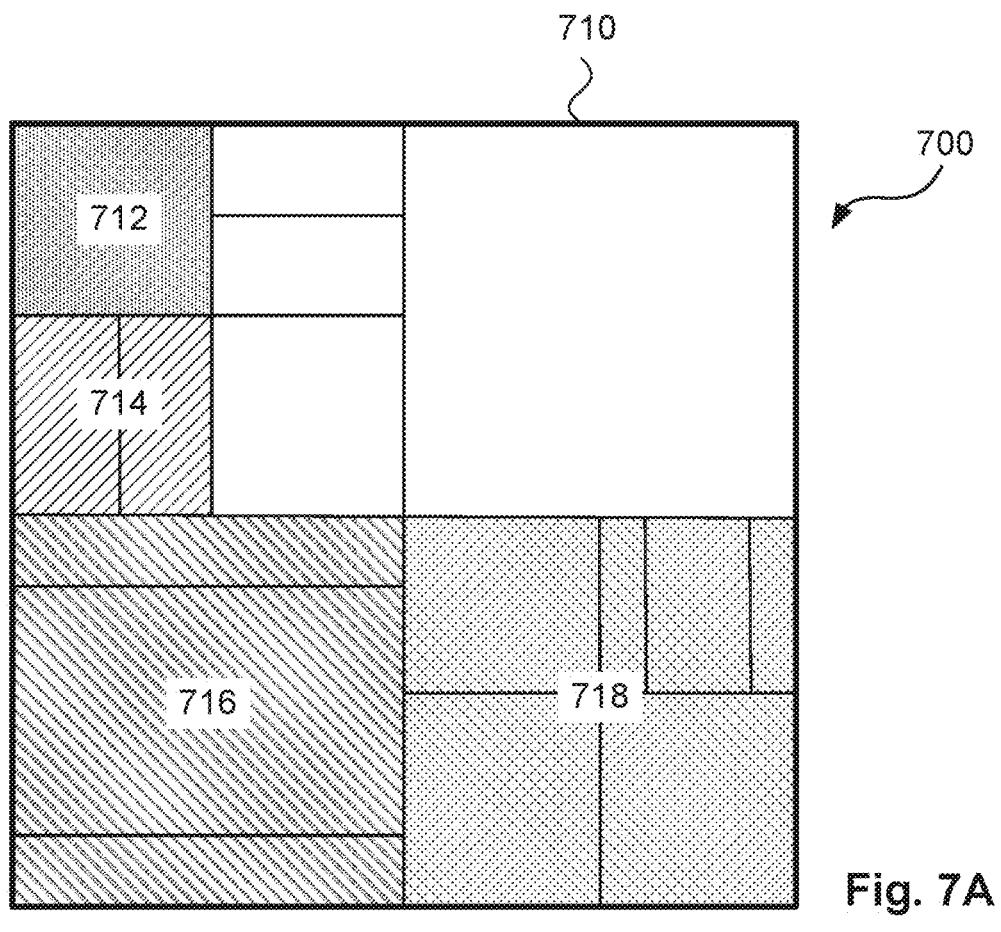
FIGS. 7A and 7B show an example division of a coding tree unit (CTU) into a number of coding units (CUs)
Figure 7B:
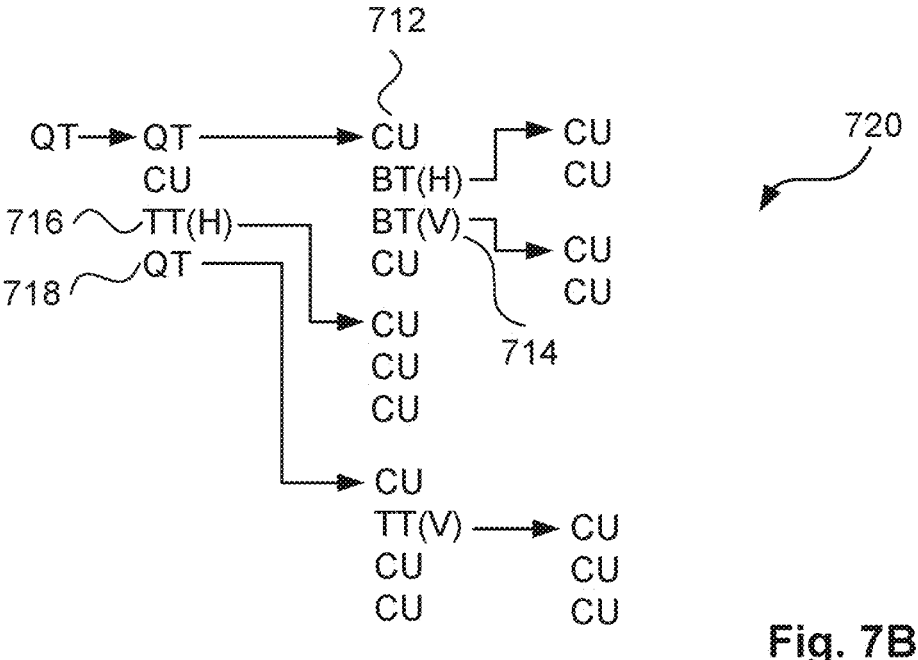

FIGS. 7A and 7B provide an example division 700 of a CTU 710 into a number of CUs or CBs. An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, repre-sented as columns in the coding tree 720. For a quad-tree split, the Z-order scanning results in top left to right fol-lowed by bottom left to right order. For horizontal and vertical splits, the Z-order scanning (traversal) simplifies to a top-to-bottom scan and a left-to-right scan, respectively. The coding tree 720 of FIG. 7B lists all nodes and CUs ordered according to the Z-order traversal of the coding tree. Each split generates a list of two, three or four new nodes at the next level of the tree until a leaf node (CU) is reached.

Having decomposed the image into CTUs and further into CUs by the block partitioner 310, and using the CUs to generate each residual block (324) as described with refer-ence to FIG. 3, residual blocks are subject to forward transformation and quantisation by the video encoder 114. The resulting TBs 336 are subsequently scanned to form a sequential list of residual coefficients, as part of the opera-tion of the entropy coding module 338. An equivalent process is performed in the video decoder 134 to obtain TBs from the bitstream 133.

Figure 8A:
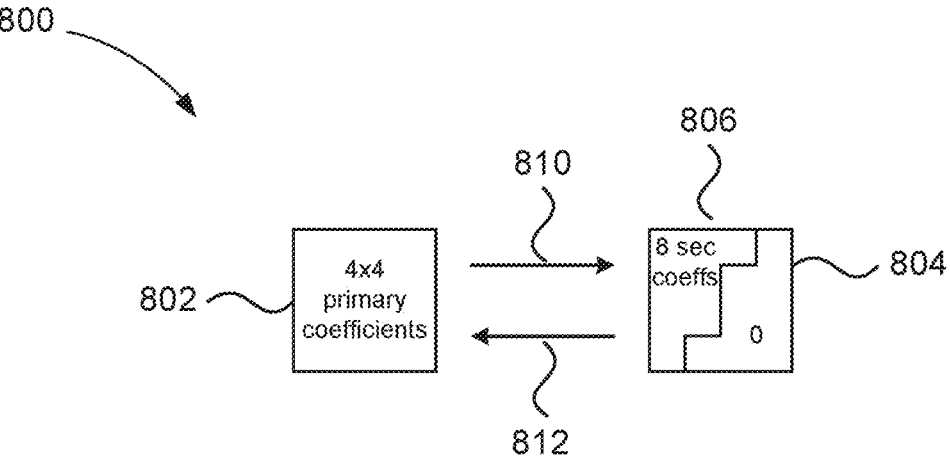
FIGS. 8A, 8B, 8C, and 8D show forward and inverse non-separable secondary transforms performed according to different sizes of transform blocks.

FIGS. 8A, 8B, 8C, and 8D show examples of forward and inverse non-separable secondary transforms that are per-formed according to different sizes of transform blocks (TBs). FIG. 8A shows a set of relationships 800 between primary transform coefficients 802 and secondary transform coefficients 804 for a 4×4 TB size. The primary transform coefficients 802 consist of 4×4 coefficients, while the sec-ondary transform coefficients 804 consist of eight coefficients. The eight secondary transform coefficients are arranged in a pattern 806. The pattern 806 corresponds to the eight positions, adjacent in a backward diagonal scan of the TB and including the DC (top-left) position. The remaining eight positions shown in FIG. 8A in the backward diagonal scan are not populated by performing a forward secondary transform and thus remain zero-valued. A forward non-separable secondary transform 810 for 4×4 TBs therefore receives sixteen primary transform coefficients, and produces as output eight secondary transform coefficients. The forward secondary transform 810 for 4×4 TBs can therefore be represented by an 8×16 matrix of weights. Similarly, an inverse secondary transform 812 can be represented by a 16×8 matrix of weights.

Figure 8B:
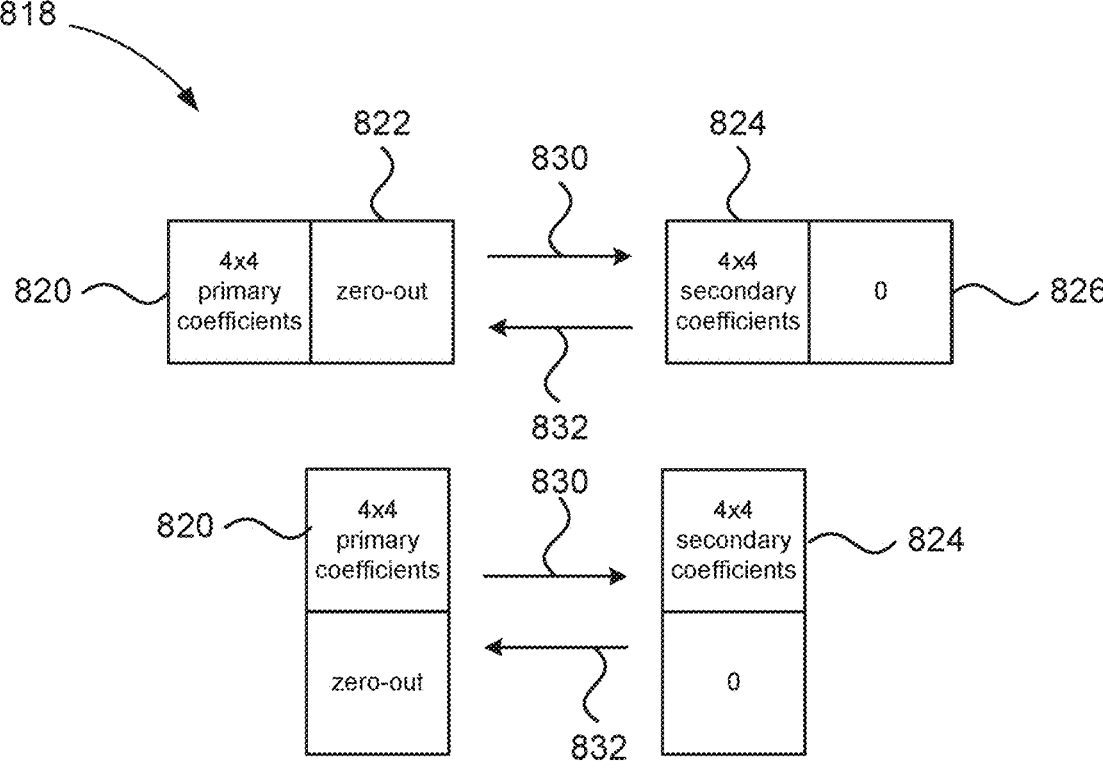

FIG. 8B shows a set of relationships 818 between primary transform coefficients and secondary transform coefficients for 4×N and N×4 TB sizes, where N is greater than 4. In both cases, a top-left 4×4 sub-block of primary coefficients 820 is associated with a top-left 4×4 sub-block of secondary transform coefficients 824. In the video encoder 114, the forward non-separable secondary transform 830 takes sixteen primary transform coefficients and produces as output sixteen secondary transform coefficients. Remaining primary transform coefficients 822 are not populated by the forward secondary transform and thus remain zero-valued. After the forward non-separable secondary transform 830 is performed, coefficient positions 826, associated with the coefficients 822, are not populated and thus remain zero-valued.

The forward secondary transform 830 for 4×N or N×4 TBs can be represented by a 16×16 matrix of weights. The matrix representing the forward secondary transform 830 is defined as A. Similarly, a corresponding inverse secondary transform 832 can be represented by a 16×16 matrix of weights. The matrix representing the inverse secondary transform 832 is defined as B.

The storage requirement of the non-separable transform kernel is further reduced by reusing parts of A for the forward secondary transform 810 and the inverse secondary transform 812 for 4×4 TBs. The first eight rows of A are used for the forward secondary transform 810, and the transpose of the first eight rows of A are used for the inverse secondary transform 812.

Figure 8C:
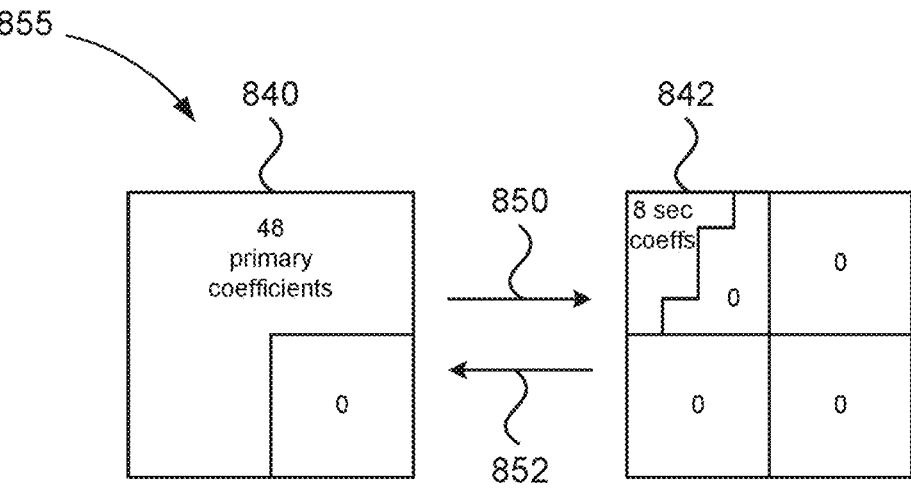

FIG. 8C shows a relationship 855 between primary transform coefficients 840 and secondary transform coefficients 842 for TBs of size 8×8. The primary transform coefficients 840 consist of 8×8 coefficients, while the secondary transform coefficients 842 consist of eight transform coefficients. The eight secondary transform coefficients 842 are arranged in a pattern corresponding to eight consecutive positions in a backward diagonal scan of the TB, the eight consecutive positions including the DC (top-left) coefficient of the TB. The remaining secondary transform coefficients in the TB are all zeroes and thus do not need to be scanned. The forward non-separable secondary transform 850 for an 8×8 TB takes forty-eight primary transform coefficients as input, corresponding to three 4×4 sub-blocks, and produces eight secondary transform coefficients. The forward secondary transform 850 for an 8×8 TB can be represented by an 8×48 matrix of weights. A corresponding inverse secondary transform 852 for an 8×8 TB can be represented by a 48×8 matrix of weights.

Figure 8D:
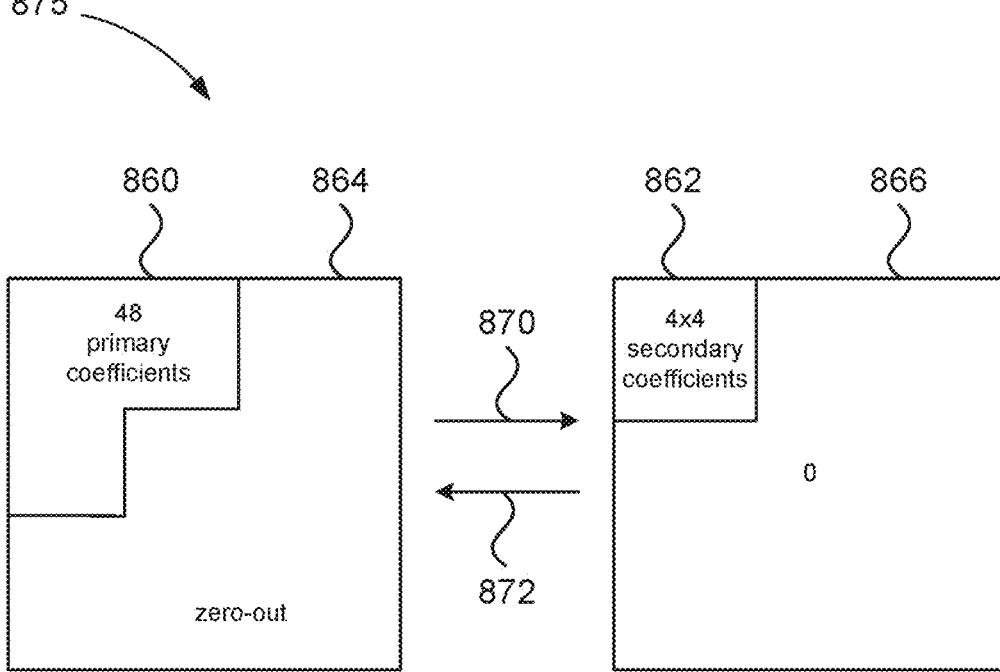

FIG. 8D shows a relationship 875 between primary transform coefficients 860 and secondary transform coefficients 862 for TBs of size greater than 8×8. A top-left 8×8 block of primary coefficients 860 (arranged as four 4×4 sub-blocks) is associated with a top-left 4×4 sub-block of secondary transform coefficients 862. In the video encoder 114, a forward non-separable secondary transform 870 operates on forty-eight primary transform coefficients to produce sixteen secondary transform coefficients. Remaining primary transform coefficients 864 are zeroed out. Secondary transform coefficient positions 866 outside of the top-left 4×4 sub-block of secondary transform coefficients 862 are not populated and remain as zeroes.

The forward secondary transform 870 for TBs of size greater than 8×8 can be represented by a 16×48 matrix of weights. A matrix representing the forward secondary transform 870 is defined as F. Similarly, a corresponding inverse secondary transform 832 can be represented by a 48×16 matrix of weights. A matrix representing the inverse secondary transform 872 is defined as G. As described above with reference to matrices A and B, F desirably has the property of orthogonality. The property of orthogonality means $G=F^T$, and only F needs be stored in the video encoder 114 and video decoder 134. An orthogonal matrix can be described as a matrix in which the rows have orthogonality.

The storage requirement of the non-separable transform kernel is further reduced by reusing parts of F for the forward secondary transform 850 and the inverse secondary transform 852 for 8×8 TBs. The first eight rows of F are used for the forward secondary transform 810, and the transpose of the first eight rows of F are used for the inverse secondary transform 812.

Non-separable secondary transforms may achieve coding improvement over the use of separable primary transforms alone, because non-separable secondary transforms are able to sparsify two-dimensional features in the residual signal, such as angular features. As angular features in the residual signal may be dependent on the type of intra prediction mode 387 selected, it is advantageous for the non-separable secondary transform matrix to be adaptively selected depending on the intra prediction mode. As described above, intra prediction modes consist of "intra-DC", "intra-planar", "intra-angular" modes, and "matrix intra prediction" modes. The intra prediction mode parameter 458 takes the value of 0 when intra-DC prediction is used. The intra prediction mode parameter 458 takes the value of 1 when intra-planar prediction is used. The intra prediction mode parameter 458 takes a value between 2 and 66 inclusive, when intra-angular prediction on square TBs is used.

Figure 9:
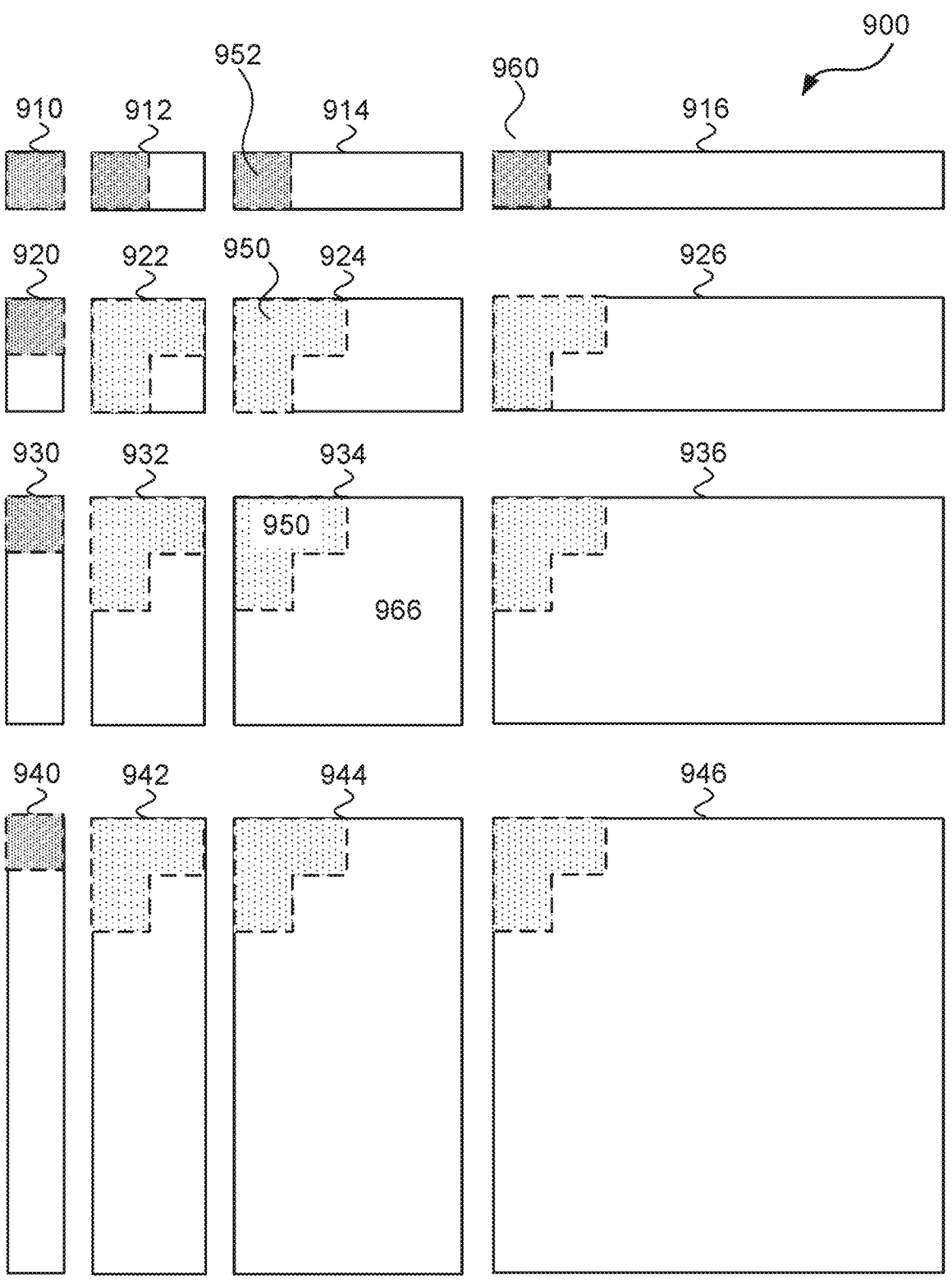
FIG. 9 shows a set of regions of application of the secondary transform for transform blocks of various sizes.

FIG. 9 shows a set 900 of transform blocks available in the versatile video coding (VVC) standard. FIG. 9 also shows the application of the secondary transform to a subset of residual coefficients from transform blocks of the set 900. FIG. 9 shows TBs with widths and heights ranging from four to 32. However TBs of width and/or height 64 are possible but are not shown for ease of reference.

A 16-point secondary transform 952 (shown with darker shading) is applied to a 4×4 set of coefficients. The 16-point secondary transform 952 is applied to TBs with a width or a height of four, e.g., a 4×4 TB 910, an 8×4 TB 912, a 16×4 TB 914, a 32×4 TB 916, a 4×8 TB 920, a 4×16 TB 930, and a 4×32 TB 940. The 16-point secondary transform 952 is also applied to TBs of size 4×64 and a 64×4 (not shown in FIG. 9). For TBs with a width or height of four but with more than 16 primary coefficients, the 16-point secondary transform is applied only to the upper-left 4×4 sub-block of the TB and other sub-blocks are required to have zero-valued coefficients in order for the secondary transform to be applied. Generally application of a 16-point secondary transform results in 8 or 16 secondary transform coefficients, as described with reference to FIGS. 8 to 8D. The secondary transform coefficients are packed into the TB for encoding into the top-left sub-block of the TB.

For transform sizes with a width and height greater than four, a 48-point secondary transform 950 (shown with lighter shading) is available for application to three 4×4 sub-blocks of residual coefficients in the upper-left 8×8 region of the transform block, as shown in FIG. 9. The 48-point secondary transform 950 is applied to an 8×8 transform block 922, a 16×8 transform block 924, a 32×8 transform block 926, an 8×16 transform block 932, a 16×16 transform block 934, a 32×16 transform block 936, an 8×32 transform block 942, a 16×32 transform block 944, and a 32×32 transform block 946, in each case in the region shown with light shading and a dashed outline. The 48-point secondary transform 950 is also applicable to TBs of size 8×64, 16×64, 32×64, 64×64, 64×32, 64×16 and 64×8 (not shown). Application of a 48-point secondary transform kernel generally results in the production of fewer than 48 secondary transform coefficients. For example, 8 or 16 secondary transform coefficients may be produced, as described with reference to FIGS. 8B to 8D. Primary transform coefficients not subject to the secondary transform ('primary-only coefficients'), for example coefficients 966 of the TB 934, are required to be zero-valued in order for the secondary transform to be applied. After application of the 48-point secondary transform 950 in a forward direction, the region which may contain significant coefficients is reduced from 48 coefficients to 16 coefficients, further reducing the number of coefficient positions which may contain significant coefficients. For the inverse secondary transform, decoded significant coefficients present are transformed to produce coefficients any of which may be significant in a region which are then subject to the primary inverse transform. Only the upper-left 4×4 sub-block may contain significant coefficients when a secondary transform reduces one or more sub-blocks to a set of 16 secondary transform coefficients. A last significant coefficient position located at any coefficient position for which secondary transform coefficients may be stored indicates either application of a secondary transform or only a primary transform was applied.

When the last significant coefficient position indicates a secondary transform coefficient position in a TB, a signalled secondary transform index (i.e., 388 or 474) is needed to distinguish between applying a secondary transform kernel or bypassing the secondary transform. Although application of secondary transforms to TBs of various sizes in FIG. 9 has been described from the perspective of the video encoder 114, a corresponding inverse process is performed in the video decoder 134. The video decoder 134 firstly decodes a last significant coefficient position. If the decoded last significant coefficient position indicates potential application of a secondary transform, the secondary transform index 474 is decoded to determine whether to apply or bypass the inverse secondary transform.

Figure 10:
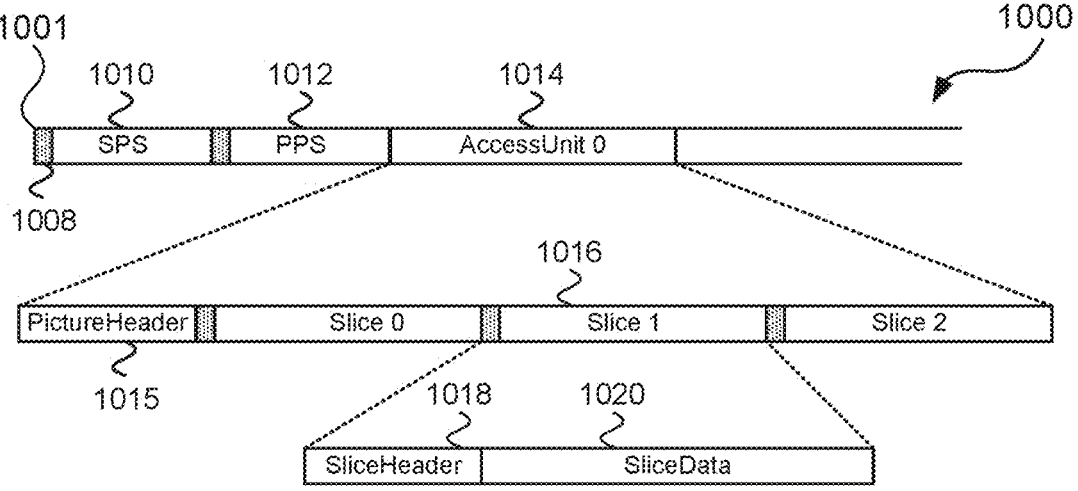
FIG. 10 shows a syntax structure for a bitstream with multiple slices, each of which includes multiple coding units.

FIG. 10 shows a syntax structure 1000 for a bitstream 1001 with multiple slices. Each of the slices includes multiple coding units. The bitstream 1001 may be produced by the video encoder 114, e.g. as the bitstream 115, or may be parsed by the video decoder 134, e.g. as the bitstream 133. The bitstream 1001 is divided into portions, for example network abstraction layer (NAL) units, with delineation achieved by preceding each NAL unit with a NAL unit header such as 1008. A sequence parameter set (SPS) 1010 defines sequence-level parameters, such as a profile (set of tools) used for encoding and decoding the bitstream, chroma format, sample bit depth, and frame resolution. Parameters are also included in the set 1010 that constrain the application of different types of split in the coding tree of each CTU.

A picture parameter set (PPS) 1012 defines sets of parameters applicable to zero or more frames. A picture header (PH) 1015 defines parameters applicable to the current frame. Parameters of the PH 1015 may include a list of CU chroma QP offsets, one of which may be applied at the CU level to derive a quantisation parameter for use by chroma blocks from the quantisation parameter of a collocated luma CB.

The picture header 1015 and a sequence of slices forming one picture is known as an access unit (AU), such as AU 0 1014. The AU 0 1014 includes three slices, such as slices 0 to 2. Slice 1 is marked as 1016. As with other slices, slice 1 (1016) includes a slice header 1018 and slice data 1020.

Figure 11:
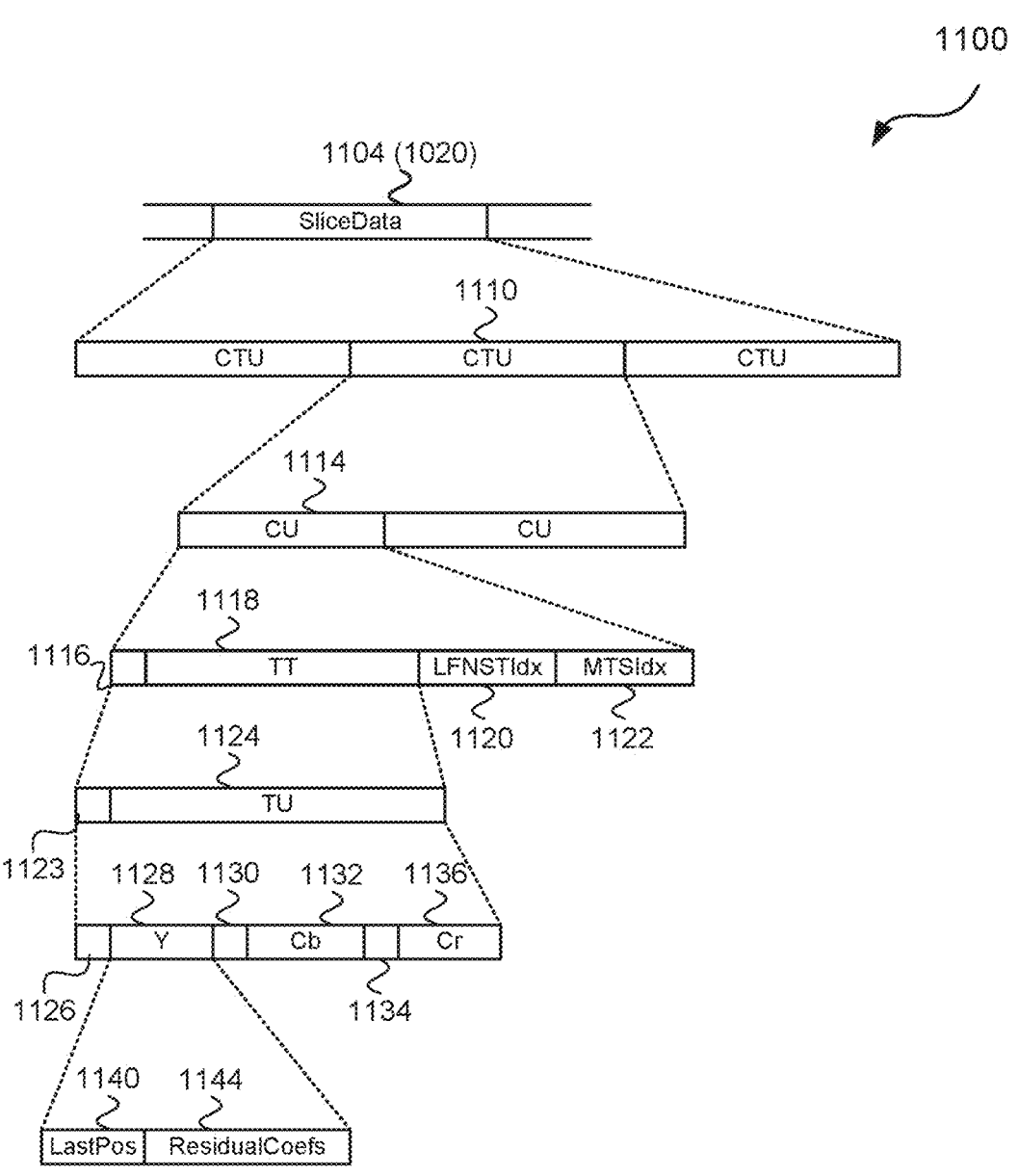
FIG. 11 shows a syntax structure for a bitstream with a shared tree for luma and chroma coding units of a coding tree unit.

FIG. 11 shows a syntax structure 1100 for slice data (such as the slice data 1104 corresponding to 1020) of the bitstream 1001 (e.g. 115 or 133) with a shared coding tree for luma and chroma coding units of a coding tree unit, such as a CTU 1110. The CTU 1110 includes one or more CUs. An example is labelled as a CU 1114. The CU 1114 includes a signalled prediction mode 1116 followed by a transform tree 1118. When the size of the CU 1114 does not exceed the maximum transform size (either 32×32 or 64×64 in the luma channel) then the transform tree 1118 includes one transform unit, shown as a TU 1124. When a 4:2:0 chroma format is in use, the corresponding maximum chroma transform sizes are half of the luma maximum transform size in each direction. That is, maximum luma transform sizes of 32×32 or 64×64 result in maximum chroma transform sizes of 16×16 or 32×32, respectively. When a 4:4:4 chroma format is in use, the chroma maximum transform size is the same as the luma maximum transform size. When a 4:2:2 chroma format is in use, the chroma maximum transform size is half horizontally and the same vertically as the luma transform size, that is, for maximum luma transform sizes of 32×32 and 64×64 the maximum chroma transform sizes are 16×32 and 32×64, respectively.

If the prediction mode 1116 indicates usage of intra prediction for the CU 1114, a luma intra prediction mode and a chroma intra prediction mode are specified. For the luma CB of the CU 1114, the primary transform type is also signalled as either (i) DCT-2 horizontally and vertically, (ii) transform skip horizontally and vertically, or (iii) combinations of DST-7 and DCT-8 horizontally and vertically, according to an MTS index 1122. If the signalled luma transform type is DCT-2 horizontally and vertically (option (i)), an additional luma secondary transform index 1120, also known as a 'low frequency non-separable transform' (LFNST) index, is signalled in the bitstream, under conditions as described with reference to FIGS. 8A-D and FIGS. 13-16.

Use of a shared coding tree results in the TU 1124 including TBs for each colour channel, shown as a luma TB Y 1128, a first chroma TB Cb 1132, and a second chroma TB Cr 1136. The presence of each TB is dependent on a corresponding 'coded block flag' (CBF), i.e. one of coded block flags 1123. When a TB is present, the corresponding CBF is equal to one and at least one residual coefficient in the TB is nonzero. When a TB is absent, the corresponding CBF is equal to zero and all residual coefficients in the TB are zero. The luma TB 1128, the first chroma TB 1134, and the second chroma TB 1136 each may use transform skip, as signalled by transform skip flags 1126, 1130, and 1134, respectively. A coding mode in which a single chroma TB is sent to specify the chroma residual both for Cb and Cr channels is available, known as a 'joint CbCr' coding mode. When the joint CbCr coding mode is enabled, a single chroma TB is encoded.

Irrespective of colour channel, each coded TB includes a last position followed by one or more residual coefficients. For example, the luma TB 1128 includes a last position 1140 and residual coefficients 1144. The last position 1140 indicates the last significant residual coefficient position in the TB when considering coefficients in the diagonal scan pattern, used to serialise the array of coefficients of a TB, in a forward direction (i.e. from the DC coefficient onwards). The two TBs 1132 and 1136 for the chroma channels each have a corresponding last position syntax element used in the same manner as described for the luma TB 1128. If the last positions of each of the TBs for the CU, that is 1128, 1132, and 1136, indicate that only coefficients in the secondary transform domain are significant for each TB in the CU, such that all remaining coefficients that would only be subject to primary transformation are zero, the secondary transform index 1120 may be signalled to specify whether or not to apply a secondary transform. Further conditioning on the signalling of the secondary transform index 1120 is described with reference to FIGS. 14 and 16.

If a secondary transform is to be applied, the secondary transform index 1120 indicates which kernel is selected. Generally, two kernels are available in a 'candidate set' of kernels. Generally, there are four candidate sets, with one candidate set selected using the intra prediction mode of the block. The luma intra prediction mode is used to select the candidate set for the luma block and the chroma intra prediction mode is used to select the candidate set for the two chroma blocks. As described with reference to FIGS. 8A-8D, the selected kernels also depend on the TB size, with different kernels for 4×4, 4×N/N×4, and other size TBs. When the 4:2:0 chroma format is in use, the chroma TBs are generally half the width and height of the corresponding luma TBs, resulting in different selected kernels for chroma blocks when luma TBs of width or height of eight are used. For luma blocks of sizes 4×4, 4×8, 8×4, the one-to-one correspondence of luma to chroma blocks in the shared coding tree is altered to avoid the presence of small-sized chroma blocks, such as 2×2, 2×4, or 4×2.

The secondary transform index 1120 indicates the following for example: Index value 0 (not apply), one (apply first kernel of the candidate set), or two (apply second kernel of the candidate set). For chroma, the selected secondary transform kernel of the candidate set derived considering the chroma TB size and chroma intra prediction mode is applied to each chroma channel and thus the residuals of the Cb block 1224 and the Cr block 1226 need to only include significant coefficients in positions subject to secondary transformation, as described with reference to FIGS. 8A-D. If joint CbCr coding is used, the requirement to only include significant coefficients in positions subject to secondary transformation is applicable only to the single coded chroma TB, as the resulting Cb and Cr residuals only contain significant coefficients in positions corresponding to significant coefficients in the joint coded TB.

Figure 12:
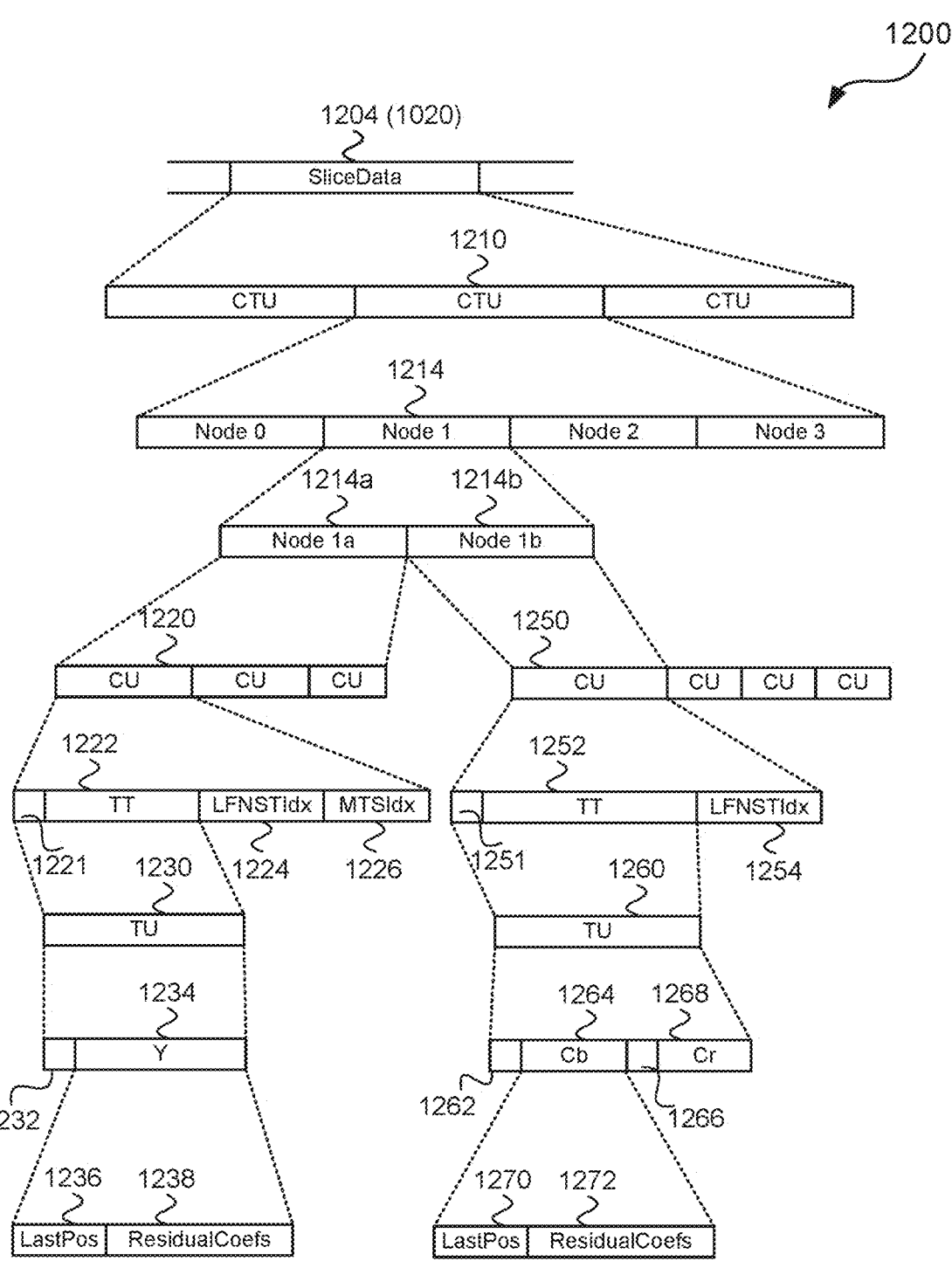
FIG. 12 shows a syntax structure for a bitstream with a separate tree for luma and chroma coding units of a coding tree unit.

FIG. 12 shows a syntax structure 1200 for slice data 1204 (e.g., 1020) for a bitstream (e.g., 115, 133) with a separate coding tree for luma and chroma coding units of a coding tree unit. A separate coding tree is available for 'I-slices'. The slice data 1204 includes one or more CTUs, such as CTU 1210. CTU 1210 is generally 128×128 luma samples in size and begins with a shared tree including one quad-tree split common to luma and chroma. At each of the resulting 64×64 nodes, separate coding trees commence for luma and chroma. An example node 1214 is marked in FIG. 12. The node 1214 has a luma node 1214a and a chroma node 1214b. A luma tree commences from the luma node 1214a and a chroma tree commences from the chroma node 1214b. The trees continuing from the node 1214a and the node 1214b are independent between luma and chroma, so different splits options are possible to produce the resulting CUs. A luma CU 1220 belongs to the luma coding tree and includes a luma prediction mode 1221, a luma transform tree 1222 and a secondary transform index 1224. The luma transform tree 1222 includes a TU 1230. Since the luma coding tree encodes samples of the luma channel only, the TU 1230 includes a luma TB 1234 and a luma transform skip flag 1232 indicates of the luma residual is to be transformed or not. The luma TB 1234 includes a last position 1236 and residual coefficients 1238.

A chroma CU 1250 belongs to the chroma coding tree and includes a chroma prediction mode 1251, a chroma transform tree 1252 and a secondary transform index 1254. The chroma transform tree 1252 includes a TU 1260. As the chroma tree includes chroma blocks, the TU 1260 includes a Cb TB 1264 and a Cr TB 1268. Application of bypassing of transforming for the Cb TB 1264 and the Cr CB 1268 is signalled with a Cb transform skip flag 1262 and a Cr transform skip flag 1266, respectively. Each TB includes a last position and residual coefficients, for example a last position 1270 and residual coefficients 1272 are associated with the Cb TB 1264. Signalling of the secondary transform index 1254, applicable to the chroma TBs of a chroma tree, is described with reference to FIGS. 14 and 16.

Figure 17:
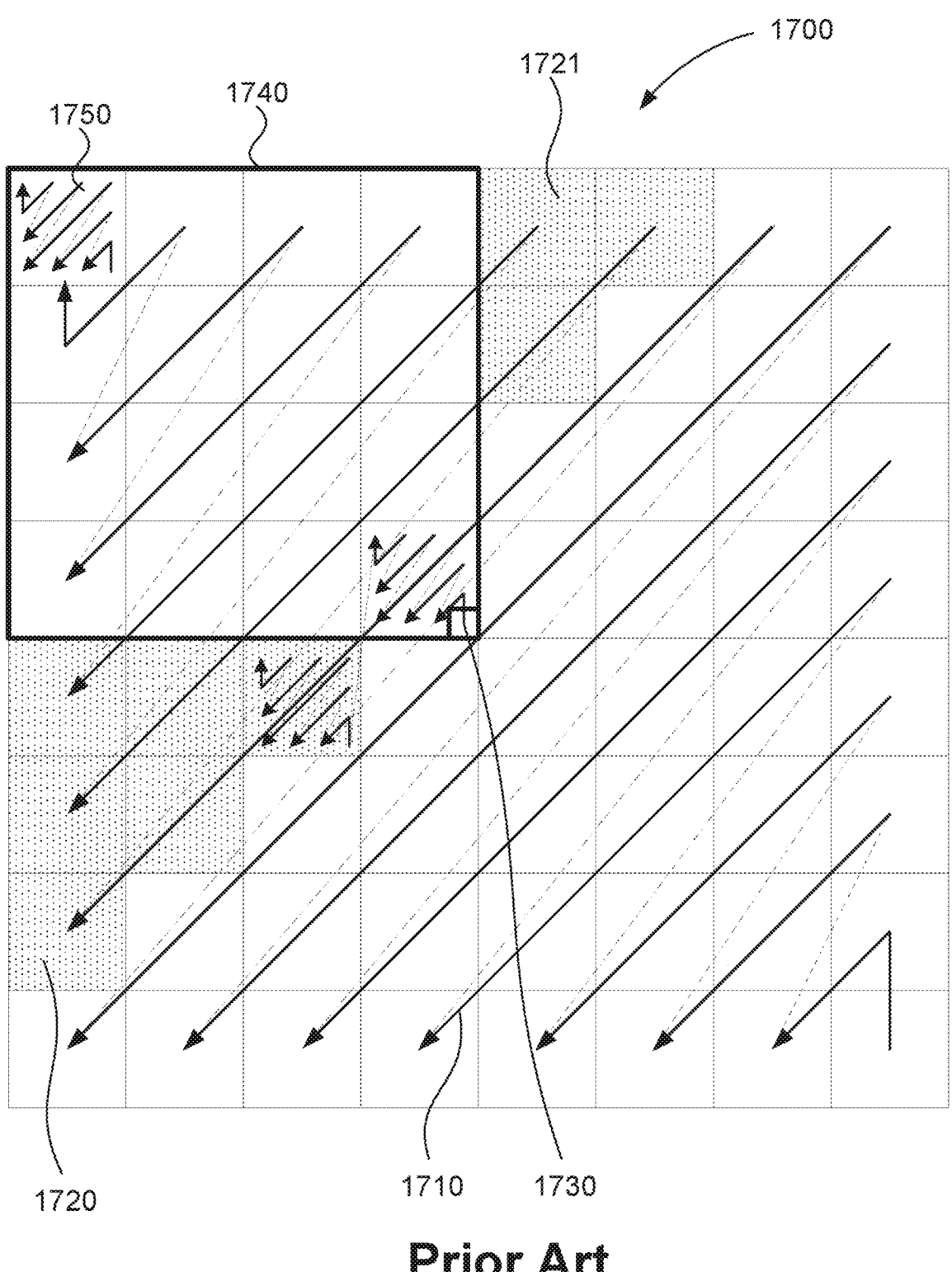
FIG. 17 shows a conventional scan pattern for 32×32 TBs.

FIG. 17 shows a 32×32 TB 1700. A conventional scan pattern 1710 is shown applied to the TB 1700. The scan pattern 1710 progresses through the TB 1700 in a backward diagonal manner, starting from a last significant coefficient position and progressing towards the DC (top-left) coefficient position. The progression divides the TB 1700 into 4×4 sub-blocks. Each sub-block is scanned in a backward diagonal manner internally, as shown in several sub-blocks of the TB 1700, for example a sub-block 1750. Other sub-blocks are scanned in the same manner. However, a limited number of sub-blocks are shown with full scanning in FIG. 17 for ease of reference. The progression from one 4×4 sub-block to the next also follows a backward diagonal scan, spanning the entire TB 1700.

If MTS is to be used, only coefficients in the top-left 16×16 portion 1740 of the TB 1700 may be significant. The top-left 16×16 portion forms a threshold cartesian location (in this example (15, 15)) at or within which MTS can be applied. MTS cannot be applied if the last significant coefficient is outside the threshold cartesian location whether in in terms of X or Y coordinates. That is, if either X or Y co-ordinate of the last significant coefficient position exceeds 15 then MTS cannot be applied and a DCT-2 is applied (or the transform is skipped). A last significant coefficient position is expressed as a Cartesian co-ordinate relative to the DC coefficient position in the TB 1700. For example, a last significant coefficient position 1730 is 15,15. The scan pattern 1710, commencing from the position 1730 and progressing towards the DC coefficient, results in scanning sub-blocks 1720 and 1721 (identified with shading) that are zeroed-out in the video encoder 114 when MTS is applied and are not used by the video decoder 134. The video decoder 134 needs to decode residual coefficients in the sub-blocks 1720 and 1721 as 1720 and 1721 are included in the scan, however the decoded residual coefficients of the sub-blocks 1720 and 1721 are not used when MTS is applied. At least, residual coefficients in the sub-blocks 1720 could be required to be zero-valued for MTS to be applied, reducing the associated coding cost and preventing bit-streams from encoding significant residual coefficients in the sub-blocks when MTS is applied. That is, parsing the 'mts_idx' syntax element could be conditioned, not only on the last significant position being within the portion 1740 but also on the sub-blocks 1720 and 1721 containing only zero-valued residual coefficients.

Figure 18:
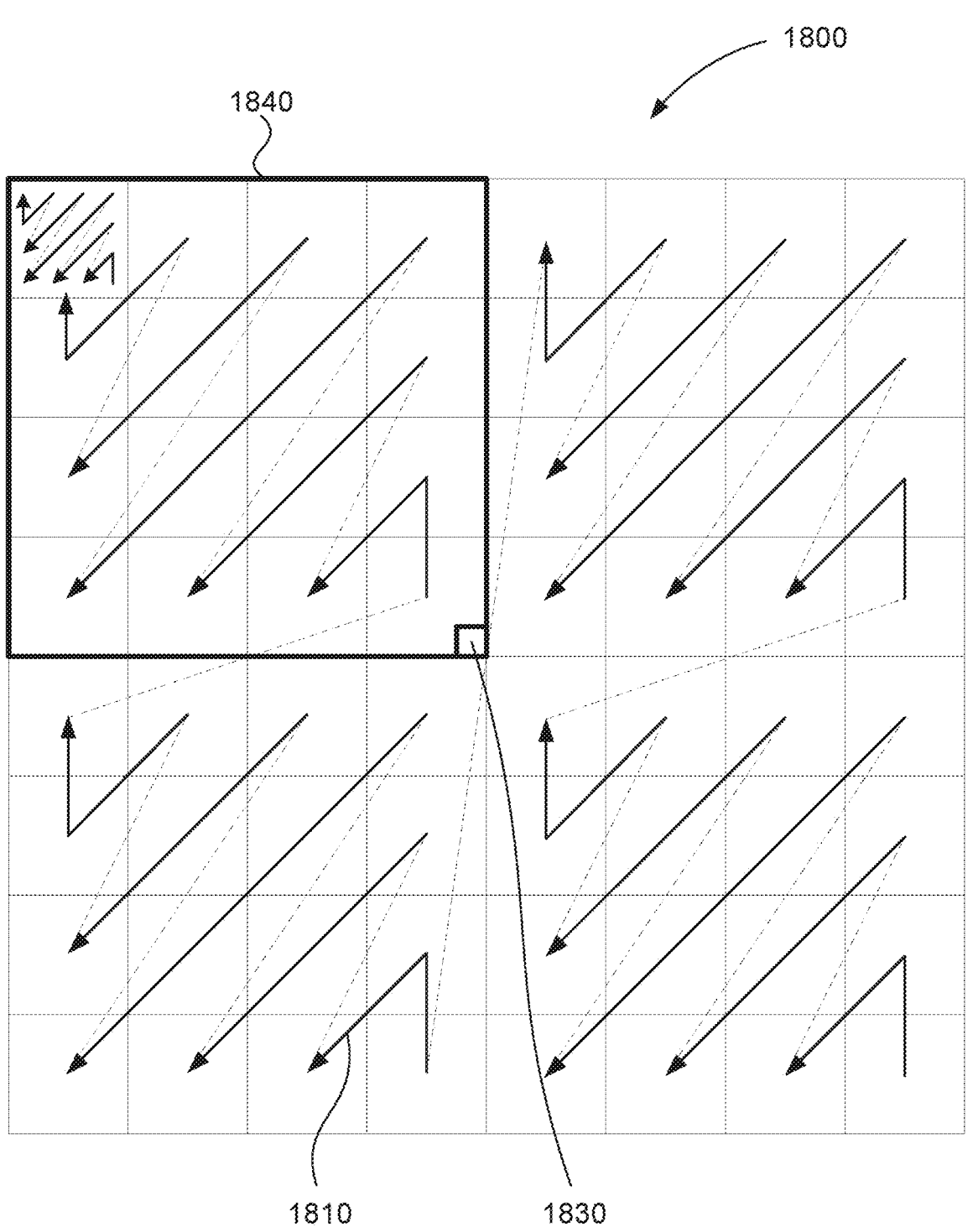
FIG. 18 shows an example scan pattern for 32×32 TBs used in the arrangements described.

FIG. 18 shows a scan pattern 1810 for a 32×32 TB 1800 used the arrangements described. The scan pattern 1810 groups 4×4 sub-blocks into several 'collections', such as a collection 1840.

In the context of the present disclosure, in relation to scan patterns, a collection provides a non-overlapping set of sub-blocks (i) that form an area or region of size applicable for MTS, or (ii) form an area or region that surrounds an area applicable for MTS. The scan pattern traverses the transform block by progressing a number of non-overlapping collections of sub-blocks of residual coefficients, progressing from a current collection to a next collection after completing scanning of the current collection.

In the example of FIG. 18, each collection is a two-dimensional array of 4×4 sub-blocks having a width and height of at most four sub-blocks (option (i) for collections). The collection 1840 corresponds to the region of potential significant coefficients when MTS is in use, i.e. a 16×16 region of the TB 1800. The scan pattern 1810 progresses from one collection to the next collection without re-entry, that is, once all residual coefficients in one collection have been scanned, the scan pattern 1810 progresses to the next collection. The scan 1810 effectively completes a scan pattern of a current collection in full before progressing to scan a next collection. The collections are non-overlapping and each residual coefficient position is scanned once, commencing from a last position and progressing towards the DC (top-left) coefficient position.

As with the scan pattern 1710, the scan pattern 1810 also divides the TU 1800 into 4×4 sub-blocks. Due to the monotonic progression from one collection to the next, once scanning reaches the top-left collection 1840, no further scanning of residual coefficients outside of the collection 1840 occurs. In particular, if the last position is within the collection 1840, for example at a last position 1830 at the 15,15 position, then all residual coefficients outside of the collection 1840 are not significant. The residual coefficients outside 1840 being zero is aligned to the zero-out performed in the video encoder 114 when MTS is in use. Accordingly, the video decoder 134 need only check the last position is within the collection 1840 to enable parsing of the mts_idx syntax element (1122 when the CU belongs to a single coding tree and 1226 when the CU belongs to the luma branch of a separate coding tree). Use of the scan pattern 1810 removes a need to ensure any residual coefficients outside of the collection 1840 are zero-valued. Whether coefficients outside the collection 1840 is already apparent by virtue of the scan pattern 1810 with a collection size aligned to the MTS transform coefficient region. By dividing the TB 1800 into a set of collections, each of which is the same size, the scan pattern 1810 may also enable a memory consumption reduction compared to the scan pattern 1710. The memory reduction is enabled as the scan over the TB 1800 can be constructed out of the scan over one collection. For TBs of size 16×32 and 32×16, the same approach of 16×16-sized collections can be used, with two collections in use. For TBs of size 32×8, a division into collections is possible, with a collection size constrained to 16×8 due to the TB size. The division into collections for a 32×8 TB results in the same scan pattern as a regular diagonal progression over the eight by two array of 4×4 sub-blocks comprising the 32×8 TB. Accordingly, the property of significant coefficients in the 8×16 region of coefficients subject to MTS transform for a 32×8 TB is met by checking the last position is within the left half of the 32×8 TB.

Figure 19:
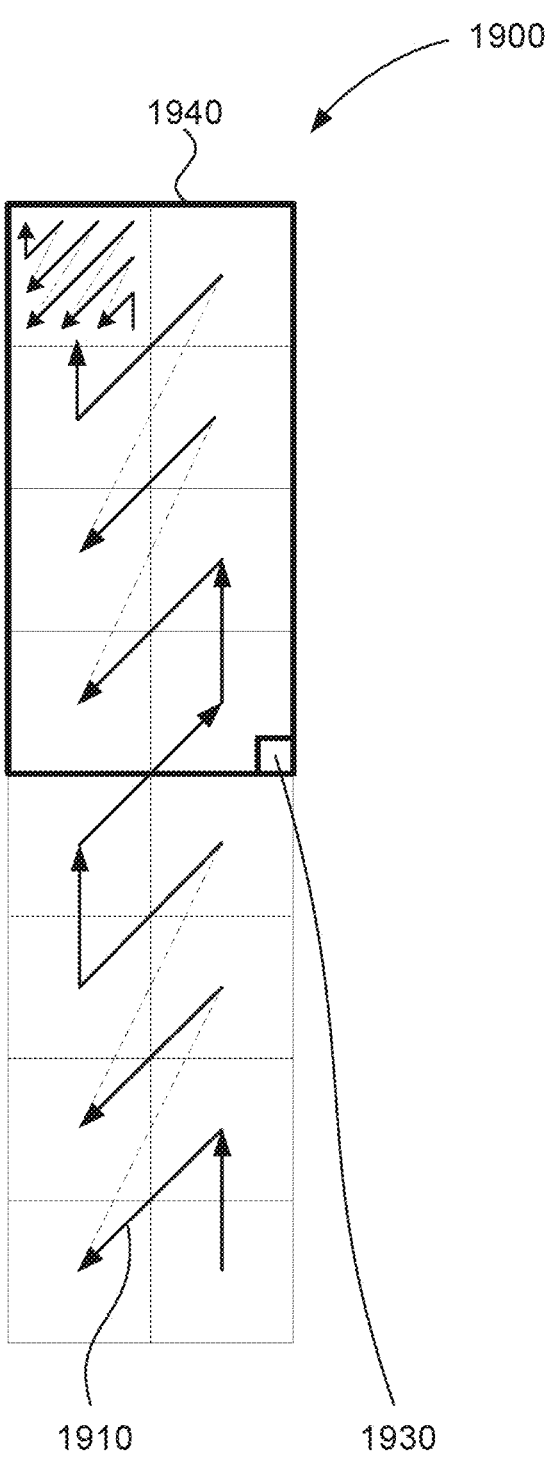
FIG. 19 shows a TB of size 8×32 with division into collections for the arrangements described.

FIG. 19 shows a TB 1900 of size 8×32. A division into collections is possible for the TB 1900. In the example of FIG. 19, a collection size is constrained to 8×16 due to the TB size, such as a collection 1940. The division into collections for the 8×32 TB 1900 results in a different sub-block order compared to a regular diagonal progression over the two by eight array of 4×4 sub-blocks comprising the 8×32 TB (for example shown in FIG. 18). Use of an 8×16 collection size ensures that provided the last significant coefficient position is within the collection 1940, significant coefficients are only possible in the MTS transform coefficient region, for example a last significant position 1930 at 7,15.

The scan patterns of FIGS. 18 and 19 scan residual coefficients in each sub-block in a backward diagonal manner. Sub-blocks in each collection are scanned in a backward diagonal manner in the examples of FIGS. 18 and 19. Scanning between collections is conducted in a backward diagonal manner in FIGS. 18 and 19.

Figure 20:
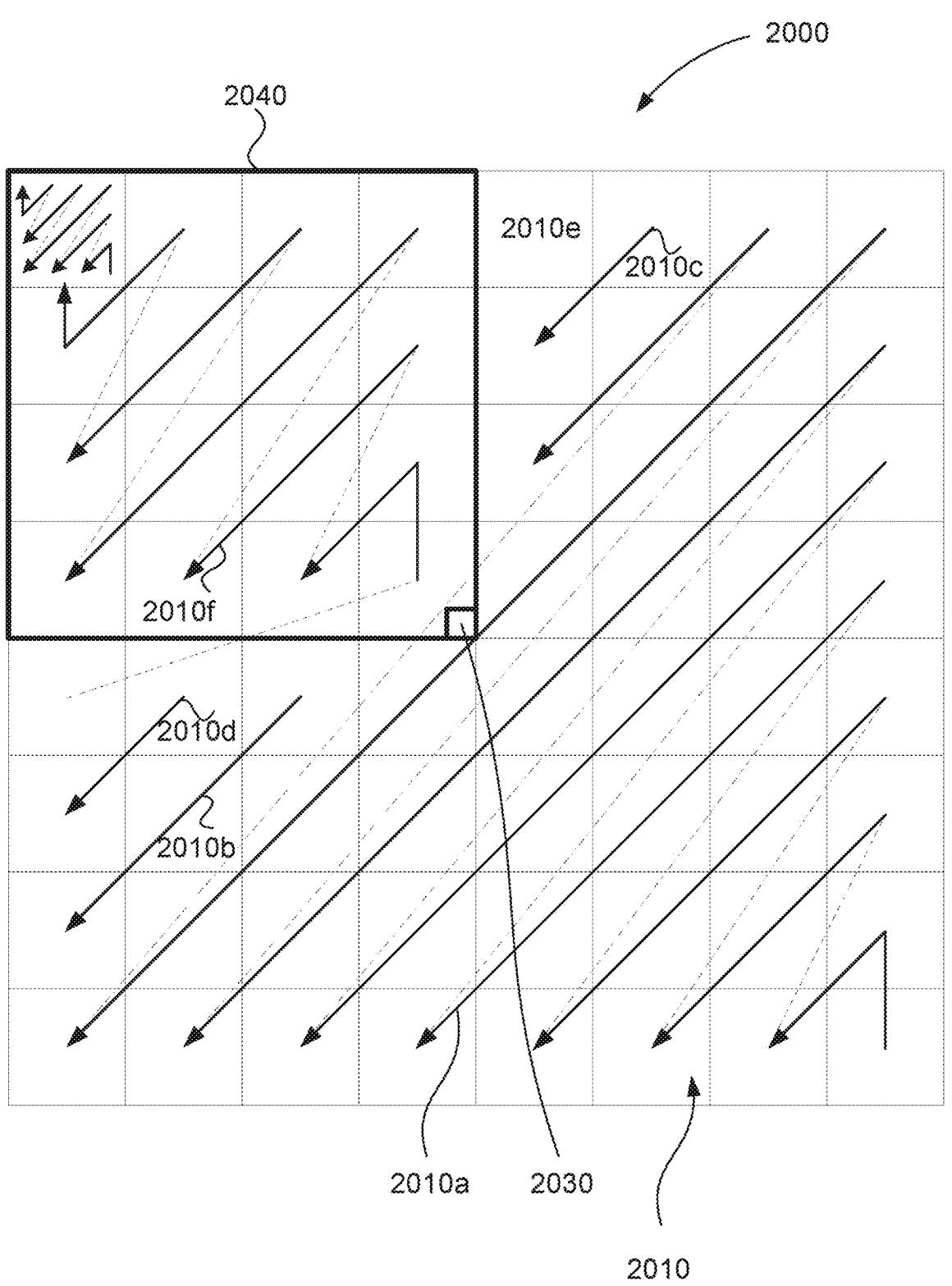
FIG. 20 shows a different example scan pattern for 32×32 TBs used in the arrangements described.

FIG. 20 shows an alternative scan order 2010 for a 32×32 TB 2000. The scan order (scan pattern) 2010 is divided into portions 2010*a* to 2010*f*. The scan order 2010 to 2010*e* relates to option (ii) for collections, a set of sub-blocks that form an area or region that surrounds an area applicable for MTS. The scan pattern 2010*f* relates to (i) a collection of covering a region 2040 that forms an area applicable for MTS. The scan order 2010*a*-2010*f* is defined such that a backward diagonal progression from one sub-block to the next occurs over the TB 2000 except for the region 2040, which is subsequently scanned using a backward diagonal scan progression. The region 2040 corresponds to the MTS transform coefficient region. The division of the TB 2000 into a scan over sub-blocks outside of the MTS transform coefficient region followed by a scan over sub-blocks within the MTS transform coefficient region results in a progression over sub-blocks as shown in 2010*a*, 2010*b*, 2010*c*, 2010*d*, 2010*e*, and 2010*f*. The scan pattern 2010 identifies two collections, being a collection defined by 2010*a* to 2010*e* and a collection defined by a region 2040, scanned by 2010*f*. Scanning is performed in a manner than allows all sub-blocks bordering the collection 2040 to be scanned prior to the bottom-right corner (2030) of the collection 2040. The scan pattern 2010 scans the collection of sub-blocks formed using the scans 2010*a* to 2010*e*. Upon completion of the collection covered by 2010*a* to 2010*e*, the scan pattern 2010 continues to the next collection, 2040, scanned according to 2010*f*. The property of checking the last significant coefficient position, such as 2030, is within the region 2040 to enable signalling of mts_idx is present, without a need to also check any residual coefficients outside of the region 2040 are zero-valued.

Scanning of residual coefficients is performed in a variation on backward diagonal scanning in FIG. 20. The scan pattern scans the collections in backward raster manner in FIG. 20.

In variations on the patterns of FIG. 18 and FIG. 19, the collections may be scanned in backward raster order.

Scan patterns shown in FIGS. 18-20, that is 1810, 1910, and 2010*a-f*, substantially retain the property of progressing from the highest-frequency coefficients of a TB towards the lowest-frequency coefficients of the TB, compared to the scan pattern 1710 of FIG. 17. Accordingly, arrangements of the video encoder 114 and the video decoder 134 using the scan patterns 1810, 1910, and 2010*a-f* achieve similar compression efficiency as that achieved when using the scan pattern 1710, while enabling MTS index signalling to be dependent on the last significant coefficient position without further need to check for zero-valued residual coefficients outside of the MTS transform coefficient region.

Figure 13:
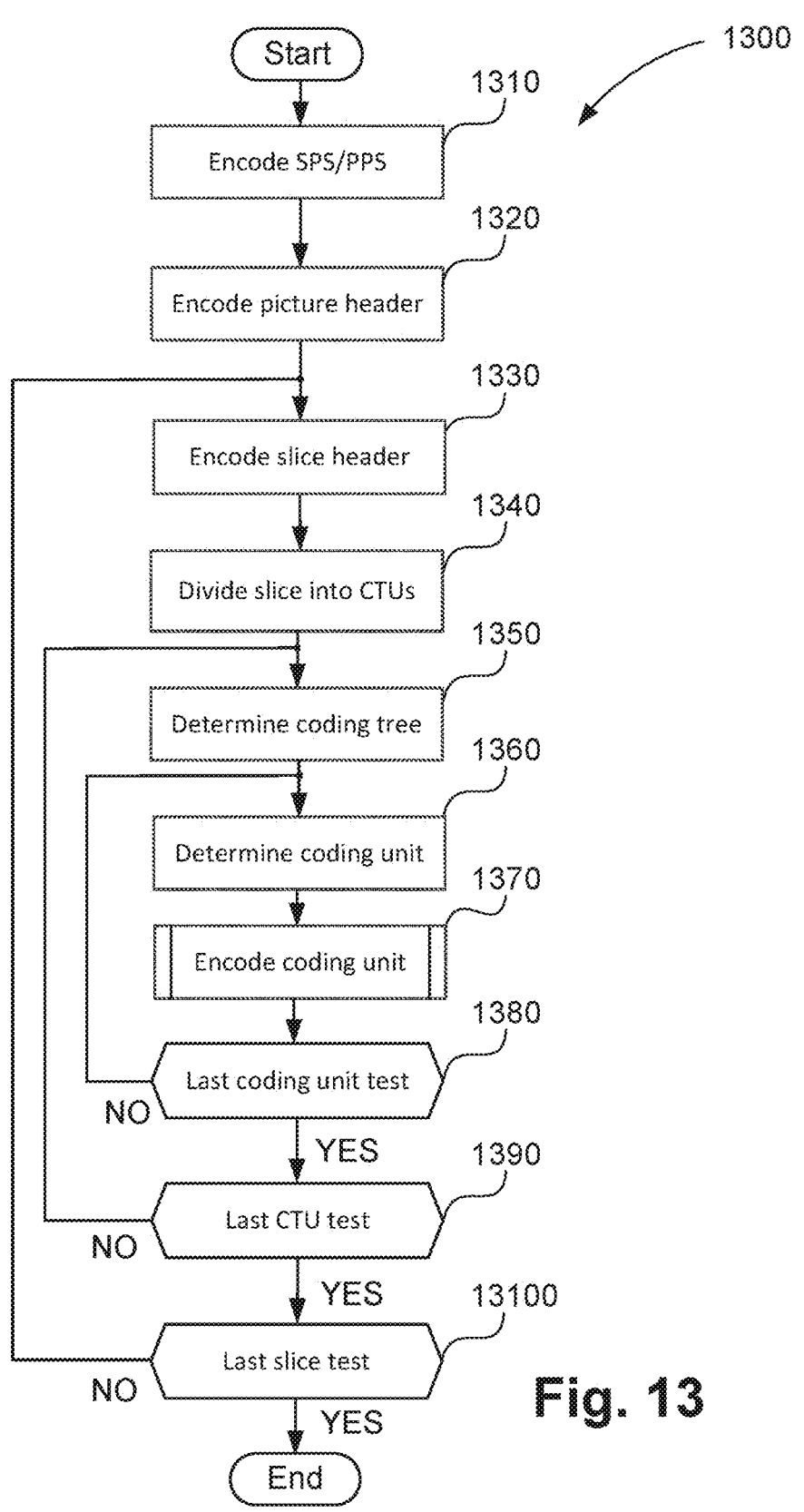
FIG. 13 shows a method for encoding a frame into a bitstream including one or more slices as sequences of coding units.

FIG. 13 shows a method 1300 for encoding the frame data 113 into the bitstream 115, the bitstream 115 including one or more slices as sequences of coding tree units. The method 1300 may be embodied by apparatus such as a configured FPGA, an ASIC, or an ASSP. Additionally, the method 1300 may be performed by the video encoder 114 under execution of the processor 205. As such, the method 1300 may be implemented as modules of the software 233 stored on computer-readable storage medium and/or in the memory 206.

The method 1300 begins at an encode SPS/PPS step 1310. At step 1310 the video encoder 114 encodes the SPS 1010 and the PPS 1012 into the bitstream 115 as sequences of fixed and variable length encoded parameters. Parameters of the frame data 113, such as resolution and sample bit depth, are encoded. Parameters of the bitstream, such as flags indicating the usage of particular coding tools, are also encoded. The picture parameter set includes parameters specifying the frequency with which 'delta QP' syntax elements are present in the bitstream 113, offsets for chroma QP relative to luma QP, and the like.

The method 1300 continues from step 1310 to an encode picture header step 1320. In execution of step 1320 the processor 205 encodes the picture header (for example 1015) into the bitstream 113, the picture header 1015 being applicable to all slices in the current frame. The picture header 1015 may include partition constraints signalling the maximum allowed depths of binary, ternary, and quadtree splitting, overriding similar constraints included as part of the SPS 1010.

The method 1300 continues from step 1320 to an encode slice header step 1330. At step 1330 the entropy encoder 338 encodes the slice header 1118 into the bitstream 115.

The method 1300 continues from step 1330 to a divide slice into CTUs step 1340. In execution of step 1340 the video encoder 114 divides the slice 1016 into a sequence of CTUs. Slice boundaries are aligned to CTU boundaries and CTUs in a slice are ordered according to a CTU scan order, generally a raster scan order. The division of a slice into CTUs establishes an order in which portions of the frame data 113 are to be processed by the video encoder 113 in encoding each current slice.

The method 1300 continues from step 1340 to a determine coding tree step 1350. At step 1350 the video encoder 114 determines a coding tree for a current selected CTU in the slice. The method 1300 starts from the first CTU in the slice 1016 on the first invocation of the step 1350 and progresses to subsequent CTUs in the slice 1016 on subsequent invocations. In determining the coding tree of a CTU, a variety of combinations of quadtree, binary, and ternary splits are generated by the block partitioner 310 and tested.

The method 1300 continues from step 1350 to a determine coding unit step 1360. At step 1360 the video encoder 114 executes to determine encodings for the CUs resulting from various coding trees under evaluation using known methods. Determining encodings involves determining a prediction mode (e.g. intra prediction 387 with specific mode or inter prediction with motion vector) and the primary transform type 389. If the primary transform type 389 is determined to be DCT-2 and all quantised primary transform coefficient that is not subject to forward secondary transformation are not significant, the secondary transform index 388 is determined and may indicate application of the secondary transform (for example encoded as 1120, 1224 or 1254). Otherwise the secondary transform index 388 indicates bypassing of the secondary transform. Additionally, a transform skip flag 390 is determined for each TB in the CU, indicating to apply the primary (and optionally the secondary) transform, or to bypass transforms altogether (for example 1126/1130/1134 or 1232/1262/1266). For the luma channel, the primary transform type is determined to be DCT-2, transform skip, or one of the MTS options and for the chroma channels, DCT-2 or transform skip are the available transform types. Determining the encoding can also include determining a quantisation parameter where it is possible to change the QP, that is, where a 'delta QP' syntax element is to be encoded into the bitstream 115. In determining individual coding units the optimal coding tree is also determined, in a joint manner. When a coding unit in a shared coding tree is to be coded using intra prediction, a luma intra prediction mode and a chroma intra prediction are determined at step 1360. When a coding unit in a separate coding tree is to be coded using intra prediction, either a luma intra prediction mode or a chroma intra prediction mode is determined at step 1360, depending on the branch of the coding tree being luma or chroma, respectively.

The determine coding unit step 1360 may inhibit testing application of the secondary transform when there are no 'AC' residual coefficients present in the primary domain residual resulting from application of the DCT-2 primary transform by the forward primary transform module 326. AC residual coefficients are residual coefficients in locations other than the top-left position of the transform block. The inhibition of testing secondary transform when only a DC primary coefficient exists spans the blocks for which the secondary transform index 388 applies, that is, Y, Cb and Cr for shared tree (with Y channel only when the Cb and Cr blocks are width or height of two samples). Regardless of whether the coding unit is for shared or separate tree coding tree, provided at least one significant AC primary coefficient exists, the video encoder 114 tests for selection of non-zero secondary transform index values 388 (that is, for application of the secondary transform).

The method 1300 continues from step 1360 to an encode coding unit step 1370. At step 1370 the video encoder 114 encodes the determined coding unit of the step 1360 into the bitstream 115. An example of how the coding unit is encoded is described in more detail with reference to FIG. 14.

The method 1300 continues from step 1370 to a last coding unit test step 1380. At step 1380 the processor 205 tests if the current coding unit is the last coding unit in the CTU. If not ("NO" at step 1380), control in the processor 205 returns to the determine coding unit step 1360. Otherwise, if the current coding unit is the last coding unit ("YES" at step 1380) control in the processor 205 progresses to a last CTU test step 1390.

At the last CTU test step 1390 the processor 205 tests if the current CTU is the last CTU in the slice 1016. If the current CTU is not the last CTU in the slice 1016 ("NO" at step 1390), control in the processor 205 returns to the determine coding tree step 1350. Otherwise, if the current CTU is the last ("YES" at step 1390), control in the processor 205 progresses to a last slice test step 13100.

At the last slice test step 13100 the processor 205 tests if the current slice being encoded is the last slice in the frame.

If the current slice is not the last slice ("NO" at step 13100), control in the processor 205 returns to the encode slice header step 1330. Otherwise, if the current slice is the last slice and all slices have been encoded ("YES" at step 13100) the method 1300 terminates.

Figure 14:
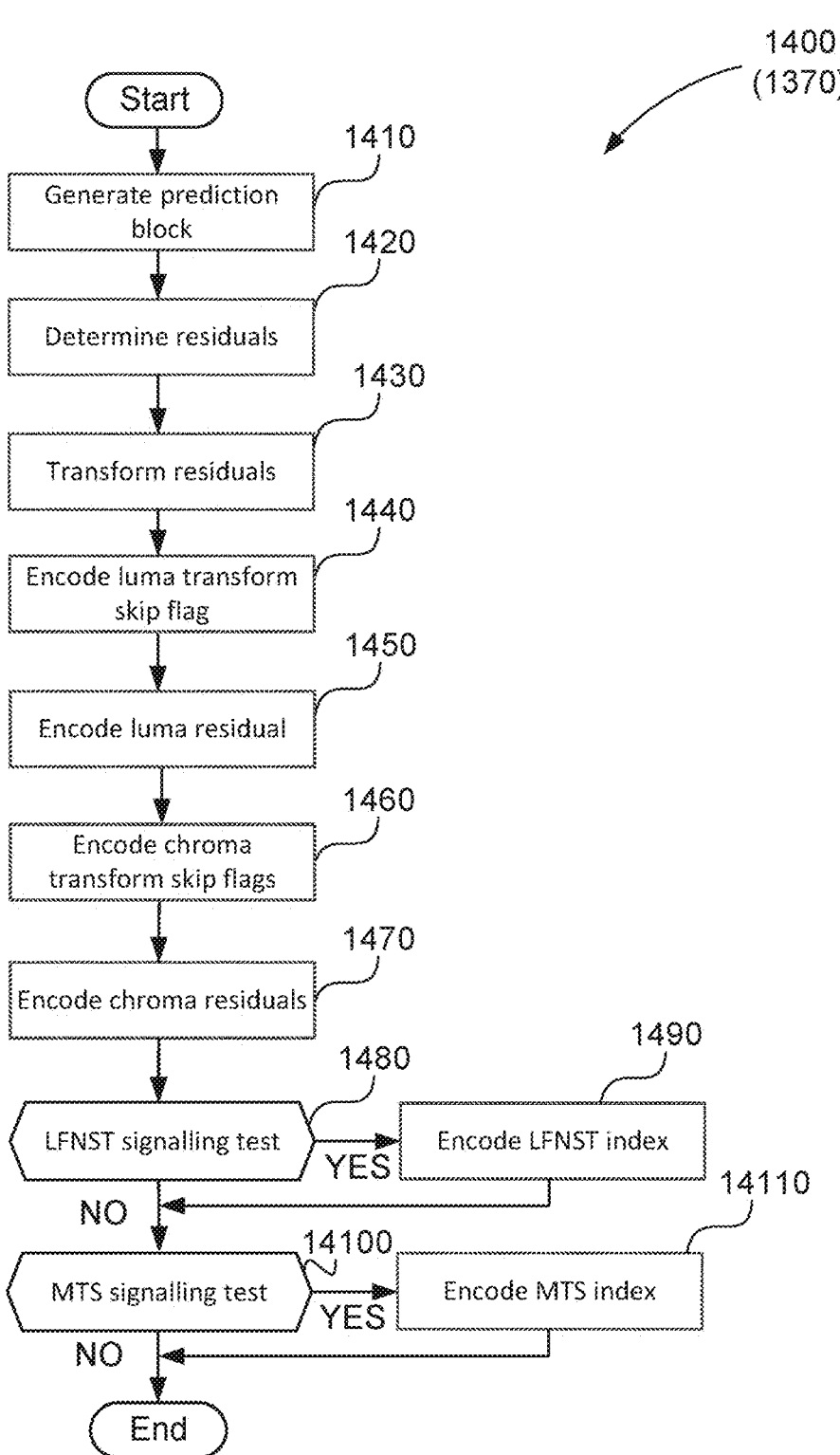
FIG. 14 shows a method for encoding a coding unit into a bitstream.

FIG. 14 shows a method 1400 for encoding a coding unit into the bitstream 115, corresponding to the step 1370 of FIG. 13. The method 1400 may be embodied by apparatus such as a configured FPGA, an ASIC, or an ASSP. Additionally, the method 1400 may be performed by the video encoder 114 under execution of the processor 205. As such, the method 1400 may be stored as modules of the software 233 on computer-readable storage medium and/or in the memory 206.

The method 1400 results in improved compression efficiency by encoding the secondary transform index 1254 only when it is possible to apply to the chroma TBs of the TU 1260, and only encoding the secondary transform index 1120 when it is possible to apply to any of the TBs of the TU 1124. When a shared coding tree is in use, the method 1400 is invoked for each CU in the coding tree, e.g. CU 1114 of FIG. 11, with Y, Cb, and Cr colour channels being encoded. When a separate coding tree is in use, the method 1400 is firstly invoked for each CU in the luma branch 1214a, e.g. 1220, and the method 1400 is also invoked for each chroma CU, e.g. 1250, in the chroma branch 1214b.

The method 1400 starts at a generate prediction block step 1410. At step 1410 the video encoder 114 generates the prediction block 320 according to a prediction mode for the CU as determined at the step 1360, e.g. the intra prediction mode 387. The entropy encoder 338 encodes the intra prediction mode 387 for the coding unit, as determined at the step 1360, into the bitstream 115. A 'pred_mode' syntax element is encoded to distinguish between use of intra prediction, inter prediction, or other prediction modes for the coding unit.

If intra prediction is used for the coding unit then a luma intra prediction mode is encoded if a luma PB is applicable to the CU and a chroma intra prediction mode is encoded if chroma PBs are applicable to the CU. That is, for an intra-predicted CU belonging to a shared tree, such as the CU 1114, the prediction mode 1116 includes the luma intra prediction mode and the chroma intra prediction mode. For an intra predicted CU belonging to the luma branch of a separate coding tree, such as the CU 1220, the prediction mode 1221 includes the luma intra prediction mode. For an intra predicted CU belong to the chroma branch of a separate coding tree, such as the CU 1250, the prediction mode 1251 includes the chroma intra prediction mode. The primary transform type 389 is encoded to select between use of DCT-2 horizontally and vertically, transform skip horizontally and vertically, or combinations of DCT-8 and DST-7 horizontally and vertically for the luma TB of the coding unit.

The method 1400 continues from step 1410 to a determine residuals step 1420. The prediction block 320 is subtracted from the corresponding block of frame data 312 by the difference module 322 to produce the difference 324.

The method 1400 continues from step 1420 to a transform residuals step 1430. At the transform residuals step 1430 the video encoder 114, under execution of the processor 205, either bypasses primary and secondary transform on the residual of the step 1420 or performs transforms according to the primary transform type 389 and a secondary transform index 388 for each TB of the CU. Transforming of the difference 324 may be performed or bypassed according to the transform skip flags 390, and if transformed, the secondary transform may also be applied, as determined at the step 1350 to produce the residual samples 350, as described with reference to FIG. 3. After operation of the quantisation module 334 residual coefficients 336 are available.

The method 1400 continues from step 1430 to an encode luma transform skip flag step 1440. At the step 1440 the entropy encoder 338 encodes a context-coded transform skip flag 390 into the bitstream 115, indicating either the residual for the luma TB is to be transformed according to a primary transform, and possibly a secondary transform, or primary and secondary transforms are to be bypassed. The step 1440 is performed when the CU includes a luma TB, i.e., in a shared coding tree (encoding 1126) or luma branch of a dual tree (encoding 1232).

The method 1400 continues from step 1440 to an encode luma residual step 1450. At the step 1450 the entropy encoder 338 encodes the residual coefficients 336 for the luma TB into the bitstream 115. The step 1450 operates to select a suitable scan patterns based on the dimensions of the coding unit. Examples of scan patterns are described in relation to FIG. 17 (a conventional scan pattern) and FIGS. 18 to 20 (additional scan patterns used for determining MTS flag). In the example described herein, a scan pattern relating to the examples of FIGS. 18 to 20 is used. The residual coefficients 336 are typically scanned into a list according to a backward diagonal scan pattern, with 4×4 sub-blocks. For TBs having a width or height larger than 16 samples, the scan pattern is as described with reference to FIGS. 18, 19 and 20. The position of the first non-zero residual coefficient in the list is encoded in the bitstream 115 as a Cartesian co-ordinate relative to the top-left coefficient of the transform block, i.e. 1140. The remaining residual coefficients are encoded in order from the coefficient at the last position to the DC (top-left) residual coefficient, as residual coefficients 1144. The step 1450 is performed when the CU includes a luma TB, i.e., in a shared coding tree (encoding 1128) or the CU belongs to the luma branch of a dual tree (encoding 1234).

The method 1400 continues from step 1450 to an encode chroma transform skip flags step 1460. At the step 1460 the entropy encoder 338 encodes another two context-coded transform skip flags 390 into the bitstream 115, one for each chroma TB, indicating whether the corresponding TB is to be subject to DCT-2 transform, and optionally a secondary transform, or transforming is to be bypassed. The step 1460 is performed when the CU includes chroma TBs, i.e., in a shared coding tree (encoding 1130 and 1134) or chroma branch of a dual tree (encoding 1262 and 1266).

The method 1400 continues from step 1460 to an encode chroma residuals step 1470. At the step 1470 the entropy encoder 338 encodes residual coefficients for the chroma TBs into the bitstream 115, as described with reference to step 1450. The step 1460 is performed when the CU includes chroma TBs, i.e., in a shared coding tree (encoding 1132 and 1136) or chroma branch of a dual tree (encoding 1264 and 1268). For chroma TBs having a width or height larger than 16 samples, the scan pattern is as described with reference to FIGS. 18, 19 and 20. Using the scan patterns of FIGS. 18 to 20 for luma TBs and chroma TBs avoids the need to define different scan patterns between luma and chroma for TBs of the same size.

The method 1400 continues from step 1470 to an LFNST signalling test step 1480. At the step 1480 the processor 205 determines if the secondary transform may be applicable to any TB of the CU. If all of the TBs of the CU use transform skip, then there is no need to encode the secondary transform index 388 ("NO" at step 1480) and the method 1400 progresses to an MTS signalling test step 14100. For a shared coding tree, for example, each of the luma TB and the two chroma TBs are transform skipped for step 1480 to return "NO". For a separate coding tree, the luma TB in a luma branch of the coding tree is transform skipped or the two chroma TBs in the a chroma branch of the coding tree are both transform skipped for step 1480 to return "NO" for invocations relating to luma and chroma respectively. For the secondary transform to be performed, the applicable TBs need to only include significant residual coefficients in the positions of the TB that are subject to secondary transformation. That is, all other residual coefficients must be zero, a condition achieved when the last position of a TB within 806, 824, 842, or 862 for the TB sizes shown in FIGS. 8A-8D. If the last position of any TB in the CU is outside of 806, 824, 842, or 862 for the considered TB size, secondary transformation is not performed ("NO" at step 1480) and the method 1400 progresses to the MTS signalling test step 14100.

For chroma TBs, widths or heights of two may occur. TBs with a width or height of two are not subject to secondary transformation, as there is no kernel defined for TBs of such dimensions ('NO' at step 1480) and the method 1400 progresses to the MTS signalling test step 14100. An additional condition on performing the secondary transform is the presence of at least on AC residual coefficient among the applicable TBs. That is, if the only significant residual coefficients are in the DC (top-left) position of each applicable TB, then the secondary transform is not performed ('NO' at step 1480) and the method 1400 progresses to the MTS signalling test step 14100. Provided at least one TB of the CU is subject to the primary transform (transform skip flag indicates no skip for at least one TB of the CU), last position constraints on TBs subject to primary transform are met, and at least one AC coefficient is included in one or more of the TBs subject to primary transform ('YES' at step 1480), control in the processor 205 progresses to an encode LFNST index step 1490. At the encode LFNST index step 1490 the entropy encoder 338 encodes a truncated unary codeword indicating three possible selections for application of the secondary transform. The selections are zero (not applied), one (first kernel of candidate set applied), and two (second kernel of candidate set applied). The codeword uses at most two bins, each of which is context coded. By virtue of the testing performed at the step 1480, the step 1490 is only performed when the secondary transform can be applied, i.e. for non-zero indices to be encoded. The step 1490 encodes 1120 or 1224 or 1225 for example.

Effectively, operation of steps 1480 and 1490 allow that the secondary transform index 1254 for chroma in a separate tree structure is encoded only when the secondary transform can be applied to chroma TBs of the TU 1260. In a shared tree structure steps 1480 and 1490 operate to encode the secondary transform index 1120 only if the secondary transform can be applied to any of the TBs of the TU 1124. In excluding the relevant secondary transform index (such as 1254 and 1120), the method 1400 operates to increase coding efficiency. In particular, in the shared or dual tree case, an unnecessary flag is avoided, thereby decreasing the number of bits required and improving coding efficiency. In the separate tree case, the secondary transform is not necessarily suppressed for chroma if the corresponding luma transform block is transform skipped.

The method 1400 progresses from step 1490 to the MTS signalling test step 14100.

At the MTS signalling step 14100 the video encoder 114 determines if the MTS index needs to be encoded into the bitstream 115 or not. If use of the DCT-2 transform was selected at the step 1360, the last significant coefficient position may be anywhere in the upper-left 32×32 region of the TB. If the last significant coefficient position is outside of the top-left 16×16 region of the TB and the scans of FIGS. 18 and 19 are used (rather than the scan pattern of FIG. 17), it is not necessary to explicitly signal mts_idx in the bitstream. The signal mts_idx is not required in the bitstream in this event because usage of MTS would not produce a last significant coefficient outside the top-left 16×16 region. The step 14100 returns "NO" and the method 1400 terminates, with DCT-2 usage implied by the last significant coefficient position.

Non-DCT-2 selections for the primary transform type are only available when the TB width and height are less than or equal to 32. Accordingly, for TBs of width or height exceeding 32, the step 14100 returns "NO" and the method 1400 terminates at the step 14100. Non-DCT-2 selections are also only available if the secondary transform is not applied, accordingly, if the secondary transform type 388 was determined to be non-zero at the step 1360, the step 14100 returns "NO" and the method 1400 terminates at the step 14100.

Presence of a last significant coefficient position is within the top-left 16×16 region of the TB when using the scans of FIGS. 18 and 19 may result either from application of a DCT-2 primary transform or an MTS combination of DST-7 and/or DCT-8, necessitating explicit signalling of mts_idx to encode the selection made at the step 1360. Accordingly, when the last significant coefficient position is within the top-left 16×16 region of the TB, the step 14100 returns "YES" and the method 1400 progresses to an encode MTS index step 14110.

At the encode MTS index step 14110 the entropy encoder 338 encodes a truncated unary bin string representing the primary transform type 389. The step 14110 can encode 1122 or 1226 for example. The method 1400 terminates upon execution of step 14110.

Figure 15:
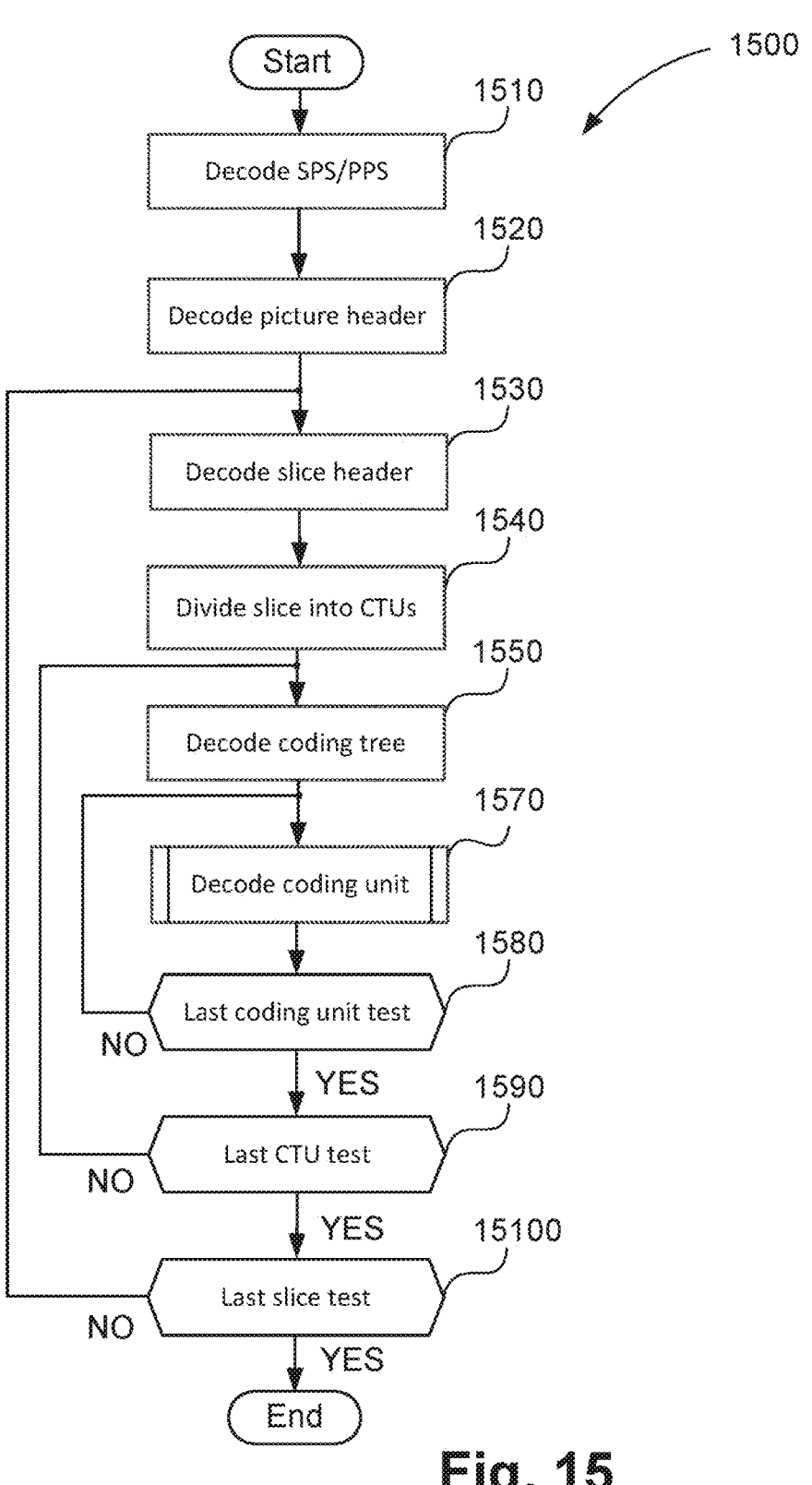
FIG. 15 shows a method for decoding a frame from a bitstream as sequences of coding units arranged into slices.

FIG. 15 shows a method 1500 for decoding the bitstream 133 to produce frame data 135, the bitstream 133 including one or more slices as sequences of coding tree units. The method 1500 may be embodied by apparatus such as a configured FPGA, an ASIC, or an ASSP. Additionally, the method 1500 may be performed by the video decoder 134 under execution of the processor 205. As such, the method 1500 may be stored as one or more modules of the software 233 on computer-readable storage medium and/or in the memory 206.

The method 1500 begins at a decode SPS/PPS step 1510. At step 1510 the video decoder 134 decodes the SPS 1010 and the PPS 1012 from the bitstream 133 as sequences of fixed and variable length encoded parameters. Parameters of the frame data 113, such as resolution and sample bit depth, are decoded. Parameters of the bitstream, such as flags indicating the usage of particular coding tools, are also decoded. Default partition constraints signal the maximum allowed depths of binary, ternary, and quadtree splitting and are also decoded as part of the SPS 1010 by the video decoder 134.

The method 1500 continues from step 1510 to a decode picture header step 1520. In execution of step 1520 the processor 205 decodes the picture header 1015 from the bitstream 113, applicable to all slices in the current frame. The picture parameter set includes parameters specifying the frequency with which 'delta QP' syntax elements are present in the bitstream 133, offsets for chroma QP relative to luma QP, and the like. Optional overridden partition constraints signal the maximum allowed depths of binary, ternary, and quadtree splitting and may also be decoded as part of the picture header 1015 by the video decoder 134.

The method 1500 continues from step 1520 to a decode slice header step 1530. At step 1530 the entropy decoder 420 decodes the slice header 1018 from the bitstream 133.

The method 1500 continues from step 1530 to a divide slice into CTUs step 1540. In execution of step 1540 the video encoder 114 divides the slice 1016 into a sequence of CTUs. Slice boundaries are aligned to CTU boundaries and CTUs in a slice are ordered according to a CTU scan order, generally a raster scan order. The division of a slice into CTUs establishes which portion of the frame data 133 is to be processed by the video encoder 133 in decoding the current slice.

The method 1500 continues from step 1540 to a decode coding tree step 1550. At step 1550 the video decoder 134 decodes a coding tree for a current selected CTU in the slice. The method 1500 starts from the first CTU in the slice 1016 on the first invocation of the step 1550 and progresses to subsequent CTUs in the slice 1016 on subsequent invocations. In decoding the coding tree of a CTU, flags are decoded that are indicative of the combination of quadtree, binary, and ternary splits as determined at the step 1350 in the video encoder 114.

The method 1500 continues from step 1550 to a decode coding unit step 1570. At step 1570 the video decoder 134 decodes the determined coding unit of the step 1560 from the bitstream 133. An example of how the coding unit is decoded is described in more detail with reference to FIG. 16.

The method 1500 continues from step 1570 to a last coding unit test step 1580. At step 1580 the processor 205 tests if the current coding unit is the last coding unit in the CTU. If not ("NO" at step 1580), control in the processor 205 returns to the decode coding unit step 1560. Otherwise, if the current coding unit is the last coding unit ("YES" at step 1580) control in the processor 205 progresses to a last CTU test step 1590.

At the last CTU test step 1590, the processor 205 tests if the current CTU is the last CTU in the slice 1016. If not the last CTU in the slice 1016 ("NO" at step 1590), control in the processor 205 returns to the decode coding tree step 1550. Otherwise, if the current CTU is the last ("YES" at step 1590), control in the processor progresses to a last slice test step 15100.

At the last slice test step 15100 the processor 205 tests if the current slice being decoded is the last slice in the frame. If the current slice is not the last slice ("NO" at step 15100), control in the processor 205 returns to the decode slice header step 1530. Otherwise, if the current slice is the last slice and all slices have been decoded ("YES" at step 15100) the method 1500 terminates.

Figure 16:
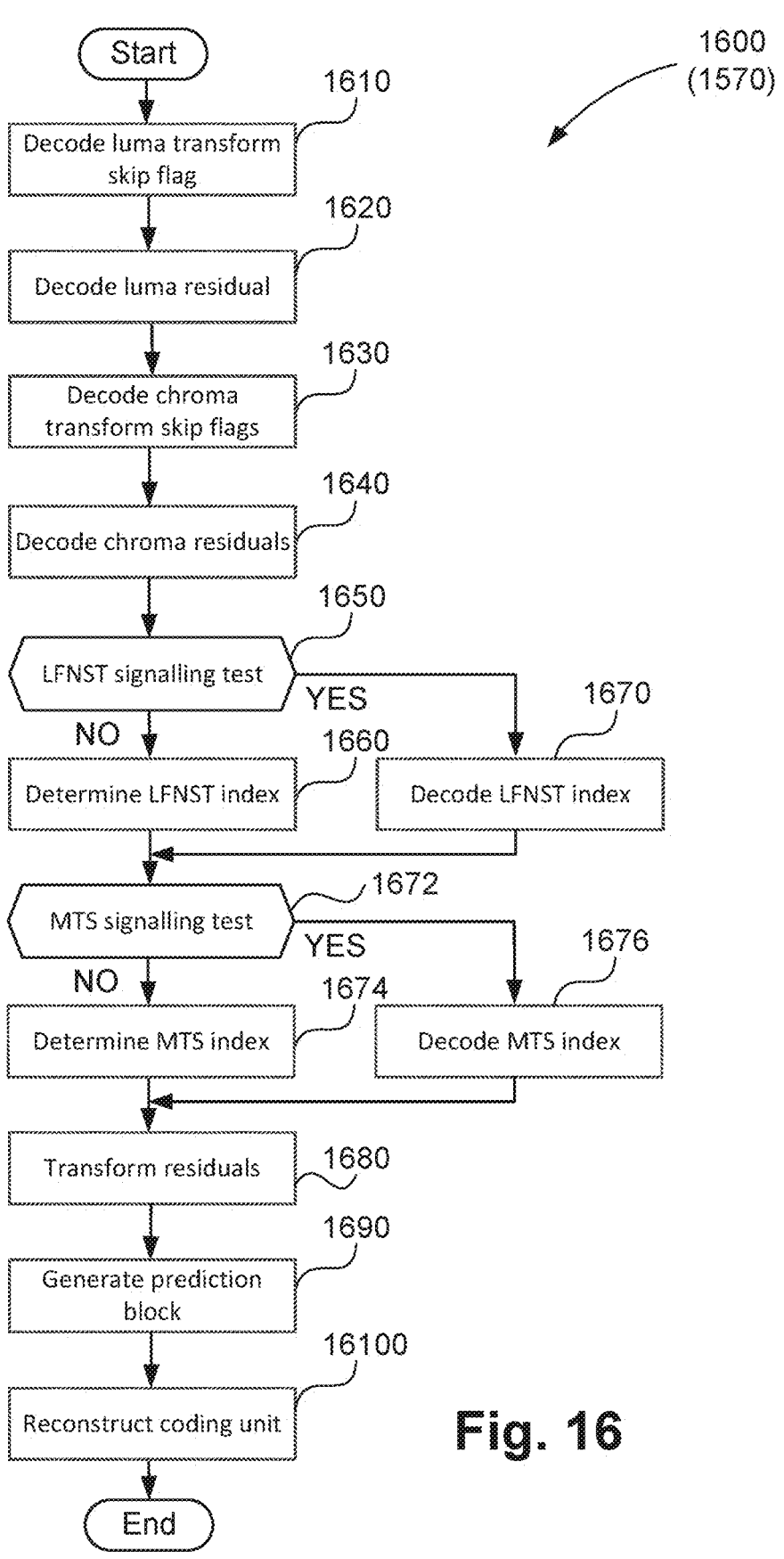
FIG. 16 shows a method for decoding a coding unit from a bitstream.

FIG. 16 shows a method 1600 for decoding a coding unit from the bitstream 133, corresponding to the step 1570 of FIG. 15. The method 1600 may be embodied by apparatus such as a configured FPGA, an ASIC, or an ASSP. Additionally, the method 1600 may be performed by the video decoder 134 under execution of the processor 205. As such, the method 1600 may be stored on computer-readable storage medium and/or as one or more modules of the software 233 in the memory 206.

When a shared coding tree is in use, the method 1600 is invoked for each CU in the coding tree, e.g. CU 1114 of FIG. 11, with Y, Cb, and Cr colour channels being encoded in a single invocation. When a separate coding tree is in use, the method 1600 is firstly invoked for each CU in the luma branch 1214a, e.g. 1220, and the method 1600 is also separately invoked for each chroma CU, e.g. 1250, in the chroma branch 1214b.

The method 1600 starts at a decode luma transform skip flag step 1610. At the step 1610 the entropy decoder 420 decodes a context-coded transform skip flag 478 (for example encoded in the bitstream as 1126 in FIG. 11 or 1232 in FIG. 12) from the bitstream 133. The skip flag indicates whether transforms are to be applied to the luma TB. The transform skip flag 478 indicates that the residual for the luma TB is to be transformed according to (i) a primary transform, (ii) a primary transform and a secondary transform, or (iii) that primary and secondary transforms are to be bypassed. The step 1610 is performed when the CU includes a luma TB in a shared coding tree (decoding 1126 for example). The step 1610 is performed when the CU belongs to the luma branch of a dual tree (decoding 1232) for a separate coding tree CTU.

The method 1600 continues from step 1610 to a decode luma residual step 1620. At the step 1620 the entropy decoder 420 decodes the residual coefficients 424 for the luma TB from the bitstream 115. The residual coefficients 424 are assembled into a TB by applying a scan to the list of decoded residual coefficients. The step 1620 operates to select a suitable scan patterns based on the dimensions of the coding unit. Examples of scan patterns are described in relation to FIG. 17 (a conventional scan pattern) and FIGS. 18 to 20 (additional scan patterns useful for determining MTS flag). In the example described herein, a scan pattern based on patterns described in relation to FIGS. 18-20 is used. The scan is typically a backward diagonal scan pattern, using 4×4 sub-blocks, as defined with reference to FIGS. 18 and 19. The position of the first non-zero residual coefficient in the list is decoded from the bitstream 133 as a Cartesian co-ordinate relative to the top-left coefficient of the transform block, i.e. 1140. The remaining residual coefficients are decoded in order from the coefficient at the last position to the DC (top-left) residual coefficient, as residual coefficients 1144.

For each sub-block other than the top-left sub-block of the TB and the sub-block containing the last significant residual coefficient, a 'coded sub-block flag' is decoded to indicate the presence of at least one significant residual coefficient in the respective sub-block. If the coded sub-block flag indicates the presence of at least one significant residual coefficient in a sub-block then a 'significance map', a set of flags, is decoded indicating the significance of each residual coefficient in the sub-block. If a sub-block is indicated to include at least one significant residual coefficient from a decoded coded sub-block flag and the scan reaches the last scan position of the sub-block without encountering a significant residual coefficient, then the residual coefficient at the last scan position in the sub-block is inferred to be significant. The coded sub-block flags and the significance map (each flag being named 'sig_coeff_flag') are coded using context-coded bins. For each significant residual coefficient in a sub-block an 'abs_level_gtx_flag' is decoded, indicating if the magnitude of the corresponding residual coefficient is greater than one or not. For each residual coefficient in a sub-block having a magnitude greater than one, a 'par_level_flag' and a 'abs_level_gtx_flag2' are decoded to further determine the magnitude of the residual coefficient, according to the Equation (1):

$$AbsLevelPass1 = sig\_coeff\_flag + par\_level\_flag + \tag{1}$$

US 12,689,735 B2

45

-continued $$abs\_level\_gtx\_flag + 2 \times abs\_level\_gtx\_flag2.$$

The abs_level_gtx_flag and abs_level_gtx_flag2 syntax elements are coded using context-coded bins. For each residual coefficient having abs_level_gtx_flag2 equal to one, a bypass-coded syntax element 'abs_remainder' is decoded, using Rice-Golomb coding. The decoded magnitude for a residual coefficient is determined as: AbsLevel=AbsLevelPass1+2×abs_remainder. A sign bit is decoded for each significant residual coefficient to derive the residual coefficient value from the residual coefficient magnitude. The cartesian co-ordinates of each sub-block in a scan pattern may be derived from the scan pattern by adjusting (right shifting) the X and Y residual coefficient cartesian co-ordinates by the log 2 of the sub-block width and height, respectively. For luma TBs the sub-block size is always 4×4 resulting in right-shifts of two bits for X and Y. The scan patterns of FIGS. 18-20 may also be applied to chroma TBs to avoid storing different scan patterns for blocks of the same size but different colour channels. The step 1620 is performed when the CU includes a luma TB, i.e., in a shared coding tree (decoding 1128) or for an invocation for a luma branch of a dual tree (decoding 1234 for example).

The method 1600 continues from step 1620 to a decode chroma transform skip flags step 1630. At the step 1630 the entropy decoder 420 decodes a context-coded flag from the bitstream 133 for each chroma TB. For example, the context-coded flag may have been encoded as 1130 and 1134 in FIG. 11 or 1262 and 1266 in FIG. 12) At least one flag is decoded, one for each of the chroma TBs. The flags decoded at step 1630 indicate whether transforms are to be applied to a corresponding chroma TB, in particular whether the corresponding chroma TB is to be subject to DCT-2 transform, and optionally a secondary transform, or whether all transforming for the corresponding chroma TB is to be bypassed. The step 1630 is performed when the CU includes chroma TBs, i.e., the CU belongs to a shared coding tree (decoding 1130 and 1134) or chroma branch of a dual tree (decoding 1262 and 1266).

The method 1600 continues from step 1630 to a decode chroma residuals step 1640. At the step 1640 the entropy decoder 420 decodes residual coefficients for the chroma TBs from the bitstream 133. The step 1640 operates in a similar manner to that described with reference to step 1620 and in accordance with scan patterns defined in FIGS. 18 and 19. The step 1640 is performed when the CU includes chroma TBs, i.e., when the CU belongs to a shared coding tree (decoding 1132 and 1136) or chroma branch of a dual tree (decoding 1264 and 1268).

The method 1600 continues from step 1640 to an LFNST signal test step 1650. At the step 1650 the processor 205 determines if the secondary transform is applicable to any TB of the CU. The luma transform skip flag can have a different value to the chroma transform skip flags. If all of the TBs of the CU use transform skip, then the secondary transform is not applicable and there is no need to encode a secondary transform index ("NO" at step 1650) and the method 1600 progresses to a determine LFNST index step 1660. For example, for a shared coding tree, each of the luma TB and the two chroma TBs are transform skipped to return "NO" at step 1650. For a CU belonging to the luma branch of a separate coding tree (e.g. 1220) the step 1650 returns 'NO' when the luma TB is transform skipped. For a CU belonging to the chroma branch of a separate coding tree (e.g. 1250) the step 1650 returns "NO" when both chroma TBs are transform skipped. For a CU belonging to the chroma branch of a separate coding tree (e.g. 1250) and having a width or height of less than four samples the step 1650 returns "NO". For the secondary transform to be performed, the applicable TBs need to only include significant residual coefficients in the positions of the TB that are subject to secondary transformation. That is, all other residual coefficients must be zero, a condition achieved when the last position of a TB is within 806, 824, 842, or 862 for the TB sizes shown in FIGS. 8A-8D. If the last position of any TB in the CU is outside of 806, 824, 842, or 862 for the considered TB size, secondary transformation is not performed ("NO" at step 1650) and the method 1600 progresses to the determine LFNST index step 1660. For chroma TBs, widths or heights of two may occur. TBs with a width or height of two are not subject to secondary transformation, as there is no kernel defined for TBs of such dimensions. An additional condition on performing the secondary transform is the presence of at least on AC residual coefficient among the applicable TBs. That is, if the only significant residual coefficients are in the DC (top-left) position of each TB, then the secondary transform is not performed ("NO" at step 1650) and the method 1600 progresses to the determine LFNST index step 1660. Constraints on last significant coefficient position and presence of non-DC residual coefficient only apply to TBs of applicable size, i.e., having width and height of greater than two samples. Provided at least one applicable TB is transformed, last position constraints are met, and non-DC coefficient requirement is met ('YES' at step 1650), control in the processor 205 progresses to a decode LFNST index step 1670.

The determine LFNST index step 1660 is implemented when a secondary transform cannot be applied to any of the TBs associated with the CU. At step 1660 the processor 205 determines the secondary transform index to have a value of zero, indicating no application of the secondary transform. Control in the processor 205 progresses from the step 1660 to an MTS signalling step 1672.

At the decode LFNST index step 1670, the entropy decoder 420 decodes a truncated unary codeword as secondary transform index 474 indicating three possible selections for application of the secondary transform. The selections are zero (not applied), one (first kernel of candidate set applied), and two (second kernel of candidate set applied). The codeword uses at most two bins, each of which is context coded. By virtue of the testing performed at the step 1650, the step 1670 is only performed when it is possible for the secondary transform to be applied, i.e. for non-zero indices to be decoded. When the method 1600 is invoked as part of a shared coding tree, the step 1670 decodes 1120 from the bitstream 133. When the method 1600 is invoked as part of a luma branch of a separate coding tree, the step 1670 decodes 1224 from the bitstream 133. When step 1670 invoked as part of a chroma branch of a separate coding tree, the step 1670 decodes 1254 from the bitstream 133. Control in the processor 205 progresses from the step 1670 to the MTS signalling step 1672.

The steps 1650, 1660 and 1670 operate to determine the LFNST index, that is, 474. The LFNST index is decoded from the video bitstream (for example decoding 1120, 1224 or 1254) if at least one of the luma transform skip flags and the chroma transform skip flags applicable to the CU indicates that a transform of the respective transform block is not to be skipped ("YES" at step 1650 and performing step 1670). The LFNST index is determined to indicate that a secondary transform is not to be applied if all of the luma transform skip flag and chroma transform skip flags applicable to the CU indicate transforms of the respective transform blocks are to be skipped ("NO" at step 1650 and performing step 1660). In the shared tree case, the luma and chroma skip values and LFNST indices can differ. For example, the LFNST index decoded for chroma transform blocks can be based on the decoded chroma skip flags even if the decoded luma transform skip flag, for example in a collocated block, indicates that transforms for the luma block are to be skipped. The encoding steps 1480 and 1490 operate in a similar manner.

At the MTS signalling step 1672 the video decoder 134 determines whether the MTS index needs to be decoded from the bitstream 133 or not. If use of the DCT-2 transform was selected at the step 1360, when encoding the bitstream, then the last significant coefficient position may be anywhere in the upper-left 32×32 region of the TB. If the last significant coefficient position decoded at the step 1620 is outside of the top-left 16×16 region of the TB and the scans of FIGS. 18 and 19 are used, it is not necessary to explicitly decode an mts_idx because usage of any non-DCT-2 primary transform would not produce a last significant coefficient outside this region. The step 1672 returns "NO" and the method 1600 progresses from the step 1672 to a determine MTS index step 1674. Non-DCT2 primary transforms are only available when the TB width and height are less than or equal to 32. Accordingly, for TBs of width or height exceeding 32, the step 1672 returns "NO" and the method 1600 progresses to the determine MTS index step 1674.

Non-DCT-2 primary transforms are only available when the secondary transform type 474 indicates bypassing application of a secondary transform kernel, accordingly, when the secondary transform type 474 has a non-zero value, the method 1600 progresses from the step 1672 to the step 1674. Presence of a last significant coefficient position within the top-left 16×16 region of the TB, when using the scans of FIGS. 18 and 19, may result either from application of a DCT-2 primary transform or an MTS combination of DST-7 and/or DCT-8, necessitating explicit signalling of mts_idx to encode the selection made at the step 1360. Accordingly, when the last significant coefficient position is within the top-left 16×16 region of the TB the step 1672 returns "YES" and the method 1600 progresses to a decode MTS index step 1676.

At the determine MTS index step 1674 the video decoder 134 determines that DCT-2 is to be used as primary transform. The primary transform type 476 is set to zero. The method 1400 progresses from the step 1674 to a transform residuals step 1680.

At the decode MTS index step 1676 the entropy decoder 420 decodes a truncated unary bin string from the bitstream 133 to determine the primary transform type 476. The truncated string is in the bitstream as 1122 in FIG. 11 or 1226 in FIG. 12 for example. The method 1400 progresses from the step 1676 to the transform residuals step 1680.

The steps 1670, 1672 and 1674 operate to determine the MTS index for the coding unit. The MTS index is decoded from the video bitstream if the last significant coefficient is at or within the threshold coordinate (15, 15) ("YES" at step 1672 and step 1676). The MTS index is determined to indicate that MTS is not to be applied if the last significant coefficient is outside the threshold coordinate ("NO" at step 1672 and step 1674). The encoding steps 14100 and 14110 operate in a similar manner.

In an alternative arrangement of the video encoder 114 and the video decoder 134, appropriately-sized chroma TBs (with MTS not being applicable to chroma TBs) are scanned in accordance with the scan pattern as described with reference to FIG. 17 while luma TBs utilise scans in accordance with FIGS. 18 and 19, with DST-7/DCT-8 combinations only applicable to luma TBs.

At the transform residuals step 1680 the video decoder 134, under execution of the processor 205, either bypasses inverse primary and inverse secondary transform on the residual of the step 1420 or performs inverse transforms according to the primary transform type 476 and the secondary transform index 474. The transforms are performed for each TB of the CU in according with the decode transform skip flag 478 for each TB in the CU, as described with reference to FIG. 4. The primary transform type 476 selects between use of DCT-2 horizontally and vertically, or combinations of DCT-8 and DST-7 horizontally and vertically for the luma TB of the coding unit. Effectively, step 1680 transforms the luma transform block of the CU according to the decoded luma transform skip flag, the primary transform type 476, and the secondary transform index determined by operation of steps 1610 and 1650 to 1670 to decode the coding unit. The step 1680 can also transform the chroma transform blocks of the CU according to the respective decoded chroma transform skip flags and the secondary transform index determined by operation of steps 1630 and 1650 to 1670 to decode the coding unit. For TBs belonging to the chroma channels (for example: 1132 and 1136 in the shared coding tree case or 1264 and 1268 in the chroma branch of a separate coding tree case), the secondary transform is only performed if the width and height of the TB is greater than or equal to four samples, as there is no available secondary transform kernel of TBs having a width or height of less than four samples. For TBs belonging to the chroma channels, restrictions on split operations are in place in the VVC standard to prohibit intra-predicted CUs with TB sizes of 2×2, 2×4, and 4×2, due to the difficulty in processing such small sizes of TB at the required block throughput rate needed to support video formats such as UHD and 8K. Further restrictions prohibit intra-predicted CUs with TBs of width 2 due to the difficulty in memory access for on-chip memory typically used for producing reconstructed samples as part of the intra-prediction operation. Accordingly, chroma TB sizes (in chroma samples) for which the secondary transform does not apply are shown in Table 1

TABLE 1

| chroma TB sizes (in chroma samples) for which the secondary transform does not apply. | | |
|---|---|---|
| Chroma format | Maximum transform size | Chroma TB sizes for which secondary transform is not applicable |
| 4:2:0 | 32 × 32 | 8 × 2, 16 × 2 |
| 4:2:0 | 64 × 64 | 8 × 2, 16 × 2, 32 × 2. |
| 4:2:2 | 32 × 32 | 8 × 2, 16 × 2. |
| 4:2:2 | 64 × 64 | 8 × 2, 16 × 2, 32 × 2. |

TABLE 1-continued chroma TB sizes (in chroma samples) for which the secondary transform does not apply.

| Chroma format | Maximum transform size | Chroma TB sizes for which secondary transform is not applicable |
|---|---|---|
| 4:4:4 | 32 × 32 | 8 × 2, 16 × 2, 32 × 2. |
| 4:4:4 | 64 × 64 | 8 × 2, 16 × 2, 32 × 2, 64 × 2. |

As described hereinbefore, different scan patterns can be used in encoding and decoding. The step 1680 transforms the transform blocks of the CU according to the MITS index to decode the coding unit.

The method 1600 continues from step 1680 to a generate prediction block step 1690. At step 1690 the video decoder 134 generates the prediction block 452 according to a prediction mode for the CU as determined at the step 1360 and decoded from the bitstream 113 by the entropy decoder 420. The entropy decoder 420 decodes the prediction mode for the coding unit, as determined at the step 1360, from the bitstream 133. A 'pred_mode' syntax element is decoded to distinguish between use of intra prediction, inter prediction, or other prediction modes for the coding unit. If intra prediction is used for the coding unit then a luma intra prediction mode is decoded if a luma PB is applicable to the CU and a chroma intra prediction mode is decoded if chroma PBs are applicable to the CU.

The method 1600 continues from step 1690 to a reconstruct coding unit step 16100. At the step 16100 the prediction block 452 is added to the residual samples 424 for each colour channel of the CU to produce the reconstructed samples 456. Additional in-loop filtering steps, such as deblocking, may be applied to the reconstructed samples 456 before they are output as frame data 135. The method 1600 terminates on execution of the step 16100.

As described above, for a separate coding tree, the method 1600 is firstly invoked for each CU in the luma branch 1214a, e.g. 1220, and the method 1600 is also separately invoked for each chroma CU, e.g. 1250, in the chroma branch 1214b. Invocations of the method 1600 for chroma determine the LFNST index 1254 at steps 1650 to 1670 with respect to whether all of the chroma transform skip flags of the CU 1250 are set or not. Similarly, in invocations of the method 1600 for luma, the luma LFNST index 1224 is determined at steps 1650 to 1670 with respect to the luma transform skip flag for the CU 1220 only.

Scan patterns shown in FIGS. 18-20, that is 1810, 1910, and 2010a-f, as implemented at steps 1450 and 1620 substantially retain the property of progressing from the highest-frequency coefficients of a TB towards the lowest-frequency coefficients of the TB, compared to the scan pattern 1710 of FIG. 17. Accordingly, arrangements of the video encoder 114 and the video decoder 134 using the scan patterns 1810, 1910, and 2010a-f achieve similar compression efficiency as that achieved when using the scan pattern 1710, while enabling MTS index signalling to be dependent on the last significant coefficient position without further need to check for zero-valued residual coefficients outside of the MTS transform coefficient region. The last position used with the scan patterns of FIGS. 18-20 allows that MTS is used only when all significant coefficients are present the appropriate top-left region, such as the top-left 16×16 region. Burden on the decoder 134 to check flags outside of the appropriate area, e.g. outside of the 16×16 coefficient region of a TB to ensure no further non-significant coefficients are present is removed. Behaviour in the decoder does not require specific alterations to implement MTS. Further, as described above, use of the scan patterns in FIGS. 18 and 19, that is, for transform blocks of size 16×32, 32×16, and 32×32 can be replicated from a 16×16 scan, thereby reducing memory requirements.

INDUSTRIAL APPLICABILITY

The arrangements described are applicable to the computer and data processing industries and particularly for the digital signal processing for the encoding a decoding of signals such as video and image signals, achieving high compression efficiency.

Some arrangements described herein improve compression efficiency by signalling the secondary transform index in cases where the available selections include at least one option other than bypassing of the secondary transform. The compression efficiency increase is achieved both in the case of a CTU divided into CUs spanning all colour channels ('shared coding tree' case) and when CTUs are divided into sets of luma CUs and sets of chroma CUs ('separate coding tree' case). Redundant signalling the secondary transform index in cases where the secondary transform index cannot be used is avoided in a separate tree case. For shared trees, the LFNST index can be signalled for a chroma DCT-2 primary case even if luma uses a transform skip. Other arrangements maintain compression efficiency while enabling MTS index signalling to be dependent on the last significant coefficient position without further need to check for zero-valued residual coefficients outside of the MTS transform coefficient region of a TB.

The foregoing describes only some embodiments of the present invention, and modifications and/or changes can be made thereto without departing from the scope and spirit of the invention, the embodiments being illustrative and not restrictive.

The invention claimed is:

1. A method of decoding a coding unit from a bitstream, the coding unit being divided, using a tree structure, from a coding tree unit of an image, the coding unit being capable of having at least a luma component or chroma components, and the chroma components including a Cb component and a Cr component, the method comprising:

decoding, from the bitstream, a luma transform skip flag for the luma component in a case where the coding unit has the luma component, the luma transform skip flag indicating whether a luma transform process for the luma component is skipped;

decoding, from the bitstream, a first chroma transform skip flag for the Cb component and a second chroma transform skip flag for the Cr component in a case where the coding unit has the chroma components, the first chroma transform skip flag indicating whether a first chroma transform process for the Cb component is skipped, and the second chroma transform skip flag indicating whether a second chroma transform process for the Cr component is skipped;

determining, for the coding unit, whether to decode an index for a specific transform process from the bitstream, wherein a kernel used in the specific transform process is selectable from multiple candidate sets of kernels, and the index is an index for specifying the kernel used in the specific transform process; and decoding, for the coding unit, the index for the specific transform process from the bitstream, in accordance with a result of determination in the determining, wherein in a case where the coding tree unit has a size of 128×128 and a coding tree structure for the luma component in the coding tree unit is to be separate from a coding tree structure for the chroma components in the coding tree unit, (a) the coding tree unit is, in common between the luma component and the chroma components, divided into four regions each having a size of 64×64, (b) a dual tree structure for the luma component and a dual tree structure for the chroma components start for each one of the four regions, and (c) the determination of whether to decode the index is performed for each coding unit divided, using the dual tree structure for the luma component, from a given region among the four regions before the determination of whether to decode the index is performed for each coding unit divided, using the dual tree structure for the chroma components, from the given region, wherein the index for the coding unit is always not decoded from the bitstream in a case where the coding unit is divided from the coding tree unit using a single tree structure and each transform block in the coding unit includes a significant coefficient only at a DC position, wherein the specific transform process for the coding unit is always not performed regardless of the other conditions and the index for the coding unit is not decoded from the bitstream and a value of the index for the coding unit is inferred to be 0, in a case where (i) the luma transform process, the first chroma transform process, and the second chroma transform process are skipped and (ii) the coding unit is divided from the coding tree unit using the single tree structure, wherein the index for the coding unit is not decoded from the bitstream and the value of the index for the coding unit is inferred to be 0, in a case where (i) the luma transform process is skipped and (ii) the coding unit is divided from the coding tree unit using the dual tree structure for the luma component, wherein the index for the coding unit is not decoded from the bitstream and the value of the index for the coding unit is inferred to be 0, in a case where (i) the first chroma transform process and the second chroma transform process are skipped and (ii) the coding unit is divided from the coding tree unit using the dual tree structure for the chroma components, and wherein a ternary split is capable of being used to divide a coding unit included in the coding tree unit into coding units.

2. The method according to claim 1, wherein the image has a 4:2:0 chroma format.

3. The method according to claim 1, wherein use of a chroma block having a size of 2×2, 2×4, or 4×2 is not allowed in a case where an intra prediction and the single tree structure are used.

4. The method according to claim 1, wherein the index having a value of 0 indicates that the specific transform process is not used.

5. The method according to claim 1, wherein the DC position in the transform block is a top-left position among a plurality of positions within the transform block.

6. The method according to claim 1, wherein the DC position in the transform block is a position to be scanned last in a predetermined scan order among a plurality of positions within the transform block.

7. The method according to claim 1, wherein the dual tree structure for the luma component is decoded for the given region before the dual tree structure for the chroma components is decoded for the given region.

8. The method according to claim 1, wherein in a case where a transform block in the coding unit contains a non-zero coefficient, a flag indicating whether a magnitude of the non-zero coefficient is greater than 1 is decoded, and the magnitude of the non-zero coefficient is determined by using the decoded flag.

9. The method according to claim 8, wherein a context-coded bin is used for the flag.

10. The method according to claim 8, wherein information of a sign of the non-zero coefficient is decoded.

11. A method of encoding a coding unit into a bitstream, the coding unit being divided, using a tree structure, from a coding tree unit of an image, the coding unit being capable of having at least a luma component or chroma components, and the chroma components including a Cb component and a Cr component, the method comprising:

encoding, into the bitstream, a luma transform skip flag for the luma component in a case where the coding unit has the luma component, the luma transform skip flag indicating whether a luma transform process for the luma component is skipped;

encoding, into the bitstream, a first chroma transform skip flag for the Cb component and a second chroma transform skip flag for the Cr component in a case where the coding unit has the chroma components, the first chroma transform skip flag indicating whether a first chroma transform process for the Cb component is skipped, and the second chroma transform skip flag indicating whether a second chroma transform process for the Cr component is skipped;

determining, for the coding unit, whether to encode an index for a specific transform process into the bitstream, wherein a kernel used in the specific transform process is selectable from multiple candidate sets of kernels, and the index for specifying the kernel used in the specific transform process; and encoding, for the coding unit, the index for the specific transform process into the bitstream, in accordance with a result of determination in the determining, wherein in a case where the coding tree unit has a size of 128×128 and a coding tree structure for the luma component in the coding tree unit is to be separate from a coding tree structure for the chroma components in the coding tree unit, (a) the coding tree unit is, in common between the luma component and the chroma components, divided into four regions each having a size of 64×64, (b) a dual tree structure for the luma component and a dual tree structure for the chroma components start for each one of the four regions, and (c) the determination of whether to encode the index is performed for each coding unit divided, using the dual tree structure for the luma component, from a given region among the four regions before the determination of whether to encode the index is performed for each coding unit divided, using the dual tree structure for the chroma components, from the given region, wherein the index for the coding unit is always not encoded into the bitstream in a case where the coding unit is divided from the coding tree unit using a single tree structure and each transform block in the coding unit includes a significant coefficient only at a DC position, wherein the specific transform process for the coding unit is always not performed regardless of the other conditions and the index for the coding unit is not encoded into the bitstream and a value of the index for the coding unit is inferred to be 0, in a case where (i) the luma transform process, the first chroma transform process, and the second chroma transform process are skipped and (ii) the coding unit is divided from the coding tree unit using the single tree structure, wherein the index for the coding unit is not encoded into the bitstream and the value of the index for the coding unit is inferred to be 0, in a case where (i) the luma transform process is skipped and (ii) the coding unit is divided from the coding tree unit using the dual tree structure for the luma component, wherein the index for the coding unit is not encoded into the bitstream and the value of the index for the coding unit is inferred to be 0, in a case where (i) the first chroma transform process and the second chroma transform process are skipped and (ii) the coding unit is divided from the coding tree unit using the dual tree structure for the chroma components, and wherein a ternary split is capable of being used to divide a coding unit included in the coding tree unit into coding units.

12. The method according to claim 11, wherein the image has a 4:2:0 chroma format.

13. The method according to claim 11, wherein use of a chroma block having a size of 2×2, 2×4, or 4×2 is not allowed in a case where an intra prediction and the single tree structure are used.

14. The method according to claim 11, wherein the index having a value of 0 indicates that the specific transform process is not used.

15. The method according to claim 11, wherein the DC position in the transform block is a top-left position among a plurality of positions within the transform block.

16. The method according to claim 11, wherein the DC position in the transform block is a position to be scanned last in a predetermined scan order among a plurality of positions within the transform block.

17. The method according to claim 11, wherein the dual tree structure for the luma component is encoded for the given region before the dual tree structure for the chroma components is encoded for the given region.

18. The method according to claim 11, wherein in a case where a transform block in the coding unit contains a non-zero coefficient, a flag indicating whether a magnitude of the non-zero coefficient is greater than 1 is encoded by using a context bin.

19. The method according to claim 18, wherein information of a sign of the non-zero coefficient is decoded.

20. A decoding apparatus comprising:
one or more processors; and
one or more memories storing instructions that, when executed by the one or more processors, cause the decoding apparatus to decode a coding unit from a bitstream, the coding unit being divided, using a tree structure, from a coding tree unit of an image, the coding unit being capable of having at least a luma component or chroma components, and the chroma components including a Cb component and a Cr component, and cause the decoding apparatus to:

decode, from the bitstream, a luma transform skip flag for the luma component in a case where the coding unit has the luma component, the luma transform skip flag indicating whether a luma transform process for the luma component is skipped;

decode, from the bitstream, a first chroma transform skip flag for the Cb component and a second chroma transform skip flag for the Cr component in a case where the coding unit has the chroma components, the first chroma transform skip flag indicating whether a first chroma transform process for the Cb component is skipped, and the second chroma transform skip flag indicating whether a second chroma transform process for the Cr component is skipped; and perform, for the coding unit, determination of whether to decode an index for a specific transform process from the bitstream, wherein a kernel used in the specific transform process is selectable from multiple candidate sets of kernels, and the index is an index for specifying the kernel used in the specific transform process; and decode, for the coding unit, the index for the specific transform process from the bitstream, in accordance with a result of the determination, wherein in a case where the coding tree unit has a size of 128×128 and a coding tree structure for the luma component in the coding tree unit is to be separate from a coding tree structure for the chroma components in the coding tree unit, (a) the coding tree unit is, in common between the luma component and the chroma components, divided into four regions each having a size of 64×64, (b) a dual tree structure for the luma component and a dual tree structure for the chroma components start for each one of the four regions, and (c) the determination of whether to decode the index is performed for each coding unit divided, using the dual tree structure for the luma component, from a given region among the four regions before the determination of whether to decode the index is performed for each coding unit divided, using the dual tree structure for the chroma components, from the given region, wherein the index for the coding unit is always not decoded from the bitstream in a case where the coding unit is divided from the coding tree unit using a single tree structure and each transform block in the coding unit includes a significant coefficient only at a DC position, wherein the specific transform process for the coding unit is always not performed regardless of the other conditions and the index for the coding unit is not decoded from the bitstream and a value of the index for the coding unit is inferred to be 0, in a case where (i) the luma transform process, the first chroma transform process, and the second chroma transform process are skipped and (ii) the coding unit is divided from the coding tree unit using the single tree structure, wherein the index for the coding unit is not decoded from the bitstream and the value of the index for the coding unit is inferred to be 0, in a case where (i) the luma transform process is skipped and (ii) the coding unit is divided from the coding tree unit using the dual tree structure for the luma component, wherein the index for the coding unit is not decoded from the bitstream and the value of the index for the coding unit is inferred to be 0, in a case where (i) the first chroma transform process and the second chroma transform process are skipped and (ii) the coding unit is divided from the coding tree unit using the dual tree structure for the chroma components, and wherein a ternary split is capable of being used to divide a coding unit included in the coding tree unit into coding units.

21. An encoding apparatus comprising:

one or more processors; and one or more memories storing instructions that, when executed by the one or more processors, cause the encoding apparatus to encode a coding unit into a bitstream, the coding unit being divided, using a tree structure, from a coding tree unit of an image, the coding unit being capable of having at least a luma component or chroma components, and the chroma components including a Cb component and a Cr component, and cause the encoding apparatus to:

encode, into the bitstream, a luma transform skip flag for the luma component in a case where the coding unit has the luma component, the luma transform skip flag indicating whether a luma transform process for the luma component is skipped;

encode, into the bitstream, a first chroma transform skip flag for the Cb component and a second chroma transform skip flag for the Cr component in a case where the coding unit has the chroma components, the first chroma transform skip flag indicating whether a first chroma transform process for the Cb component is skipped, and the second chroma transform skip flag indicating whether a second chroma transform process for the Cr component is skipped; and perform, for the coding unit, determination of whether to encode an index for a specific transform process into the bitstream, wherein a kernel used in the specific transform process is selectable from multiple candidate sets of kernels, and the index is an index for specifying the kernel used in the specific transform process;

encode, for the coding unit, the index for the specific transform process into the bitstream, in accordance with a result of the determination, wherein in a case where the coding tree unit has a size of 128×128 and a coding tree structure for the luma component in the coding tree unit is to be separate from a coding tree structure for the chroma components in the coding tree unit, (a) the coding tree unit is, in common between the luma component and the chroma components, divided into four regions each having a size of 64×64, (b) a dual tree structure for the luma component and a dual tree structure for the chroma components start for each one of the four regions, and (c) the determination of whether to encode the index is performed for each coding unit divided, using the dual tree structure for the luma component, from a given region among the four regions before the determination of whether to encode the index is performed for each coding unit divided, using the dual tree structure for the chroma components, from the given region, wherein the index for the coding unit is always not encoded into the bitstream in a case where the coding unit is divided from the coding tree unit using a single tree structure and each transform block in the coding unit includes a significant coefficient only at a DC position, wherein the specific transform process for the coding unit is always not performed regardless of the other conditions and the index for the coding unit is not encoded into the bitstream and a value of the index for the coding unit is inferred to be 0, in a case where (i) the luma transform process, the first chroma transform process, and the second chroma transform process are skipped and (ii) the coding unit is divided from the coding tree unit using the single tree structure, wherein the index for the coding unit is not encoded into the bitstream and the value of the index for the coding unit is inferred to be 0, in a case where (i) the luma transform process is skipped and (ii) the coding unit is divided from the coding tree unit using the dual tree structure for the luma component, wherein the index for the coding unit is not encoded into the bitstream and the value of the index for the coding unit is inferred to be 0, in a case where (i) the first chroma transform process and the second chroma transform process are skipped and (ii) the coding unit is divided from the coding tree unit using the dual tree structure for the chroma components, and wherein a ternary split is capable of being used to divide a coding unit included in the coding tree unit into coding units.

22. A non-transitory computer readable storage medium containing computer-executable instructions which causes a computer to perform the method according to claim 1.

23. A non-transitory computer readable storage medium containing computer-executable instructions which causes a computer to perform the method according to claim 11.

*    *    *    *    *